United States Patent [19]

Evans et al.

[11] 4,179,693
[45] Dec. 18, 1979

[54] AUTONOMOUS, CHECK-POINTING, NAVIGATIONAL SYSTEM FOR AN AIRBORNE VEHICLE

[75] Inventors: Gregory W. Evans, Whittier; James E. Paul, Anaheim, both of Calif.

[73] Assignee: Rockwell Internation Corporation, El Segundo, Calif.

[21] Appl. No.: 799,423

[22] Filed: May 23, 1977

[51] Int. Cl.² .............................................. G01S 9/02
[52] U.S. Cl. .............................................. 343/5 MM
[58] Field of Search .................................. 343/5 MM

[56] References Cited

U.S. PATENT DOCUMENTS

| | | | |
|---|---|---|---|
| 3,472,469 | 10/1969 | Evans et al. | 343/5 MM X |
| 3,742,495 | 6/1973 | Diamantides | 343/5 MM |
| 3,879,728 | 4/1975 | Wolff | 343/5 MM |
| 3,974,328 | 8/1976 | Thomas et al. | 343/5 MM X |

FOREIGN PATENT DOCUMENTS 1409448  10/1975  United Kingdom ............... 343/5 MM

*Primary Examiner*—T. H. Tubbesing
*Attorney, Agent, or Firm*—L. Lee Humphries; H. Frederick Hamann; Rolf M. Pitts

[57] ABSTRACT

An autonomous navigational system for an airborne vehicle is disclosed which automatically updates its position and heading coordinates at each of a plurality of checkpoints along a preselected flight path. Prestored in a memory of the navigational system is a plurality of reference map images respectively associated with the plurality of checkpoints. Each reference map image is comprised of a plurality of terrain features associated with the terrain about an associated checkpoint. In operation, an acquisition unit senses an image of local terrain at each checkpoint. The relative sizes of reference and sensed map images vary with the mission requirements. A terrain feature extractor detects a plurality of terrain features contained in the sensed map image. The detected terrain features in the sensed map image are selectively matched in a feature pattern matcher against the terrain features of the associated reference map image to determine the position and orientation of the sensed map image within the associated reference map image. The output of the feature pattern matcher comprises error signals which are used by an inertial guidance system to update the position and heading coordinates of the airborne vehicle.

6 Claims, 38 Drawing Figures

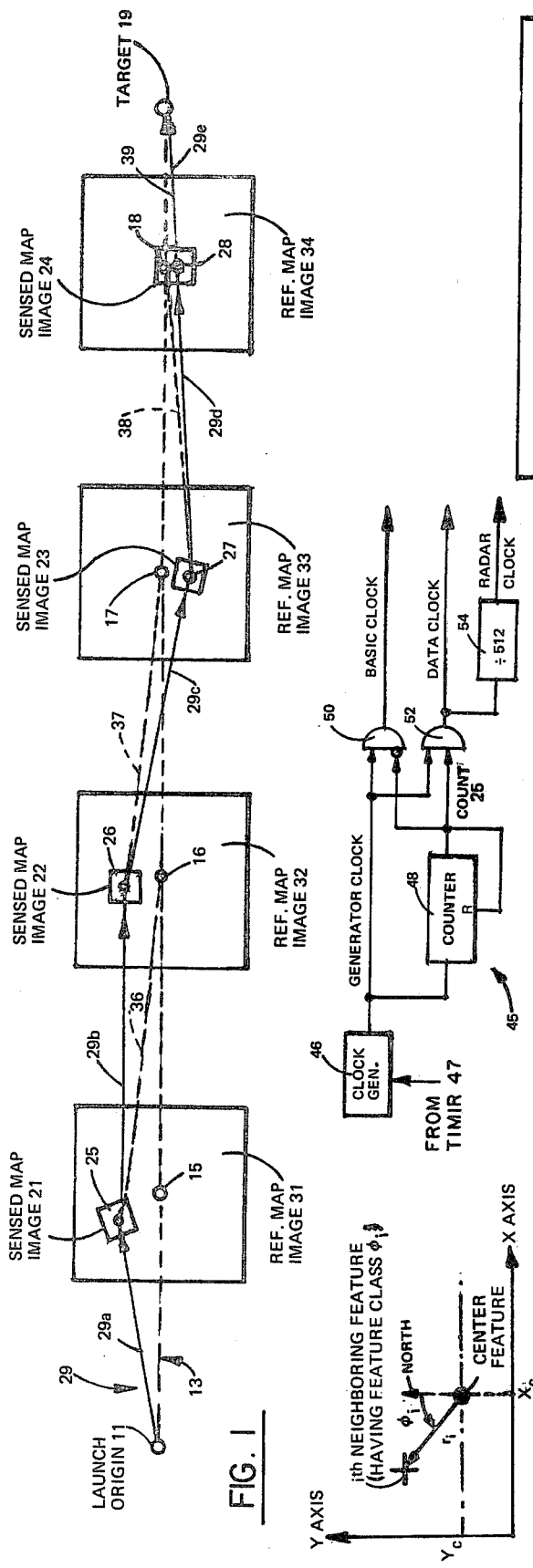
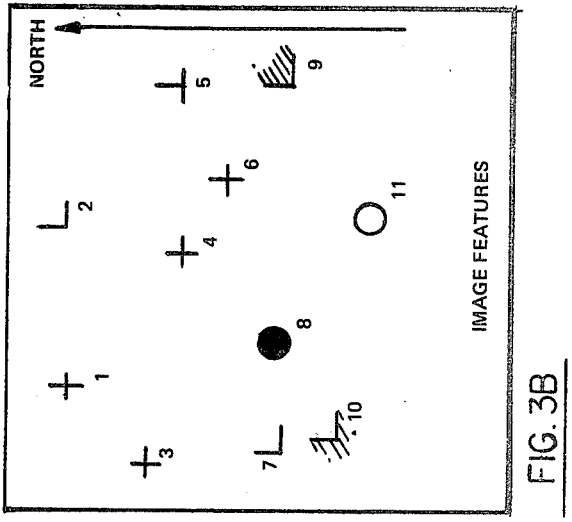

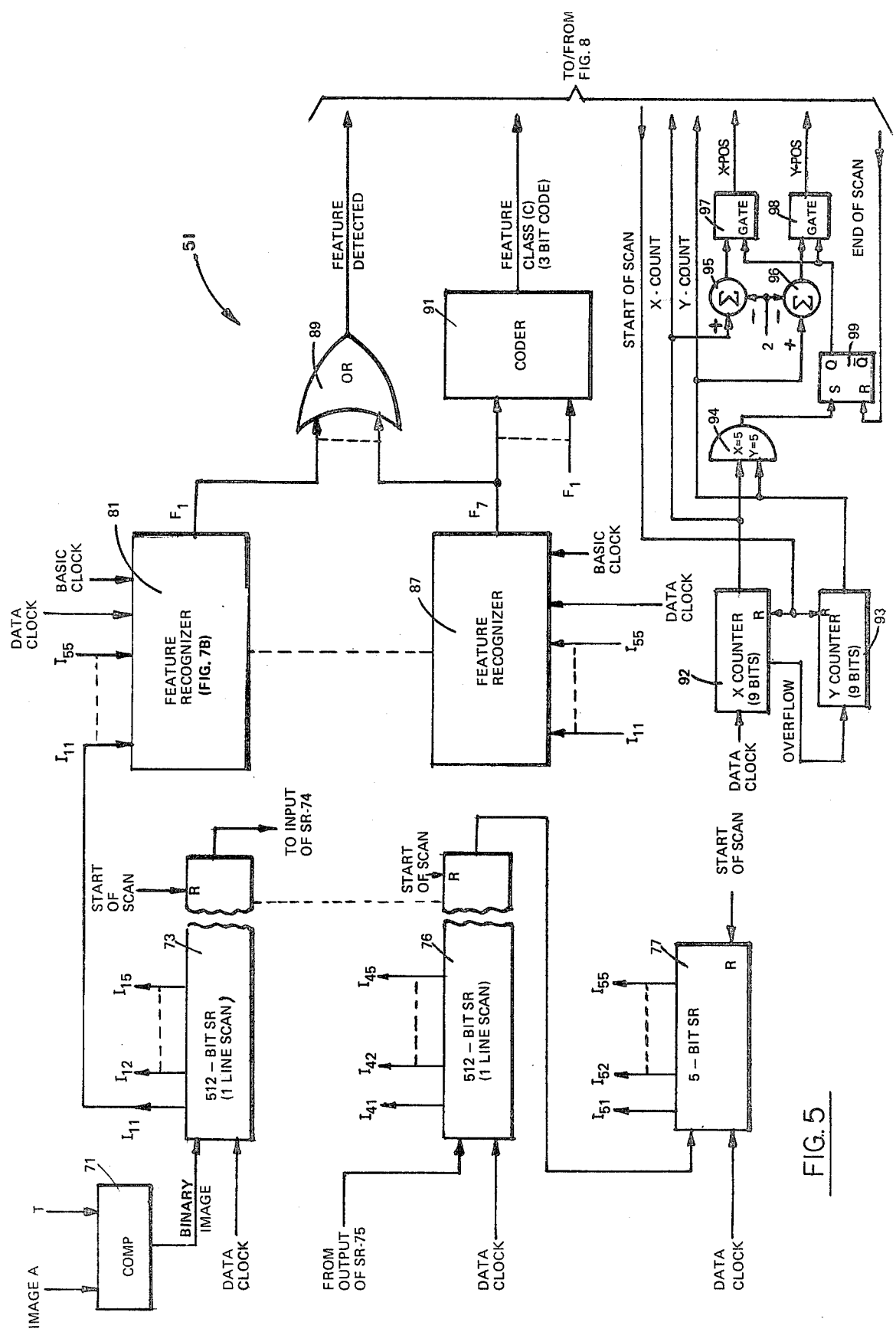

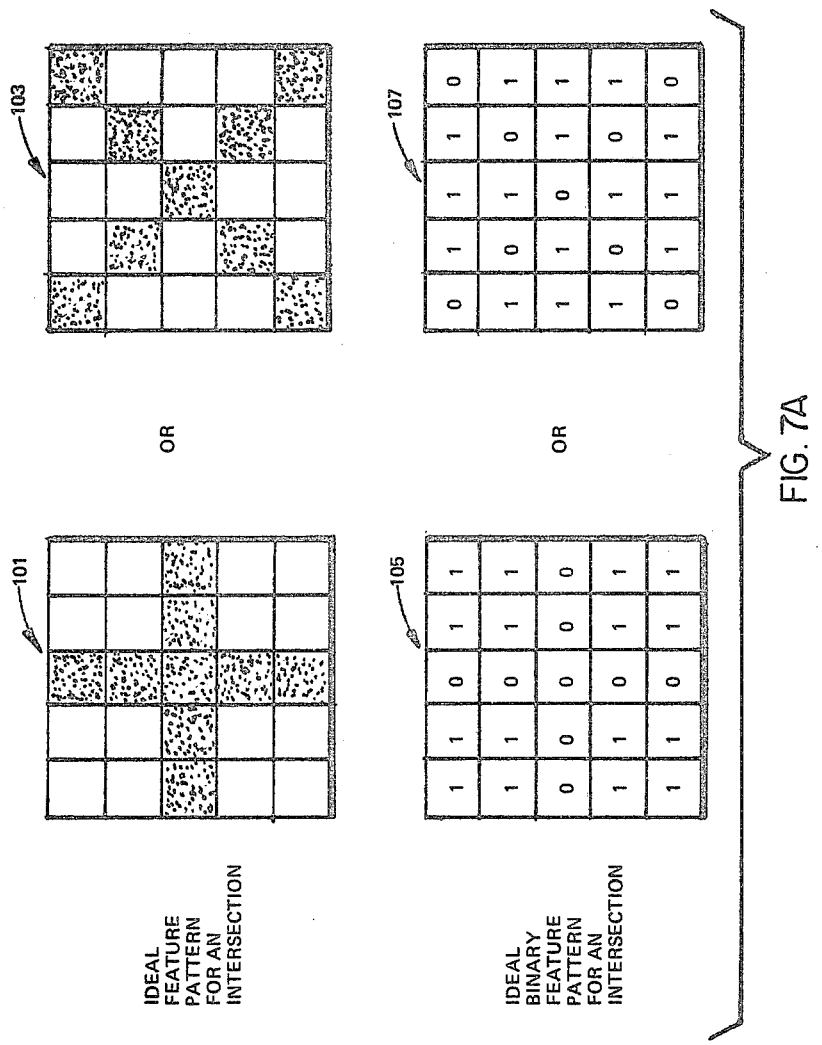

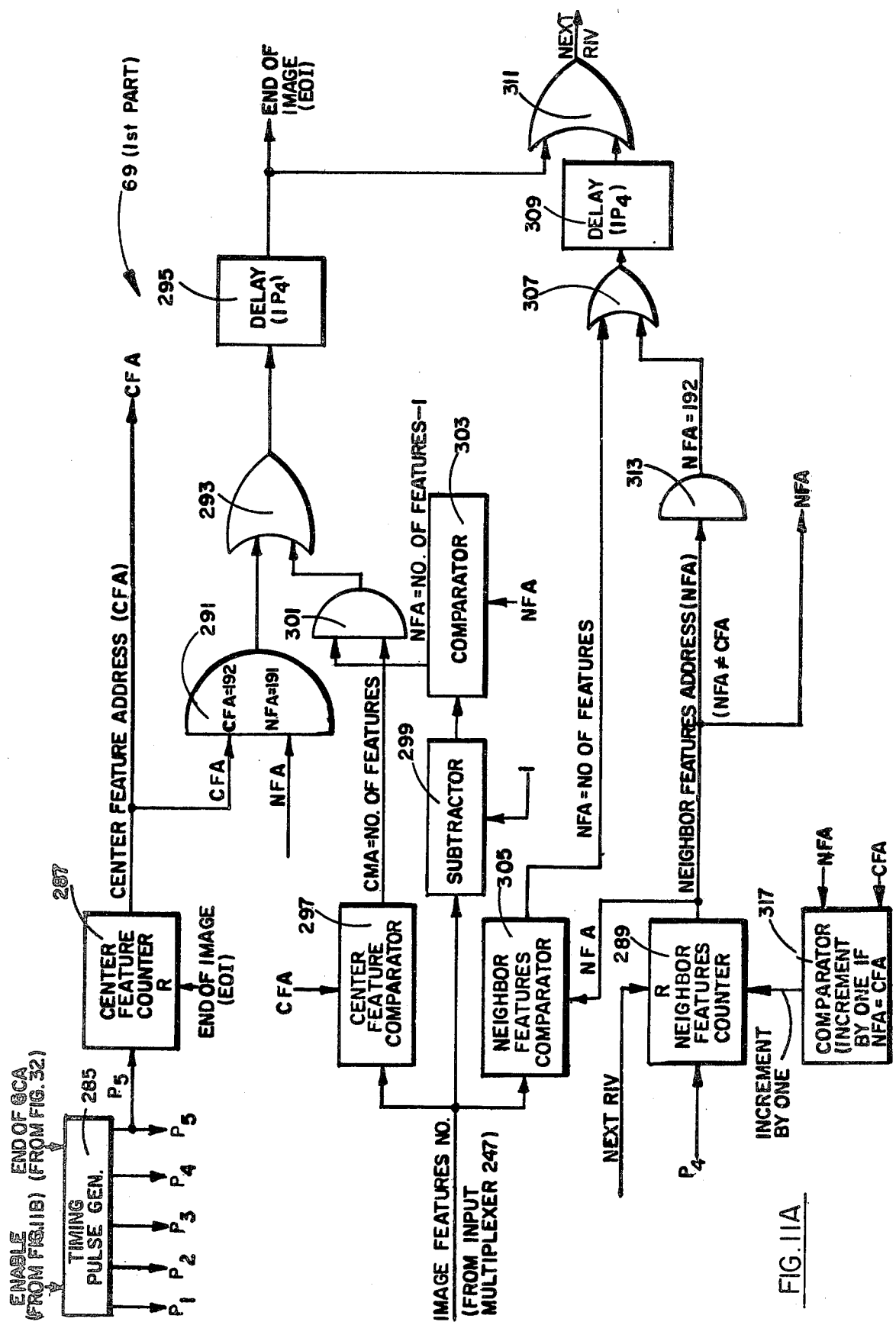
FIG. IIA

RIV NEIGHBORHOOD

CENTER FEATURE 4: $X_4, Y_4, C_4$

RADIALLY SORTED
NEIGHBOR FEATURES

FEATURE 6: $(X_6, Y_6, C_6)\ r_1, \phi_1, C_1$
FEATURE 2: $(X_2, Y_2, C_2)\ r_2, \phi_2, C_2$ } RIV OF FEATURE 4
FEATURE 8: $(X_8, Y_8, C_8)\ r_3, \phi_3, C_3,$

RIV OF FEATURE 4

AUTONOMOUS, CHECK-POINTING, NAVIGATIONAL SYSTEM FOR AN AIRBORNE VEHICLE

The invention herein described was made in the course of or under a contract or subcontract thereunder with the United States Air Force.

BACKGROUND OF THE INVENTION

1. Field of Invention

This invention relates to navigational systems and particularly to an autonomous navigational system for an airborne vehicle, which system selectively matches terrain features in a sensed map image with those in an associated one of prestored reference map images in order to obtain position updating information for the vehicle at each checkpoint along a preselected flight path.

2. Description of the Prior Art

Pilotless, self-guided, continuously-powered airborne vehicles, such as unmanned spacecraft and cruise missiles, can be employed to perform a wide variety of commercial and military functions. These functions may be geological, geographical, geophysical and military in nature, such as aerial photography, radar mapping, land surveys, mineral exploration, aerial reconnaissance, aerial transportation, and the destruction of a remote target with an expendable missile.

Such pilotless vehicles can be utilized to perform many of the above functions at less expense and with more safety than by using manned aircraft. This is particularly true where vehicle weight has to be minimized or where the environment might be hostile to a pilot due to rugged terrain, weather conditions and enemy-held territory.

A long-range pilotless vehicle utilizes an inertial guidance system for guiding the vehicle along its preselected flight path. An inertial guidance system may comprise three or more accelerometers mounted on gyroscope-stabilized platforms. The inherent drift in an inertial guidance system may cause the vehicle to drift a kilometer or so off course for each hour of the vehicle's flight. Weather conditions and any performance changes in the vehicle's propulsion system can further increase the vehicle drift. Guidance errors caused by changes in weather conditions or in the vehicle's propulsion system, as well as by the inherent drift in the inertial guidance system, accumulate with time. Thus, without in-flight position-correction, deviations of the vehicle from its flight path can result in a very large cumulative error in the vehicle's position over a long flight path. For example, after several hours of flight the vehicle could drift off course by, for example, ten kilometers. To compensate or correct for such errors in the position of the vehicle, the vehicle must also have the capability of periodically determining its actual in-flight position in order to update its inertial guidance system to substantially return the vehicle to its intended course.

Three different systems have been proposed for periodically determining the actual position of a long-range pilotless vehicle while it is in flight. These three proposed systems are discussed by Kosta Tsipis in his article "Cruise Missiles," Scientific American, Volume 236, Number 2, February 1977, pages 20–29. These three proposed systems are respectively called:

(1) the global-positioning satellite system,
(2) the terrain-contour-matching system, and
(3) the area-correlation system.

Essentially, each of these proposed systems computes the actual position of the vehicle in some manner and uses the difference between the vehicle's actual and intended positions to update the position coordinates of the vehicle. The velocity of the vehicle can also be changed as a function of these updated position coordinates to aid the vehicle in reaching its next checkpoint at the intended time.

The global positioning satellite system, when developed, will comprise 24 satellites in polar orbits positioned so that at least four of the satellites can be seen from any place on Earth. Passive equipment in the pilotless vehicle will compute the vehicle's actual position from satellite orbit information and the arrival times of synchronous coded signals received from the satellites that are in sight of the vehicle.

This global-positioning satellite system requires an extensive amount of equipment to be independently located at long distances from the pilotless vehicle and is essentially a time-measurement scheme for locating the actual position of the vehicle.

The terrain-contour-matching system pre-stores in a memory a set of digital maps, with each pre-stored map encompassing a different ground area along the intended flight path of the vehicle. Each large ground area is divided into smaller ground areas. Recorded in each smaller ground area of a map is a number representing the average elevation of the ground in that smaller ground area. The vehicle further includes a down-looking radar altimeter, which is capable of resolving objects on the ground that are smaller than the smaller ground areas in a pre-stored map. As the pilotless vehicle approaches ground terrain for which the memory has a map, the radar altimeter provides ground elevation data of a map area of local terrain smaller than that of the associated pre-stored map. An on-board computer compares the incoming ground elevation data with the pre-stored elevation data in the associated map to determine the actual position of the vehicle.

As described above, the terrain-contour-matching system matches the average elevations of ground in the smaller ground areas of a pre-stored map with ground elevation data provided by the radar altimeter. As a result, the larger the area encompassed by a smaller ground area, the greater the likelihood that the system will compute an erroneous actual location for the vehicle. To increase the accuracy of locating the vehicle's actual position, these smaller ground areas should be relatively small. However, if they are made too small, such that a large ground area contains a large number of small ground areas, the system becomes much more complex, heavier and more costly to implement. In addition, the vehicle may have to fly closer to the ground, or a higher resolution radar altimeter may be required, in order to produce higher resolution elevation data for matching purposes. Another disadvantage of this terrain-contour-matching system is that it will not properly operate over relatively flat terrain. As stated on page 23 of the above-identified article "the terrain-matching technique works well only over rough, hilly ground."

The area-correlation system, which is similar to the terrain-contour-matching system, periodically maps the microwave reflectivity of the local terrain that the vehicle is flying over and matches the signals from that local terrain with data from an associated one of pre-stored terrain maps to determine the vehicle's actual position.

Each mapped local terrain is only part of an associated pre-stored terrain map. Page 23 of the above-cited article states that the area-correlation approach "is still in the research stage" but that "(t)his approach is possible because features such as lakes, rivers, roads, railroads and other man-made structures offer sharp 'contrast edges' over a large portion of the spectrum."

None of these navigational systems are known to specifically store terrain features of terrain maps in memory, develop terrain features from the sensed local map image, and selectively compare terrain features of the sensed local and stored map images to determine actual position.

SUMMARY OF THE INVENTION

An autonomous navigational system is disclosed for an airborne vehicle. In a preferred embodiment, the navigational system selectively matches terrain features extracted from a sensed portion of ground terrain against the terrain features of an associated one of pre-stored maps of ground areas along a preselected flight path for the vehicle in order to automatically update the position and heading coordinates of the vehicle at each of a plurality of checkpoints along the preselected flight path.

It is therefore an object of this invention to provide an improved, check-pointing navigational system for a pilotless airborne vehicle.

Another object of this invention is to periodically update the position coordinates of a pilotless vehicle at each checkpoint along the flight path of the vehicle by automatically determining the location of a sensed local feature pattern of a portion of a large ground area within an associated pre-stored feature pattern of that large ground area.

Another object of this invention is to provide an improved navigational system for periodically providing updated position information by selectively matching the terrain features in a sensed feature pattern of local terrain with those of a pre-stored reference feature pattern of a large ground area which includes the sensed local terrain.

Another object of this invention is to determine the location of an associated one of a plurality of prestored reference map images within a map image sensed at each of a plurality of checkpoints along a preselected flight path of a pilotless vehicle.

A further object of this invention is to provide a navigational system which develops position updating signals by computing the relative position of a sensed feature pattern within an associated pre-stored feature pattern which includes the sensed feature pattern.

BRIEF DESCRIPTION OF THE DRAWINGS

These and other objects, features, and advantages of the invention, as well as the invention itself, will become more apparent to those skilled in the art in the light of the following detailed description taken in consideration with the accompanying drawings wherein like reference numerals indicate like or corresponding parts throughout the several views and wherein:

FIG. 1 illustrates sensed and reference map images at each of a plurality of checkpoints along the actual flight path of a pilotless airborne vehicle;

FIG. 2A is a block diagram of the radar clock generator of FIG. 2;

FIG. 3A illustrates exemplary classes of features which can be used in the invention;

FIG. 3B illustrates the feature classes of FIG. 3A in an exemplary sensed map image of local terrain;

FIG. 4 illustrates the relative information vector parameters $r_i$, $\phi_i$, $C_i$ of the ith neighboring feature of a center feature having coordinates $X_c$, $Y_c$, and feature class $C_c$;

FIG. 5 is a block diagram of the image A feature classifier of the terrain extractor of FIG. 2;

FIG. 6 illustrates a pattern useful in explaining the image A feature classifier of FIG. 5;

FIG. 7A illustrates feature patterns for an intersection;

FIGS. 11A and 11B, together form the timing and control unit of FIG. 2;

DESCRIPTION OF THE PREFERRED EMBODIMENT

Figure 2:
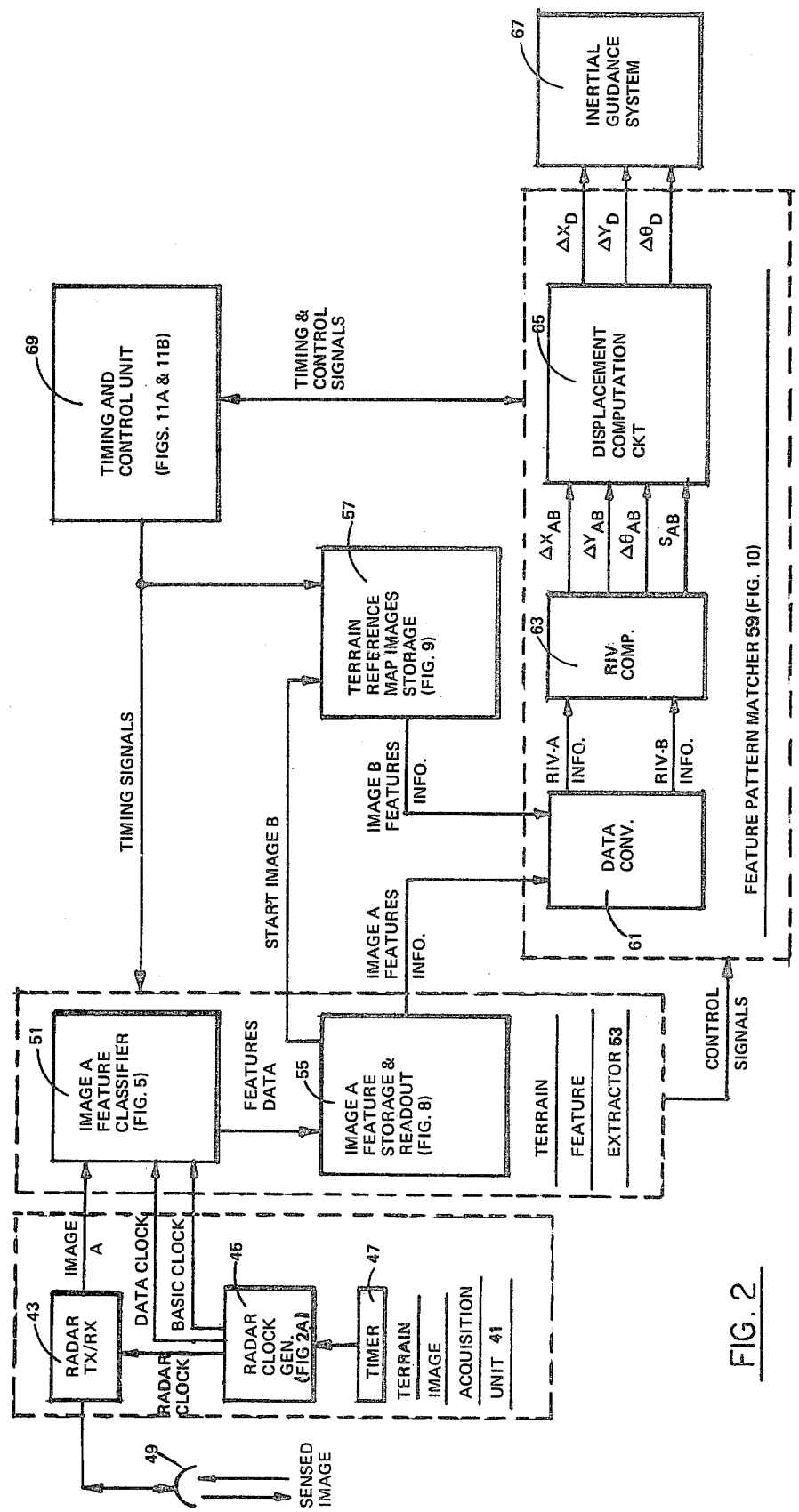
FIG. 2 is a block diagram of a preferred embodiment of the invention.

Referring now to FIG. 1 of the drawings, in one exemplary operation it may be desired to launch a pilotless vehicle (not shown), such as missile, from an origin 11 and have that missile proceed along a preselected flight path 13 (designated by a heavy dashed line) which passes through desired position points 15-18 at the end of, for example, 1, 2, 3 and 4 hours, respectively, of flight time before arriving at a target or final position 19. However, as discussed before, guidance errors, produced by weather conditions, changes in the missile's propulsion system and/or by the inherent drift in the inertial guidance system (FIG. 2) of the missile, cause the missile to drift further and further off the preselected flight path 13 as a function of time.

To periodically correct for such missile drift, a sequence of map images 21 through 24 of local terrain, over which the missile is flying, are sensed at hourly checkpoints 25-28 along the actual flight path 29 of the missile. The actual flight path 29 is illustrated in FIG. 1 as being comprised of line segment 29a (between origin 11 and checkpoint 25), line segment 29b (between checkpoints 25 and 26), line segment 29c (between checkpoints 26 and 27), line segment 29d (between checkpoints 27 and 28), and short line segment 29e (between checkpoint 28 and target 19).

Pre-stored in equipment (FIG. 2) on board the missile is a set of reference map images 31-34 of large ground areas that are respectively centered at the desired position points 15-18. Each of the reference map images 31-34 comprises the terrain features of a corresponding large ground area that includes the terrain features of the associated sensed map image and that is, for example, 100 times greater in ground area than that of the included sensed map image. The relative sizes of reference and sensed maps may vary with the specific mission requirements. Conceivably the sensed image may contain the reference image in some applications. The pattern matcher 59 is not affected, however, by the relative sizes of the reference and sensed maps.

At each of the checkpoints 25-28, the equipment on board the missile develops a corresponding one of the sensed map images 21-24 of ground terrain that the missile is flying over. The equipment then extracts the pattern of terrain features from the sensed map image and computes the relative position of the feature pattern of the sensed map image within the feature pattern of the associated reference map image. By this means the equipment computes position updating signals to develop a corrected flight path between the checkpoint and the following desired position point. For example, the corrected flight path that is computed at checkpoint 25 is plotted between checkpoint 25 and desired position point 16, as shown by dashed line segment 36. However, missile drift, as discussed before, puts the missile on actual flight path segment 29b. In a like manner, corrected flight paths are respectively computed at checkpoints 26-28, as illustrated by line segments 37-39. It should be noted that the last checkpoint 28 on the actual flight path 29 is relatively close to the target 19. For this reason there is so little missile drift on the last actual flight path segment 29e that the corrected flight path segment 39 is substantially coincident with segment 29e.

Referring to FIG. 2, the block diagram of the autonomous, checkpointing, navigational system of the invention will now be discussed. A terrain image acquisition unit 41 is utilized at each of the checkpoints 25-28 in FIG. 1 to sense a map image of the local terrain over which the pilotless airborne vehicle or missile is flying. For purposes of this discussion, let the acquisition unit 41 be a radar set, such as a synthetic aperture radar with a 20-foot resolution. Basically, the unit 41 may comprise a radar transmitter/receiver (TX/RX) 43, a radar clock generator 45 and a timer 47.

Referring now to FIG. 2A, an exemplary radar clock generator 45 is illustrated. A clock generator 46 feeds generator clocks to a counter 48 and to the upper inputs of AND gates 50 and 52. The output of the counter 48 is commonly applied to the lower inputs of AND gates 50 and 52, with the lower input of AND gate 50 being an inverting input.

Assume that the counter 48 has just been reset to a 0 count. From the time that the counter 48 is reset until it has counted 25 generator clocks, the output of the counter 48 is a 0 state signal which disables AND gate 52 and enables AND gate 50 to pass 25 generator clocks as basic clocks. When the count of the counter 48 reaches 25, the counter 48 generates a 1 state "count 25" output signal. This "count 25" signal disables AND gate 50 and enables AND gate 52 to pass one generator clock as a data clock. The trailing edge of the "count 25" signal is used to reset the counter 48 to a 0 count, which the counter 48 holds for one generator clock period. Thus, out of every set of 26 consecutive generator clocks, AND gate 50 passes the first 25 as basic clocks and AND gate 52 passes the 26th as a data clock. The data clock is counted down by a "divide by 512" ($\div 512$) countdown circuit 54 to develop the radar clock.

Referring back to FIG. 2, at each of preselected times (e.g., each hour after missile launch) the timer 47 enables the radar clock generator 45 to generate the basic, data and radar clocks. The radar clocks are applied to the radar TX/RX 43. In response to these radar clock pulses the transmitter portion (not shown) of the radar TX/RX 43 sends pulses to a downward looking antenna 49 which scans the ground terrain over which the missile is flying. The pattern of this ground scanning can be, for example, like that of a TV raster scan. As a result, a scanned two-dimensional sensed image of the ground terrain is returned to the antenna 49. The sensed image is detected and quantized by the receiver portion (not shown) of the radar TX/RX 43 and applied as a sensed image A to an image A feature classifier 51 in a terrain feature extractor 53, which extractor also includes an image A feature storage and readout circuit 55. The sensed image A is, for example, comprised of a quantized data stream of 512 line scans, with 512 pixels per line scan. The purpose of the terrain feature extractor 53 is to detect special terrain feature patterns in the sensed image A and to apply the coordinates (X and Y) and class (C) of each detected pattern to a feature pattern matcher 59.

The basic and data clocks from the clock generator 45 are used by the feature classifier 51 to detect and develop features data from terrain features in the sensed image A. The feature data from a detected terrain feature comprises the geographical position (longitude X and latitude Y) and type or class (C) of that detected terrain feature (F).

Recognizable terrain features of various kinds or classes are present in each of the sensed and reference terrain map images. This is due to the fact that a terrain map image is comprised of a pattern of lines which, for example, intersect (e.g., intersections of streets, roads and railroad tracks), terminate (e.g., dead ends and terminals of roads and railroad tracks), change direction (e.g., sharp road turns, field corners), and divide up into two lines (e.g., road forks). In addition, a terrain map image also contains contrasting dark and light portions of ground terrain, such as a dark spot on a bright background or a bright spot on a dark background. Examples of such terrain feature classes and terrain features detected in a sensed map image A will now be briefly discussed by referring to FIGS. 3A and 3B.

Illustrated in FIG. 3A are examples of the feature classes (C) and associated symbols for seven different types of terrain features (F) that may be used in this invention. As shown in FIG. 3A, each of the seven feature classes is identified by a 3-bit binary number. For example, an intersection (road, train, etc.) is in feature class 1 (001). However, it should be understood that a binary number larger than 3 bits would be utilized when there are more than 8 feature classes to be identified.

FIG. 3B illustrates an exemplary sensed map image A of local terrain which includes detected terrain features from all of the feature classes of FIG. 3. The geographical position of each detected feature in FIG. 3B is defined in terms of the X and Y coordinates of the sensed image. Thus, each detected feature has three components or parameters (X, Y, C) that collectively define the position or location (X, Y) and class (C) of that feature in a rectangular coordinate system. Additional components may be appropriate for particular feature types. The angle with respect to north of a line which bisects a field corner is an example of such a parameter.

The feature classes and relative positions of the terrain features in a sensed map image A form a set of characteristics which can be used to compute the location in the coordinate system of the associated reference map image B of, for example, the center of the sensed map image.

Referring back to FIG. 2, the features data (which comprises the X and Y coordinates of feature position and the feature class C) of each of the features detected in image A is stored in the storage and readout circuit 55. The circuit 55 also counts the number of detected features that it stores. Let the data representing the positions (in the X and Y coordinates of sensed image A), the feature classes (C) and the total number of image A features stored in the circuit 55 be collectively designated as image A features information.

A terrain reference map images storage circuit 57 stores the reference map images 31–34 (of FIG. 1). Each stored reference map image contains data representing the positions (in the X and Y coordinates of that reference map image B), the feature classes (C) and the total number of image B features in that map image. Let the data representing the positions, classes and total number of the image B features in any given reference map image stored in the circuit 57 be collectively designated as image B features information.

The image A features information from circuit 55 and the image B features information from circuit 57 are selectively applied to a feature pattern matcher 59. Essentially the function of the feature pattern matcher 59 is to determine the location and orientation of the feature pattern of a sensed image A within the coordinate system of the feature pattern of the associated reference map image B.

Once the three parameters (X and Y coordinates and class C) of each feature in the associated sensed and reference map images have been extracted, matching a sensed map image to its corresponding position in an associated reference map image is somewhat like sliding the feature pattern of the sensed image over the feature pattern of the reference image, while looking for a best fit.

However, weather conditions, time of day and operational limitations and defects in the terrain image acquisition unit 41 (FIG. 2) can alter the appearance of a map image. As a result, the feature pattern in a sensed map image A may never perfectly match its corresponding portion of the feature pattern in an associated reference map image B. For example, a perfect match between map images may never be found because of, for example, false, missing or distorted features in either or both of the sensed and reference map images.

Even though the feature pattern of the sensed image may not perfectly match its corresponding portion of the feature pattern in an associated reference map image, they can be considered to match each other if they match sufficiently closely. As a result, the feature pattern matcher 59 is implemented to automatically determine how each and every little region of the sensed map image matches with each and every little region of the associated reference map image and then put all these interim results together in a different space (something like the time domain versus frequency domain) to obtain a global or overall picture. By this means the feature pattern matcher 59 automatically determines whether or not the feature pattern in the sensed map image is sufficiently similar to a portion of the feature pattern of the reference map image to constitute a match.

A "relative information vector" or RIV is a mathematical description of the spatial relationships of the feature pattern in the neighborhood of a particular feature. An RIV is generated for each feature of the two map images to be matched. The feature for which an RIV is generated is called the "reference" or "center" feature for that RIV. More specifically, an RIV describes the relative position (r, $\phi$) in polar coordinates and feature class (C) for each one of a number of features in a map image with respect to the center feature of that RIV. The three parameters, r, $\phi$ and C of this relative position may be defined as follows:

$r_i$ = the distance between the center feature and the ith neighbor or neighboring feature of that RIV, $\phi_i$ = the angle with respect to north (i.e., the Y axis) of the line representing $r_i$, and $C_i$ = the feature class of the ith neighboring feature. Pursuant to the above definitions, the RIV parameters $r_i$, $\phi_i$ and $C_i$ of the ith neighboring feature are illustrated in FIG. 4 for a center feature with coordinates $X_c$ and $Y_c$.

The feature pattern matcher 59 includes a data converter 61, an RIV comparator 63 and a displacement computation circuit 65.

In operation, after the completion of the terrain scanning for the sensed image A, the image A features information is read out of the circuit 55 and applied to the data converter 61. The data converter 61 sequentially transforms the image A features information (in X, Y, C format) into a relative information vector (RIV) format, similar to that illustrated in FIG. 4 in order to develop RIV-A information.

After all of the image A features information has been read out of the circuit 55 for RIV encoding by the data converter 61, the circuit 55 applies a "start image B" signal to the terrain reference map images storage circuit 57. In response to this start image B signal, the storage circuit 57 reads out the image B features information of the reference map image associated with the present checkpoint. For example, reference map image 31 is associated with checkpoint 25, as shown in FIG. 1. This image B features information is sequentially transformed by the data converter 61 into a relative information vector (RIV) format, similar to that illustrated in FIG. 4, in order to develop RIV-B information. Thus, the data converter 61 RIV-formats the image A features information before the image B features information.

It should be noted that the system of FIG. 2 could be modified within the purview of the invention to include two data converters similar to the data converter 61. In this way A and image B features information could be RIV-formatted at the same time by the two data converters, respectively. Alternatively, the prestored image B features information could be converted to an RIV format before the conversion of image A. This sequence allows the RIV comparator 63 to begin its operation immediately upon receipt of the real time sensed image data.

The RIV-A and RIV-B information signals are selectively applied from the data converter 61 to the RIV comparator 63. The RIV comparator 63 compares each RIV (RIV-A) in the RIV-A information with each RIV (RIV-B) in the RIV-B information and generates a match score ($S_{AB}$) for each RIV pair comparison to indicate the closeness of match of that RIV pair. In addition, the RIV comparator 63 generates RIV displacement signals ($\Delta X_{AB}$, $\Delta Y_{AB}$, $\Delta \theta_{AB}$) to indicate the displacement in position and angular rotation between the A and B RIVs in the RIV pair being compared.

The match score ($S_{AB}$) and RIV displacement signals ($\Delta X_{AB}$, $\Delta Y_{AB}$, $\Delta \theta_{AB}$) for each compared RIV pair are applied to the displacement computation circuit 65. The displacement computation circuit 65 analyzes the set of RIV match scores and their associated RIV displacement signals from a global viewpoint in order to compute and apply updated displacement coordinates ($\Delta X_D$, $\Delta Y_D$, $\Delta \theta_D$) to an inertial guidance system 67 of the missile. The updated displacement coordinates correspond to the relative displacement in the position of and rotation about the centers of the coordinate systems of the associated A and B map images. These updated displacement coordinates enable the inertial guidance system 67, in a manner well known in navigational guidance systems, to provide a corrected flight path (such as 36 of FIG. 1) to put the missile back on course.

For proper system timing, a timing and control unit 69 selectively supplies timing and control signals to the terrain feature extractor 53, the terrain reference map images storage 57 and the feature pattern matcher 59. The feature pattern matcher 59 also receives control signals from the circuit 55 in the terrain feature extractor 53.

Referring now to FIG. 5, a block diagram of the feature classifier 51 of FIG. 2 is illustrated. It will be recalled that the quantized image A from the radar TX/RX 43 was stated to be an exemplary data stream of 512 line scans, with 512 pixels per line scan. The pixel data in this quantized data stream is sequentially compared against a preselected threshold value T in a comparator 71 to develop a serial binary data bit stream, or binary image of the sensed terrain.

The binary data bit stream, or binary image, from the comparator 71 is serially clocked through a sequence of shift registers 73–77 by the data clock from clock generator 45 (FIG. 2). Each of the shift registers 73–76 is 512 bits in length, corresponding in length to one complete line scan of image data. The remaining shift register 77 is only 5 bits in length.

Let the first five bits of each of the respective registers 73–76 and the five bits of register 77 be respectively designated as $I_{11}$, $I_{12} \ldots I_{15}$; $I_{21}$, $I_{22} \ldots I_{25}$; $I_{31}$, $I_{32} \ldots I_{35}$; $I_{41}$, $I_{42} \ldots I_{45}$; and $I_{51}$, $I_{52} \ldots I_{55}$, as shown in FIG. 5. The five 5-bit signals of the registers 73–77 form a 5 by 5-bit scanning window 79 (illustrated in FIG. 6), which scans by 25-bit sampled areas of the binary image data at the output of the comparator 71 one bit at a time. The window 79 therefore contains bit stream information corresponding to a 25-bit sample of five adjacent bits per line on five adjacent lines. Timed with the data clocks, the 5 by 5 window 79 effectively scans along the two-dimensional sensed image A one bit by one bit to the end of the line, shifts to the next line and scans along that line, and repeats this operation for each line until the entire sensed image A has been scanned.

The 25 bits ($I_{11} \ldots I_{55}$) in the window (FIG. 6) are parallel-applied to each of a plurality of feature recognizers 81–87. Each of the feature recognizers 81–87 is implemented to develop a 1 state feature (F) output when it recognizes or detects within the window 79 a feature in an associated one of the seven feature classes illustrated in FIG. 3A. For example, feature recognizer 81 is implemented to develop a 1 state $F_1$ output when it recognizes an "intersection" terrain feature (feature class 1, FIG. 3A). Similarly, feature recognizer 82 is implemented to develop a 1 state $F_2$ output when it recognizes a "dead end" terrain feature (feature class 2, FIG. 3A).

No more than one feature in these seven feature classes can be detected in the window 79 at any given time. When no feature in the seven feature classes of FIG. 3A is detected, $F_1$–$F_7$ are all 0 state signals.

The $F_1$–$F_7$ outputs from feature recognizers 81–87 are applied in parallel to an OR gate 89 and to a coder 91. When one of the feature recognizers 81–87 recognizes (within the window 79) a feature in its associated feature class, it applies its 1 state output through the OR gate 89 as a "feature detected" signal to indicate that a terrain feature has been detected. In response to the binary states of the $F_1$–$F_7$ outputs, the coder 91 generates the three-bit feature class (C) signal of FIG. 3A, according to the following TABLE 1.

TABLE 1

| $F_1$ | $F_2$ | $F_3$ | $F_4$ | $F_5$ | $F_6$ | $F_7$ | Feature Class (C) |
|---|---|---|---|---|---|---|---|
| 0 | 0 | 0 | 0 | 0 | 0 | 0 | 000 |
| 1 | 0 | 0 | 0 | 0 | 0 | 0 | 001 |
| 0 | 1 | 0 | 0 | 0 | 0 | 0 | 010 |
| 0 | 0 | 1 | 0 | 0 | 0 | 0 | 011 |
| 0 | 0 | 0 | 1 | 0 | 0 | 0 | 100 |
| 0 | 0 | 0 | 0 | 1 | 0 | 0 | 101 |
| 0 | 0 | 0 | 0 | 0 | 1 | 0 | 110 |
| 0 | 0 | 0 | 0 | 0 | 0 | 1 | 111 |

At the start of a radar scan to obtain a sensed map image at a checkpoint, a "start of scan" signal (to be explained in FIG. 8) resets all of the stages in the shift registers 73–77 and 9-bit X and Y counters 92 and 93. Data clocks are then applied to the registers 73–77 to start shifting the bit stream of the binary image data through the registers 73–77. Data clocks are also counted by the 9-bit X counter 92 (to be explained).

The bit stream of the binary data image is shifted one bit position at a time through the registers 73–77 by each data clock. In addition, each data clock applies the bits $I_{11} \ldots I_{55}$ in the window 79 (FIG. 6) to each of the feature recognizers 81–87. Basic clocks are also used in the operation of the feature recognizers 81–87.

As mentioned before, the data clocks are also counted by the counter 92. Whenever the count of the X counter 92 reaches 512, the counter resets itself to a zero count and its overflow increments the count of the Y counter 93 by one. Since there are 512 pixels per line scan, the count of the X counter 92 indicates the bit position within a 512-bit line. Since the Y counter 93 increments by one for each line the count of the Y counter indicates the number of completed line scans. The X-count and Y-count outputs of the counters 92 and 93 thus indicate the X and Y locations of the pixels in the sensed binary image A.

As can be seen, the window 79 (formed from the $I_{11} \ldots I_{55}$ outputs of the registers 73–77) takes 2053 bit times to initially fill up. This corresponds to four 512-bit long lines plus five bit positions. At this time (2053 bit times after the start of scan), the X and Y counts of the counters 92 and 93 are 000000101 and 000000100, respectively, indicating that the center of the window 79 is in the third bit position (X=3) of the third line scan (Y=2). It can therefore be seen that when the coordinates of the $I_{55}$ position in the window 79 are $X_T$ and $Y_T$ at any given time T, the coordinates of the center of the window 79, as read out of the counters 92 and 93, are $X_T-2$ and $Y_T-2$.

Whenever a feature of sensed map image A is detected in the window 79 (FIG. 6) by one of the feature recognizers 81–87, the center of that detected feature is located at the center ($I_{33}$) of the window 79. It is therefore useful to develop the X and Y positions of the center of the window 79 at any given time. To accomplish this, the X and Y counts (of counters 92 and 93) are both applied to an AND gate 94 and are also respectively applied to subtractors 95 and 96. The subtractors 95 and 96 subtract a constant of two (2) from each of the X and Y counts. The X and Y counts are each decreased by two (2) since the center bit ($I_{33}$) of window 79 is two full scan lines and two bit positions behind the last bit $I_{55}$ in the window 79. The outputs of the subtractors 95 and 96 are respectively applied to gates 97 and 98. As soon as the X and Y counts reach five and four, respectively, the AND gate 94 develops a 1 state signal to indicate that the window 79 has been initially filled with data bits. This 1 state output sets a flip flop 99 to enable the gates 97 and 98 to start passing X and Y position signals to indicate the center of the window 79 at any time after the window 79 has been initially filled with data bits. After the scanning of the sensed image A has been completed, an "end of scan" signal (to be explained) resets the flip flop 99 to disable the gates 97 and 98.

Thus, in summarizing the operation of the image A feature classifier 51 of FIG. 5, the registers 73–77 store four complete line scans and a part of a fifth line scan of the binary image data from the comparator 71 in order to essentially form in that image data a scanning window 79 which is used by the feature recognizer circuits 81–87 to determine if any of the terrain features of FIG. 3A is present in the window 79. The X and Y counters 95 and 97 generate the X and Y coordinates of the current position of the center of the window 79 within the sensed image A.

It will be recalled that the feature recognizers 81–87 are respectively implemented to recognize the patterns of feature classes 1–7 (001 through 111) of FIG. 3A. Effectively, these feature recognizers 81–87 compare the pattern in the window 79 of FIG. 6 (which scans the binary sensed image A) to pre-stored patterns in order to determine the presence or absence of a terrain feature in the window 79 at each data clock time. To illustrate, the operation of the feature recognizer 81 of FIG. 5 will be now discussed in detail by referring to the pre-stored patterns shown in FIG. 7A for the feature recognizer 81 shown in FIG. 7B.

Figure 7B:
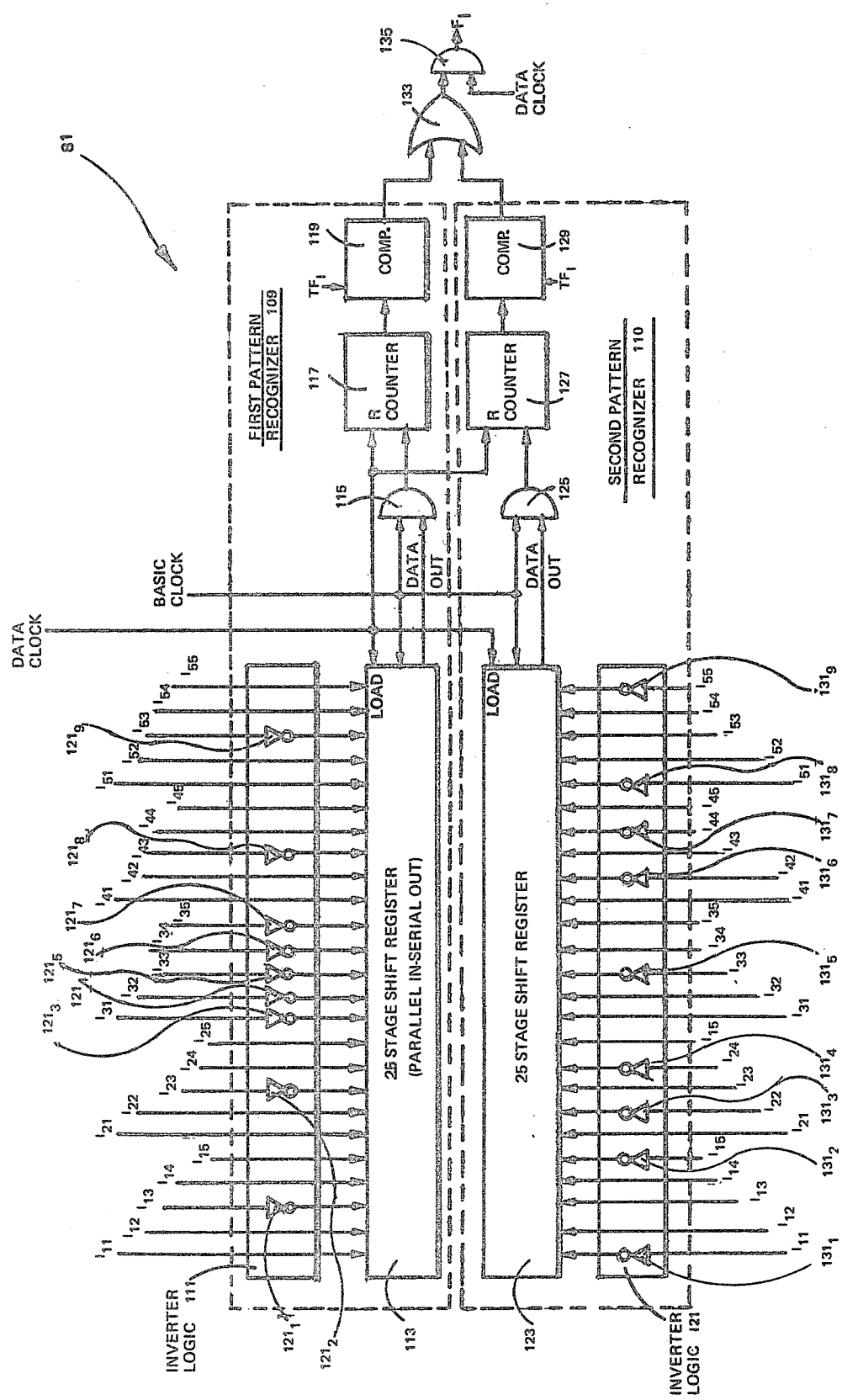
FIG. 7B is a block diagram of a feature recognizer of FIG. 5.

The feature recognizer 81 of FIG. 7B is to be implemented to recognize an intersection, such as the intersection of two streets, roads or railroad tracks. The ideal feature pattern sought for an intersection is shown by either of patterns 101 and 103 in FIG. 7A. FIG. 7A further shows that the ideal binary forms of the patterns 101 and 103 are respectively shown by binary patterns 105 and 107. It is to be noted that, while the binary 0's and 1's of patterns 105 and 107 respectively correspond to the black and white portions of patterns 101 and 103, the reverse of such logic could be used. Thus, for this illustration, the feature recognizer 81 of FIG. 7B is implemented to pre-store both of the binary patterns 105 and 107.

The feature recognizer 81 of FIG. 7B includes first and second pattern recognizers 109 and 110 to respectively recognize the binary feature patterns 105 and 107 of FIG. 7A.

First pattern recognizer 109 is comprised of inverter logic 111, a 25 stage shift register 113, an AND gate 115, a counter 117 and a comparator 119. In operation, the 25 data bits $I_{11} \ldots I_{55}$ from window 79 (FIG. 6) are in parallel to the inverter logic 111. Data bits $I_{13}, I_{23}, I_{31} \ldots I_{35}, I_{43}$ and $I_{53}$ are respectively inverted by logical inverters $121_1 \ldots 121_9$ before being applied to the shift register 113. The remaining ones of the data bits $I_{11} \ldots I_{55}$ are not inverted but are directly applied to the register 113. Thus, the inverter logic 111 is effectively implemented to pre-store the ideal binary feature pattern 105 of FIG. 7A.

The data clock parallel-loads all of the inverted and non-inverted data bits $I_{11} \ldots I_{55}$ into the register 113 and resets the counter 117 to a zero count. The basic clock is used to serially clock the data bits out of the register 113. Each 1 state bit in the data being clocked out of the register 113 enables the AND gate 115 to pass a basic clock to increment the counter 117 by one. After the shift register 113 is empty, the total count of the counter 117 represents the similarity or closeness of the pattern in the window 79 (FIG. 6) to the pattern 105 (FIG. 7A) that is effectively pre-stored in the pattern recognizer 109. For example, when the binary pattern in the window 79 is identical to the ideal binary pattern 105 for an intersection, the inverter logic 111 will invert all of the 0 state data bits $I_{13}, I_{23}, I_{31} \ldots I_{35}, I_{43}$ and $I_{53}$ and the counter 117 will subsequently count to 25. On the other hand, the greater the mismatch between the window 79 pattern and ideal pattern 105, the lower the count of the counter 117.

The count of counter 117 is compared in the comparator 119 with a threshold $T_{F1}$ for feature class 1. The threshold $T_{F1}$ can be set at a level of 23, for example. If the count of the counter 117 equals or exceeds the threshold $T_{F1}$, the comparator 119 generates a 1 state checkpoints 25-28 of FIG. 1 were for illustrative purposes and that more (or less) than four checkpoints can be used.

Each start image B signal increments the count of the map counter 171 by one (1) to develop an image B map address. Each start image B signal also sets a flip flop 177 so that its Q side initiates a ready cycle in a RAM 179 and enables an AND gate 181 to start passing $P_4$ pulses to the counter 175 to be counted. The output count of the counter 175 is the image B map features address which is applied to a comparator 183 and to the RAM 179.

Each image B map address is used to address both a read only memory (ROM) 185 and the RAM 179 in order to identify the particular reference map image that is to be used at any given checkpoint. In response to the map address, the ROM 185 develops an image B features number, which represents the number of terrain features in the reference map being addressed. The image B features number is applied to the comparator 183 and to the data converter 61 (FIG. 10).

The composite of the map address (from counter 171) and features address (from counter 175) forms a RAM address which enables the RAM 179 to read out the image B features data in the associated reference map. It will be recalled that the image B features data is comprised of the position (X, Y) and class (C) of each of the features in the associated map image B. The image B features data being read out of the RAM 179 and the image B features number from ROM 185 are applied to the feature pattern matcher 59 of FIG. 10.

When the image B features address from counter 175 becomes equal to the image B features number from ROM 185, the comparator 183 develops an output which resets the flip flop 177 to terminate the read cycle of the RAM 179 and disables the AND gate 181 to prevent the counter 175 from counting any more $P_4$ pulses for that checkpoint. The output of the comparator 183 is also applied through the OR gate 173 to reset the counter 175. The storage circuit 57 remains in this condition until another start image B signal is generated at the next checkpoint.

Figure 10:
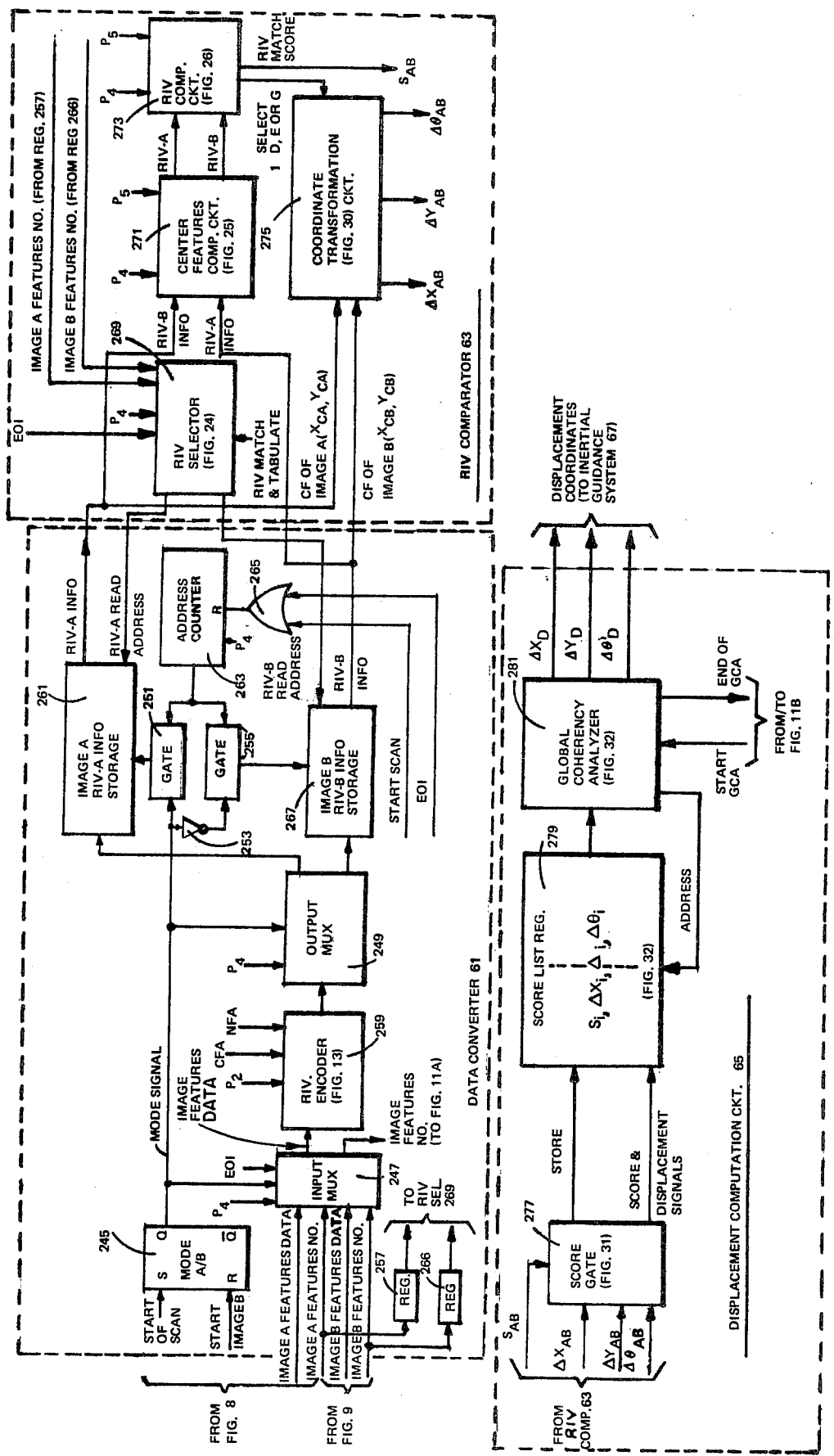
FIG. 10 is a block diagram of the feature pattern matcher of FIG. 2.

Referring now to FIG. 10, a more detailed block diagram of the feature pattern matcher 59 (of FIG. 2) is illustrated. It will be recalled that the feature pattern matcher 59 is comprised of a data converter 61, an RIV comparator 63 and a displacement computation circuit 65.

Basically, the data converter 61 sequentially transforms input features data (in X, Y, C format) from sensed map image A and reference map image B into the relative information vector (RIV) format (see the example of FIG. 4). The data converter 61 selectively receives the start of scan and start image B signals, the image A features number and the image A features data (in X, Y, C format) of sensed image A from storage and readout circuit 55 of FIG. 8. The converter 61 also selectively receives the previously read and stored image B features number and the image B features data of the associated reference map image B from the storage circuit 57 of FIG. 9. By means of a mode A/B flip flop 245, the image A and images B features data of map images A and B (that are to be subsequently compared) are time division multiplexed and RIV encoded before being respectively stored in associated storage circuits.

Initially the data converter 61 receives the start of scan signal which sets the mode A/B flip flop 245 to develop a 1 state mode signal output to enable input and output multiplexers 247 and 249 and gate 251 to operate in an image A mode of operation. This 1 state mode output is also inverted by inverter 253 to disable gate 255 during the image A mode of operation.

Figure 11B:
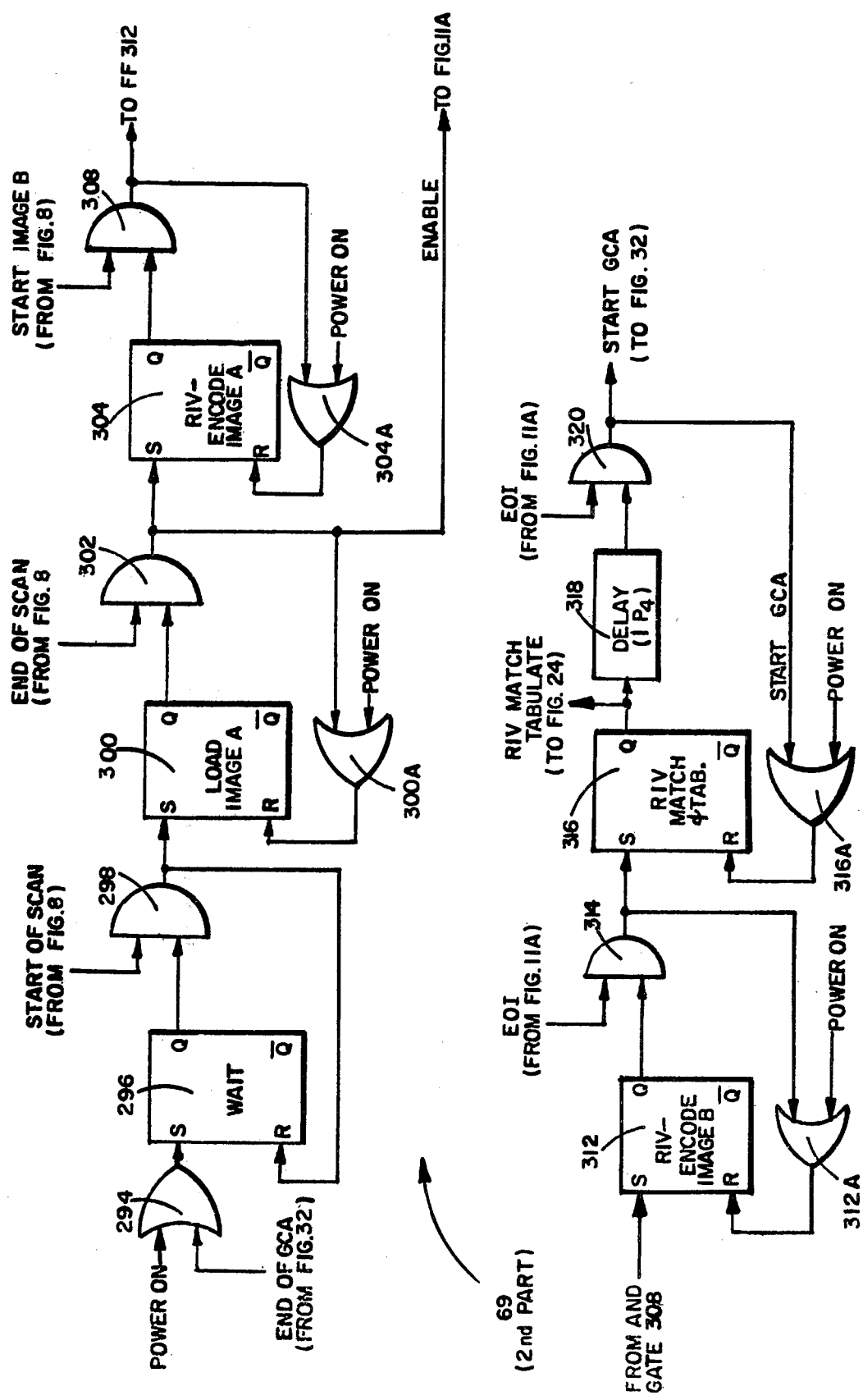

In the image A mode of operation, the image A features number is directly stored in a register 257, while both the image A features data (X, Y, C) and image A features number are passed through the input multiplexer 247 and respectively applied to an RIV encoder 259 and the timing and control unit 69 of FIGS. 11A and 11B (to be explained). The RIV encoder 259 basically performs the function of determining the nearest neighbors for each feature and their relative locations with respect to that feature. Before performing this function, the encoder 259 converts the image A features data into a relative information vector (RIV) format or r, $\phi$ and C (as previously illustrated in FIG. 4). The values of r, $\phi$ and C are generated in parallel by the encoder 259 for each feature with respect to all other features. The RIV encoder 259 also determines the number of features in each RIV (or RIV features number) that it generates. As shown in FIG. 4, the values r and $\phi$ indicate the relative location of a neighboring feature with respect to a center feature, while the parameter C is the feature class of that neighboring feature. The distances r of all features included in the RIV are compared against a threshold $R_T$ before being passed on. Only features within a circle of radius $R_T$ are retained.

From the RIV encoder 259 the thresholded RIV encoded information signals (RIV-A information), which includes each (center) feature and its associated RIV as well as the number of features in its associated RIV (or RIV features number), are passed through the output multiplexer 249 to the input of an image RIV-A information storage circuit 261, which may be a random access memory.

The start of scan signal also resets an address counter 263 to a zero count by way of an OR gate 265. Upon being reset the address counter 263 starts counting $P_4$ clocks to sequentially develop output addresses which are applied to gates 251 and 255. Since only gate 251 is enabled during the image A mode of operation, the addresses from the counter 263 pass through gate 251 to the storage circuit 261. Thus, the image A RIV-A information signals from multiplexer 249 are selectively stored in the addressed locations of the storage circuit 261 during the image A mode of operation.

Figure 8:
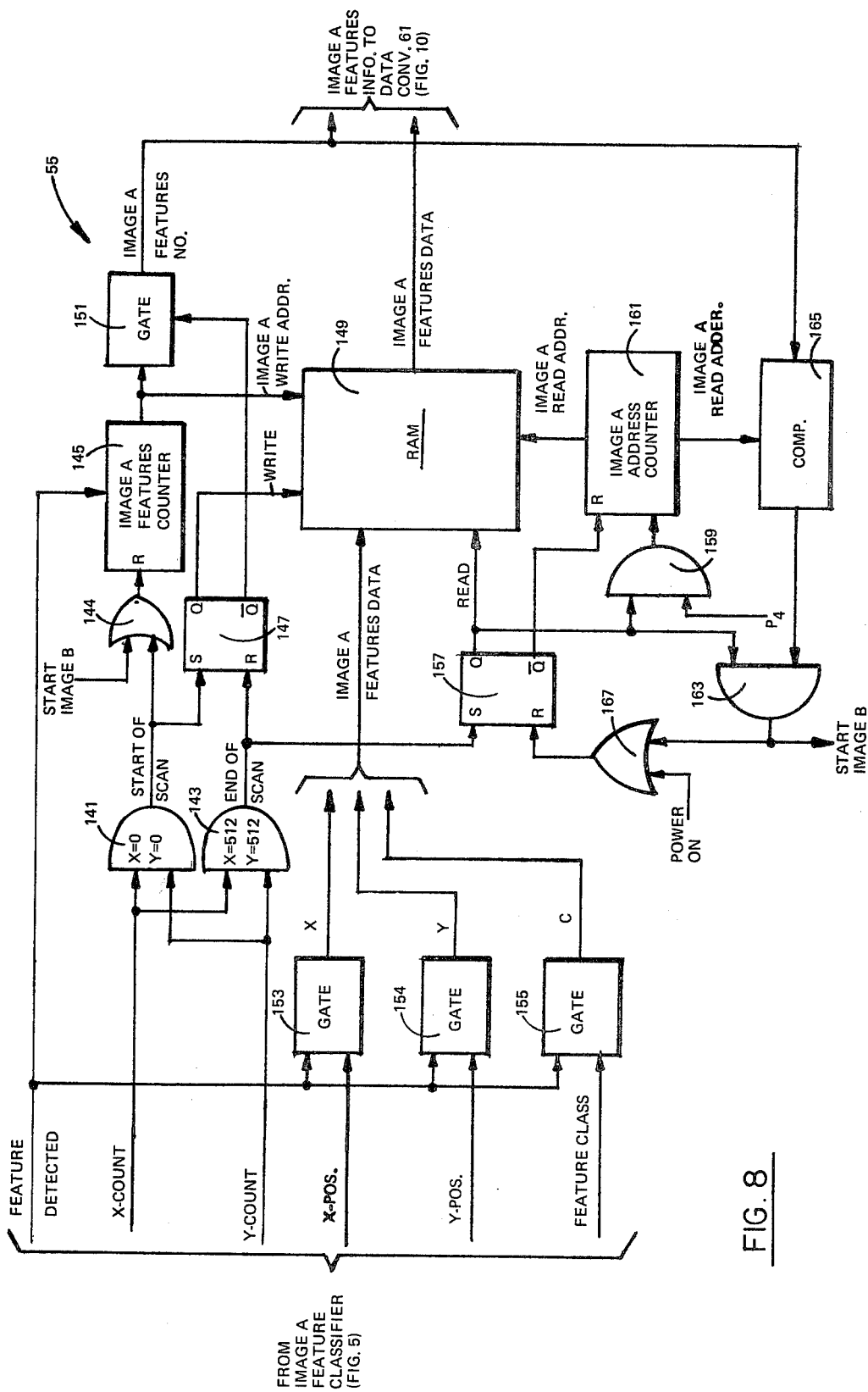
FIG. 8 is a block diagram of the image A features storage and readout circuit of the terrain feature extractor of FIG. 2.

After the image A features data has been RIV encoded by encoder 259 and stored in circuit 261, the start image B signal is received (from FIG. 8). The start image B signal resets the mode A/B flip flop 245 to develop a 0 state mode signal output. This 0 state mode signal output of flip flop 245 disables the gate 251, while enabling the multiplexers 247 and 249 to operate in an image B mode of operation. At the same time the inversion of the 0 state mode signal output of flip flop 245 by the inverter 253 enables the gate 255 to also operate in the image B mode of operation.

In the image B mode of operation, the image B features number from storage circuit 57 (FIG. 9) is directly stored in a register 266, while both the image B features data (X, Y, C) and image B features number are passed through the input multiplexer 247 and respectively applied to the RIV encoder 259 and the timing and control unit 69 of FIGS. 11A and 11B (to be explained). The encoder 259 converts the X, Y, C formatted image B features data into threshold RIV encoded information output to indicate that the pattern of feature class 1 has been detected.

The second pattern recognizer 110 is comprised of inverter logic 121, a 25 stage shift register 123, an AND gate 125, a counter 127 and a comparator 129 which are similar in structure and operation to the elements 109, 111, 113, 115, 117 and 119, respectively, in the first pattern recognizer 109. However, the inverter logic 121 is implemented so that data bits $I_{11}$, $I_{15}$, $I_{22}$, $I_{24}$, $I_{33}$, $I_{42}$, $I_{44}$, $I_{51}$ and $I_{55}$ are respectively inverted by logical inverters $131_1 \ldots 131_9$ before being applied to the shift register 123. The remaining ones of the data bits $I_{11} \ldots I_{55}$ from the window 79 (FIG. 6) are not inverted but are directly applied to the register 123. Thus, the inverter logic 121 is implemented to effectively pre-store the ideal binary feature pattern 107 of FIG. 7A.

The outputs of the comparators 119 and 129 are applied to an OR gate 133. The output of the OR gate 133 is ANDed with the data clock in AND gate 135 to develop a stable 1 state $F_1$ output whenever a feature pattern, acceptably similar to one of the binary patterns 105 and 107, is detected in the window 79. A stable $F_1$ output is developed (as indicated in FIG. 2A) since the data clock occurs after 25 basic clocks have enabled the counters 117 and 127 to count all of the 1 state data bits stored in the registers 113 and 123, respectively.

The feature recognizers 82–87 of FIG. 5 are implemented, similar to the feature recognizer 81 of FIG. 7B, to respectively recognize the remaining feature classes illustrated in FIG. 3A. More particularly, the feature recognizers 82–87 respectively include groups of inverter logic circuits (not shown), similar to the circuits 111 and 121 of FIG. 7B for pre-storing groups of patterns of the feature classes of FIG. 3A. For example, feature recognizer 82 can be implemented to recognize different patterns of the dead end feature of feature class 2 (FIG. 3A) by utilizing eight inverter logic circuits for respectively inverting the following groups of data bits from the window 79 (FIG. 6):

$I_{13}$, $I_{23}$, $I_{33}$ and $I_{41} \ldots I_{45}$; $I_{12}$, $I_{22}$, $I_{32} \ldots I_{35}$, $I_{42}$ and $I_{52}$; $I_{21} \ldots I_{25}$, $I_{33}$, $I_{43}$ and $I_{53}$; $I_{14}$, $I_{24}$, $I_{31} \ldots I_{34}$, $I_{44}$ and $I_{54}$; $I_{11}$, $I_{15}$, $I_{22}$, $I_{24}$, $I_{33}$, $I_{44}$ and $I_{55}$; $I_{15}$, $I_{24}$, $I_{33}$, $I_{42}$, $I_{44}$, $I_{51}$ and $I_{55}$; $I_{11}$, $I_{22}$, $I_{33}$, $I_{42}$, $I_{44}$, $I_{51}$ and $I_{55}$; and $I_{11}$, $I_{15}$, $I_{22}$, $I_{24}$, $I_{33}$, $I_{42}$ and $I_{51}$.

The inverting operations of the inverter logic circuits of the remaining feature recognizers 83–87 should now be readily apparent to those skilled in the art and, hence, will not be further discussed or illustrated. Also, it should be understood that the above examples are for illustrative purposes and are not meant to be all inclusive. Therefore, a greater number of recognizable feature classes than those shown in FIG. 3A could be used within the purview of the invention, depending upon the type of operation desired. Furthermore, for better feature pattern recognition a window larger than the window 79 (FIG. 6), as well as modified inverter logic circuits and different timing clocks, can be used.

A block diagram of the image A feature storage readout circuit 55 portion of the terrain feature extractor 53 of FIG. 2 will be discussed in detail by now referring to FIG. 8.

The X and Y-counts (from counters 92 and 93, FIG. 5) are each applied to both of AND gates 141 and 143. AND gate 141 is implemented to develop the "start of scan" signal when, at the start of the scanning of local ground terrain at a checkpoint, each of the X and Y-counts is zero. On the other hand, AND gate 143 is implemented to develop the "end of scan" signal when each of the X and Y-counts is 512. The start of scan signal resets an image A features counter 145 by way of OR gate 144 to a zero count, and sets a flip flop 147 so that its Q and $\overline{Q}$ sides respectively initiate a write cycle in a random access memory (RAM) 149 and a 0 state signal to disable a gate 151 to prevent the contents of the features counter 145 from being read out through the gate 151. The output count of the features counter 145 is used by the RAM 149 as a write address. Each time that a terrain feature is detected by the circuitry of FIG. 5, a feature detected signal increments the feature counter 145 by 1 and also enables gates 153–155 to respectively pass the X and Y positions and feature class of that feature (collectively called image A feature data) to the RAM 149. The RAM 149 stores this image A feature data at the associated address location indicated by the newly incremented count of the features counter 145.

Upon the completion of the scanning of the local terrain at a checkpoint, when X=512 and Y=512, the end of scan signal from the AND gate 143 resets the flip flop 147 to terminate the write cycle of the RAM 149 to enable the gate 151 to pass the contents of the features counter 145 out. The output of the features counter 145 is a binary number representing the number of features that were detected in the scanned local terrain, or sensed image A, and is designated "image A features number".

The end of scan signal from the AND gate 143 also sets a flip flop 157 so that its 1 and Q side initiates a read cycle in the RAM 149, enables an AND gate 159 to pass $P_4$ clock pulses (to be explained) to an image A address counter 161 to be counted, and enables the upper input of a presently disabled AND gate 163. The output count of the address counter 161 is used by the RAM 149 as a read address. By this means the X, Y, C components of image A features data in sensed map image A is read out of the RAM 149 at the $P_4$ clock rate as the counter 161 is counting $P_4$ clocks. When the count of the counter 161 becomes equal to the image A features number (from gate 151), a comparator 165 develops a signal which is applied to the lower input of AND gate 163 to enable the AND gate 163 to develop a start image B signal. This start image B signal is applied through an OR gate 167 to reset the flip flop 157, and through OR gate 144 to reset the counter 145. It should be noted at this time that a "power-on" signal, which is conventionally used to initialize a system to desired initial operating states, resets the flip flop 157 by way of the OR gate 167 when power is first applied to the system. Upon being reset to the 0 state Q side of the flip flop 157 terminates the read cycle of the RAM 149 and disables the AND gates 159 and 163, while the 1 state $\overline{Q}$ side of the flip flop 157 resets the address counter 161 to a zero count.

The start image B signal is also applied to the terrain reference map images storage circuit 57 (of FIG. 2) to start the processing of the reference map image B associated with the present checkpoint. The storage circuit 57 will now be discussed in detail by referring to its detailed block diagram illustrated in FIG. 9.

Figure 9:
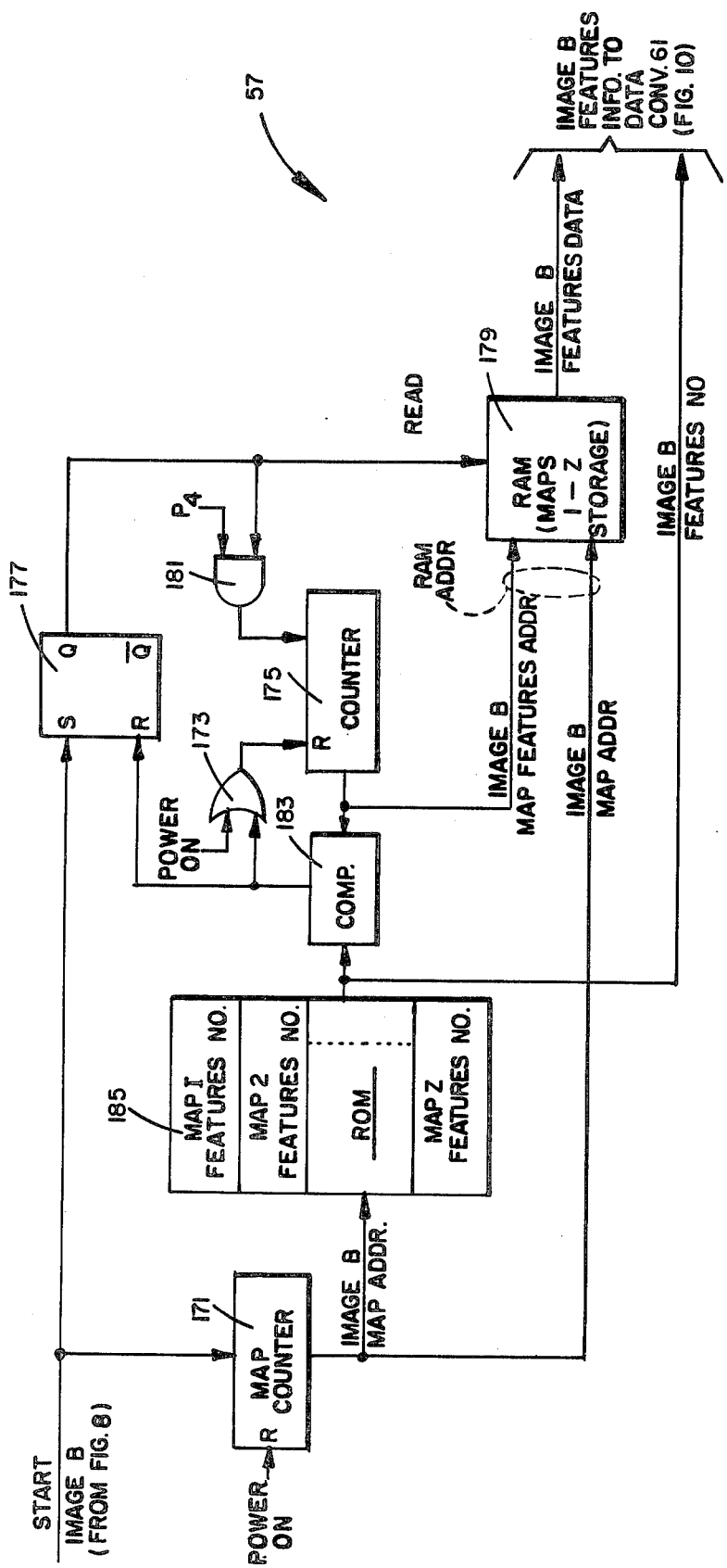
FIG. 9 is a block diagram of the terrain reference map images storage circuit of FIG. 2.

In FIG. 9 a "power-on" signal (previously discussed) resets a map counter 171 to zero. In addition, the power-on signal is applied through an OR gate 173 to reset a counter 175 to zero. At the first checkpoint 25 (FIG. 1), and at each subsequent one of the checkpoints 26–28 (FIG. 1), a "start image B" signal is received from the circuit of FIG. 8. It should be understood that the four signals (RIV-B information), like that in relation to image A. The RIV-B information signals are then passed through the output multiplexer 249 to the input of an image B RIV-B information storage circuit 267 similar to the circuit 261.

An "end of image" (EOI) signal (from FIG. 11A—to be explained) is passed through the OR gate 265 to reset the address counter 263 to a zero count. Upon being reset the counter 263 starts counting P4 clocks to again sequentially develop and apply output addresses to the gates 251 and 255. Since only gate 255 is enabled during the image B mode of operation, the addresses from the counter 263 pass through gate 255 to the storage circuit 267. Thus, the image B RIV-B information signals from multiplexer 249 are selectively stored in the addressed locations of the storage circuit 267 during the image B mode of operation.

After the A and B images have been converted to an RIV information signal format by the encoder 259 and placed in the storage circuits 261 and 267, all further signal processing of the A and B images is in the RIV information signal format.

The next operation is performed by the RIV comparator 63. Basically, the RIV comparator 63 selectively compares each RIV of the sensed image A with each RIV of the reference image B and generates an RIV match score and RIV coordinate displacements for each RIV pair comparison. The amplitude of the RIV match score generated at a given time indicates the closeness of the match between the two RIVs being compared at that given time.

P4 clocks, the outputs of the registers 257 and 266, and control signals EOI and "RIV match and tabulate" (to be explained) are applied to a RIV selector 269 in the RIV comparator 63. In response to these input signals, the RIV selector 269 respectively supplies RIV-A and RIV-B read addresses to the storage circuits 261 and 267. These read addresses selectively enable the RIV-A and RIV-B information signals to be read out of the storage circuits 261 and 267 and applied to a center features comparison circuit 271. In its addressing sequence, the RIV selector 269 selects the first RIV information signal (first RIV-A and its associated first center feature and first RIV features number) from image A and then sequentially selects one at a time all of the RIV information signals (RIVs and their associated center features and associated number of features in the RIVs) from image B. After the first RIV from image A has been compared in the RIV comparator 63 with each of the RIVs of image B, the second RIV of image A is compared with each of the RIVs from image B, and so on. In this manner, all pairs of RIVs between map images A and B are compared.

The RIV comparator 63 performs two different comparisons on the RIV-A and RIV-B information signals applied to it. A first comparison is performed by the center features comparison circuit 271 on the center features associated with each pair of RIVs. The comparison circuit 271 respectively compares the parameters ($X_c$, $Y_c$, $C_c$) of the center features of the two RIVs of images A and B with each other. The comparison circuit 271 requires that the parameters $X_c$, $Y_c$ and $C_c$ of each of the center features of RIV-A and RIV-B satisfy proximity tests before applying those two RIVs to its output for further comparison. More specifically, if the X-coordinate difference or the Y-coordinate difference between the center features of the two RIVs being compared is not sufficiently small, that RIV pair is rejected from further comparison, since preliminary global criteria (based upon the center features) would indicate that the RIV pair is unlikely to match. By means of its above-described addressing sequence, the RIV selector 269 would then select another RIV pair and its associated center features from the storage circuits 261 and 267 for another center features comparison by the circuit 271. When the X and Y coordinate differences ($X_{CA}-X_{CB}$, $Y_{CA}-Y_{CB}$) and the differences between feature classes $C_{CA}$ and $C_{CB}$ of the center features of the RIV pair from the A and B map images are all sufficiently small to indicate that a match is likely, that RIV pair (and the number of features in each RIV of that pair) is passed to an RIV comparison circuit 273 for a second comparison.

The comparison circuit 273 compares each neighbor (in RIV format of r, $\phi$) of the center feature of the RIV of map image A with each neighbor of the center features of the RIV of map image B, and computes a separate RIV match score ($S_{AB}$) for each RIV pair from the two map images being compared to indicate the closeness of match for that RIV pair. Basically, this match score is computed from the number of features in RIV-A that find a "mate" in RIV-B by comparing the relative coordinates for each feature in RIV-A with those of each feature in RIV-B. As a result, each RIV match score is quantatively related to the probability that the features patterns of an RIV pair from images A and B are the same.

Each center feature of RIV-A ($X_{CA}$, $Y_{CA}$) and its associated center feature of RIV-B ($X_{CB}$, $Y_{CB}$) are also applied to a coordinate transformation circuit 275 in the RIV comparator 63. The coordinate transformation circuit 275 generates three different sets of coordinate displacements for three different angular rotations ($\Delta\theta_{AB}$) of the center features of the RIV pair being compared at that time. The optimum number of different angular rotations is dependent upon the angular uncertainty of the two images being matched. Three rotational orientations are described here to illustrate the concept. In response to each input pair of center features and the 1 state "select D", "select E" or "select G" signal from the comparison circuit 273, the circuit 275 selects one of the exemplary three sets of coordinates as the output coordinate displacements ($\Delta X_{AB}$ and $\Delta Y_{AB}$) and the associated angular displacement $\Delta\theta_{AB}$. The $\Delta X_{AB}$, $\Delta Y_{AB}$ and $\Delta\theta_{AB}$ displacement signals are applied to a score gate 277 in the displacement computation circuit 65 to indicate how much the coordinates of an RIV of image A have to be displaced and rotated in relation to the coordinates of an associated RIV of image B so that the center features and neighboring features of the A and B images match up. For this operation, $\Delta X$, $\Delta Y$ and $\Delta\theta$ respectively represent the relative horizontal and vertical displacements and angular displacement or rotation of the two coordinate systems of the center features of the A and B map images. The RIV match score $S_{AB}$ from the RIV comparison circuit 273 is also applied to the score gate 277 in the displacement computation circuit 65.

The displacement computation circuit 65 analyzes the set of RIV match scores and associated RIV coordinate displacements of map images A and B from a global or overall viewpoint, and develops updated displacement coordinate signals to enable the inertial guidance system 67 (FIG. 2) to put the missile back on course. A sufficiently high RIV match score $S_{AB}$ causes the score gate 277 to generate a "store" signal, which enables the match score $S_{AB}$ and its displacement signals $\Delta X_{AB}$, $\Delta Y_{AB}$ and $\Delta \theta_{AB}$ to be passed out of the score gate 277 and stored in a three-dimensional histogram or score list register 279. The score list register 279 contains the match scores ($S_i$) and displacements ($\Delta X_i$, $\Delta Y_i$, $\Delta \theta_i$) of the two coordinate systems (between the two map images being compared) for each pair of RIVs that satisfy the conditions of the RIV comparator 63 and score gate 277, where i=from 1 up to $192^2$ RIV pair comparisons, for example.

When all pairs of RIVs of map images A and B have been compared and all of the match scores and position data from the score gate 277 have been entered into the score list 279, the histogram is completed. After the completion of the histogram, a "start GCA" (global coherency analysis) signal enables a global coherency analyzer 281 to start addressing the score list 279 to enable the score list to read out and apply its data contents to the analyzer 281.

The global coherency analyzer 281 performs a three-dimensional histogram in $\Delta X$, $\Delta Y$ and $\Delta \theta$ space in order to locate the densest point in $\Delta X$, $\Delta Y$ and $\Delta \theta$ space represented by the score list 279. The coherency analyzer 281 assures that all of the match scores are added together in such a manner that the coherency of the patterns of the A and B map images is not destroyed.

The analyzer 281 develops updated displacement coordinate signals which, as stated previously, enable the inertial guidance system 67 (FIG. 2) to put the missile back on course. These updated displacement coordinates are a function of the number of RIVs that matched, how well they matched, and how closely their relative translations and rotations grouped. At the completion of its analysis, the analyzer 281 generates an "end of GCA" signal.

FIGS. 11A and 11B, in combination, provide a block diagram of the timing and control unit 69 of FIG. 2. FIG. 11A will be discussed first. In FIG. 11A a timing pulse generator 285, which can comprise a clock generator and countdown circuits (not shown), develops the $P_1$, $P_2$, $P_3$, $P_4$ and $P_5$ clock pulses. The frequencies of $P_1$, $P_2$, $P_3$, $P_4$ and $P_5$ may be preselected such that $P_1 = 2P_2 = 16P_3 = 3072P_4 = 589{,}824\ P_5$. An "enable" signal (from FIG. 11B) enables the generator 285 to start developing these $P_1 \ldots P_5$ clock pulses. This "enable" signal is generated at the time of the "end of scan" signal (FIG. 8), which occurs after the image A features information (FIG. 8) has been applied to the data converter 61 in FIG. 10. An "end of GCA" signal (from FIG. 32) disables the generator 285 to prevent it from developing the $P_1 \ldots P_5$ clock pulses, unless a subsequent "enable" signal is received.

The $P_5$ clock pulses are counted by a center feature counter 287 to develop an 8-bit wide center feature address (CFA). The $P_4$ clock pulses, which have a frequency 192 times greater than the $P_5$ clock pulses, are counted by a neighbor features counter 289 to develop an 8-bit wide neighbor features address (NFA).

Figure 12:
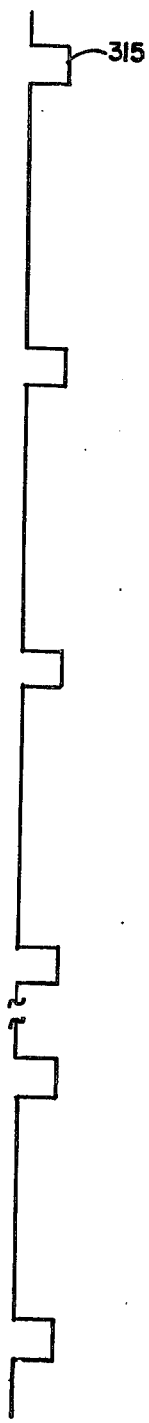
FIG. 12 illustrates a timing chart useful in explaining the operation of the timing and control circuit of FIGS. 11A and 11B.

The relationship of the center feature address (CFA) to the neighbor features address (NFA) for a map image containing 192 or more features is more clearly illustrated in FIG. 12. In this illustration the center feature counter 287, which is incremented by the $P_5$ clock, holds each count for 191 $P_4$ clock pulse periods. This is due to the fact (to be explained later) that the NFA is not allowed to remain equal to the CFA, but is immediately incremented by one as soon as NFA=CFA. Therefore, as indicated in FIG. 12, during each CFA count of the counter 287, the counter 289 effectively skips the NFA count that is equal to that CFA count since the RIV of a center feature does no include that center feature. Thus, during the period of time that the counter 287 is developing a CFA=1 (or 00000001), the counter 289 effectively skips its count of 1 and develops NFAs of 2 through 192 (or 00000010 through 11000000). Similarly, during the period of time that the counter 287 is developing a CFA=2, the counter 289 develops an NFA=1, effectively skips a count of 2, and develops NFAs of 3 through 192. This operation continues as the counter 287 develops CFAs of 1 through 192. During the period of time that the counter 287 is developing a CFA=192, the counter 289 develops NFAs of 1 through 191.

It should again be stressed that, while FIG. 12 illustrates the relationship of CFA to NFA for a map image containing 192 or more features, the number of features in a map image can be less than 192, as well as 192 or more.

Referring back to FIG. 11A, an RIV is developed during each count or CFA of the counter 287. After all of the RIVs in a map image are developed, the rising edge of an "end of image" (EOI) signal is used to reset the counter 287 for the next map image. This "end of image" signal, which is generated after all of the features in an input map image have been processed, is generated under either of two operational conditions, namely when a map image contains either at least 192 features or less than 192 features. These two operational conditions essentially require different circuits in FIG. 11A to initiate the development of the "end of image" signal and, hence, will be separately discussed.

For the development of the "end of image" signal when a map image contains 192 or more features, the CFA and NFA counts are both applied to a 16-input AND gate 291. The AND gate has its inputs selectively inverted and non-inverted such that it develops and applies a 1 state signal through OR gate 293 to a delay circuit 295 if CFA=192 and NFA=191. The delay circuit 295 delays this 1 state signal for one $P_4$ clock pulse period to enable the NFA of 191, that is developed during the period of time that CFA=192, to be completed. The output of the delay circuit 295 is the "end of image" signal.

It should be noted at this time that an upper features limit of 192 for a map image was arbitrarily chosen for the purpose of this description. It should be understood that the feature pattern matcher 59 (FIG. 2) and timing and control unit 69 (FIG. 2) could be implemented with any desired upper features limit for a map image.

When the number of features in the map image (image features number) is less than 192, additional circuits are required to develop the "end of image" signal. For this operation the binary number of features in the map image being processed at that time is applied from the input multiplexer 247 (FIG. 10) to a center feature comparator 297 and a subtractor 299. The comparator 297 develops and applies a 1 state signal to a first input of an AND gate 301, if the count of counter 287 (CFA)=the image features number of the map image being processed. The subtractor 299 subtracts one (1) from the image features number in the image and applies the difference to a comparator 303. The NFA count from the counter 289 is also applied to the comparator 303 for comparison with this difference (image features number minus one). When NFA=image features number minus one, the comparator 303 develops and applies a 1-state to a second input of the AND gate 301. The AND gate 301, having been previously enabled by the output of the comparator 297, passes the output of the comparator 303 through the OR gate 293 to the delay circuit 295. After one $P_4$ clock pulse period an "end of image" (EOI) signal is produced at the output of the delay circuit 295. Thus, an "end of image" signal is derived from the AND gate 291 when there are 192 or more image features in the map image being processed and from the AND gate 301 when there are less than 192 image features in the map image. Note that an "end of image" signal is always developed one $P_4$ clock pulse period after the start of the time when NFA=CFA−1.

It should be recalled that an RIV is developed during each CFA count of the counter 287. At the completion of each RIV, a "next RIV" signal is generated to reset the counter 289 for the next RIV. This "next RIV" signal is generated one $P_4$ clock pulse period after NFA=the image features number or 192, which is less, or generated at the time the "end of image" signal is developed. Each of these three operational conditions will be separately explained.

In the generation of a "next RIV" signal one $P_4$ clock pulse period after NFA=the image features number, the NFA count from the counter 289 is applied to a neighbor features comparator 305. The comparator 305 develops and applies a 1 state signal through an OR gate 307 to a delay circuit 309. The delay circuit 309 delays this 1 state signal for one $P_4$ clock pulse period to complete the NFA count that is equal to the image features number in the map image. The output of the delay circuit 309 is applied through an OR gate 311 as the "next RIV" signal.

In the development of a "next RIV" signal when a map image contains 192 or more features, an upper features limit of 192 for the NFA is arbitrarily chosen, as discussed above. In this case the NFA count is applied to an 8-input AND gate 313, which has all its inputs inverted except its two most significant bit inputs. When NFA=192, the AND gate 313 develops and applies a 1 state signal through the OR gate 307 to the delay circuit 309. After the NFA count of 192 is completed, the delay circuit 309 applies a 1 state signal through the OR gate 311 as a "next RIV" signal.

At the completion of a map image, the "end of image" signal is also applied through the OR gate 311 as the "next RIV" signal for the first RIV in the following map image.

It can therefore be seen that: when there are less than 192 features in the map image being processed, a "next RIV" signal is originally derived from the comparator 305; when there are 192 or more features in the map image being processed, a "next RIV" signal is originally derived from the AND gate 313; and the "next RIV" signal for the first RIV in the following map image is directly derived from the delay circuit 295. The rising edge of each "next RIV" signal resets the counter 289 to a zero count, so that the next RIV can be developed. The timing of the "next RIV" signal is illustrated in FIG. 12 for the start of each RIV in a map image containing 192 features. See, particularly, the "next RIV" signals in waveform 315 in FIG. 12.

As stated before, an RIV is generated for each feature in a map image and is essentially a detailed description of the immediate neighborhood of that feature. Furthermore, the feature for which an RIV is generated is the center feature for that RIV. Therefore, the RIV of a center feature does not include that center feature. To prevent the center feature of an RIV from being included in its RIV, a comparator 317 is included in the timing and control unit 69. Basically the comparator 317 compares the center feature address (CFA) with the neighbor features address (NFA). As soon as NFA=CFA, the comparator 317 immediately develops an "increment-by-one" signal which is applied to the neighbor features counter 289 to cause the counter 289 to increment its count by one. In this manner, the neighbor features address is never allowed to be equal to the center feature address. Consequently, the RIV of a feature cannot include that feature.

Referring now to FIG. 11B, the second part of the timing and control unit 69 of FIG. 2 will be discussed. A power-on signal (previously discussed) is applied through OR gate 294 to set a "wait" flip flop 296. In addition, this power-on signal initiates the proper timing sequence of the timing and control unit 69 of FIGS. 11A and 11B by resetting flip flops 300, 304, 312 and 316 by way of OR gates 300A, 304A, 312A and 316A, respectively. The output of the "wait" flip flop 296 enables the lower input of AND gate 298. The flip flop 296 thus is in a "wait" mode of operation until a new sensed map image A is initiated by the "start of scan" signal from the output of AND gate 141 (FIG. 8), as described in FIG. 8. It will be recalled that the "start of scan" signal initiates the detection and storage of the image A features data into the RAM 149 (FIG. 8). This "start of scan" signal is applied through the enabled AND gate 298 to set "load image A" flip flop 300 and to reset flip flop 296 to terminate the "wait" mode of operation.

When set, the output of the "load image A" flip flop 300 enables the lower input of an AND gate 302. The flip flop 300 thus is in a "load image A" mode of operation during the period of time when all of the features in map image A are detected and stored into the RAM 149 (FIG. 8). It will be recalled that the "end of scan" signal occurs at the end of this period of time, when all of the features data in image A have been stored in the RAM 149. It will be further recalled that the "end of scan" signal from the output of AND gate 143 (FIG. 8) initiates the readout of RAM 149 (FIG. 8) in to the data converter 61 (FIG. 10) for the RIV encoding of map image A. This "end of scan" signal is applied through the enabled AND gate 302 to set "RIV-encode image A" flip flop 304 and to reset the flip flop 300 by way of the OR gate 300A in order to terminate the "load image A" mode of operation. In addition, the "end of scan" signal that is applied through the enabled AND gate 302 is utilized as an "enable" signal to enable the timing pulse generator 285 (FIG. 11A) to generate the $P_1 \ldots P_5$ clock pulses.

When set, the output of the "RIV-encode image A" flip flop 304 enables the lower input of an AND gate 308. The flip flop 304 is thus in an "RIV-encode image A" mode of operation during the period of time when all of the image A features data contents of the RAM 149 (FIG. 8) are being read out for RIV encoding. It will be recalled that when the contents of the RAM 149 have been read out, the comparator 165 (FIG. 8) initiates the generation of the "start image B" signal. It will also be recalled that this "start image B" signal enables image B features information to be read out of the reference map images storage circuit 57 (FIG. 9) and be RIV-encoded by the data converter 61 (FIG. 10). The "start image B" signal is also applied through enabled AND gate 308 to set "RIV-encode image B" flip flop 312 and to reset the flip flop 304 by way of the OR gate 304A in order to terminate the "RIV-encode image B" mode of operation.

When set, the output of the "RIV-encode image B" flip flop 312 enables the lower input of an AND gate 314. The flip flop 312 is thus in an "RIV-encode image B" mode of operation during the period of time when all of the features information of map image B are being RIV-encoded by the data converter 61 (FIG. 10). It will be recalled that, at the completion of the RIV-encoding of image B, an end of image (EOI) signal is developed at the output of delay circuit 295 (FIG. 11A). This EOI signal is applied to AND gates 314 and 320. However, only AND gate 314 is enabled during the time of this EOI signal. This EOI signal is applied through the enabled AND gate 314 to set "RIV match and tabulate" flip flop 316 and to reset flip flop 312 by way of the OR gate 312A in order to terminate the "RIV-encode image B" mode of operation.

When set, the output of the "RIV match and tabulate" flip flop 316 becomes an "RIV match and tabulate" signal which is applied to the RIV selector 269 (FIG. 24) to enable the match comparator 63 (FIG. 10) to match and tabulate all of RIVs A and B in map images A and B. This "RIV match and tabulate" signal is also passed through a delay circuit 318 to enable the lower input of the AND gate 320. The delay of the delay circuit 318 can be any suitable delay (for example, one $P_4$ clock period) sufficient to inhibit the lower input of the AND gate 320 until after the termination of the EOI signal that resulted from the completion of the RIV encoding of image B. The flip flop 316 thus is in an "RIV match and tabulate" mode of operation during the period of time when all of the RIVs A and B in images A and B are being matched and tabulated.

The next EOI pulse (FIG. 11A) that is generated is applied through the enabled AND gate 320 as a "start GCA" (global coherency analysis) pulse. This "start GCA" pulse is applied to the global coherency analyzer 281 (FIG. 32) to begin the global coherency analysis of the score and displacement signals stored in the store list register 279. By the time that this next EOI pulse occurs all of the RIVs A and B in images A and B have been matched. As a result, this "start GCA" pulse is used to reset the flip flop 316 by way of the OR gate 316A in order to terminate the "RIV match and tabulate" mode of operation.

When the circuit 281 has completed its analysis it applies an "end of GCA" signal through the OR gate 294 to set the flip flop 296 and put the flip flop 296 back into the "wait" mode of operation. Furthermore, this "end of GCA" signal is used to disable the timing pulse generator 285 (FIG. 11A) to prevent it from developing the $P_1 \ldots P_5$ clock pulses.

The above-described operation of the timing and control unit 69 (FIGS. 11 A and 11B) is repeated at each checkpoint (see FIG. 1).

The RIV encoder 259 of FIG. 10 will now be explained more fully by referring to FIG. 13. For proper timing purposes, the X, Y, C formatted image features data (from the multiplexer 247 in FIG. 10) of each of the features in the map image being processed at a given time is selectively applied to an input buffer 321 before the image features data is stored in a random access memory (RAM) 323 which, for example, is illustrated as being 192 by 21 bits in storage capacity. The RAM 323 stores 192 features, with each feature being 21 bits wide, 9 bits each for X and Y and 3 bits for C.

The CFA and NFA counts from the timing control unit 69 (FIG. 11A) are utilized by the RAM 323 in the generation of RIVs. At each CFA time, the feature stored at the associated CFA location of the RAM 323 is read out of the RAM 323 and stored in a center feature register 325. The register 325 accepts each addressed feature as the center feature CF ($X_c$, $Y_c$, $C_c$) of an associated RIV cluster to be determined. A "next RIV" pulse (from FIG. 11A) is delayed 1 $P_1$ clock period by a delay circuit 326. This delayed "next RIV" signal enables the center feature (CF) in the register 325 to be also stored in a center feature (CF) and neighboring features register 327. The register 327 also has storage areas to store nine other signals $R_1$–$R_9$, which may or may not be neighboring features of the center feature (CF). Each of these "R" storage areas is comprised of r, $\phi$ and C portions. The delayed "next RIV" pulse from the delay circuit 326 also enables a radial order sorter 329 to initialize all of the r storage portions ($r_1$–$r_9$) in the register 327 so that all of the $r_1$–$r_9$ values are equal to 31, for example. In addition, the parameters $X_c$ and $Y_c$ of the center feature that is stored in the register 325 are respectively applied to subtractors 331 and 333.

During each time that the center feature parameters $X_c$ and $Y_c$ are being respectively applied from the register 325 to the subtractors 331 and 333, the $X_i$ and $Y_i$ parameters of all of the features stored in the RAM 323, except the center feature, are sequentially read out of the NFA locations of the RAM 323 at the NFA times.

In the above case, as well as in the following discussion, let i=0, 1, 2 . . . the lesser of 192 or the image features number of the map image being processed at a given time.

The center feature parameters $X_c$ and $Y_c$ are respectively subtracted from these $X_i$ and $Y_i$ parameters (for example, $X_1$, $X_1$; . . . ; $X_{192}$, $Y_{192}$, excluding those of the center feature) in the subtractors 331 and 333. For each center feature that is selected at any given time, all other features in the RAM 323 are computed with respect to that center feature to develop the horizontal displacement $\Delta X_i$ and the vertical displacements $\Delta Y_i$. Here, $\Delta X_i = X_i - X_c$ and $\Delta Y_i = Y_i - Y_c$.

The displacements (or displacement signals) 66 $X_i$ and $\Delta Y_i$ are applied to an r generator 337 to compute the radial distance (r) between the center feature and each neighboring feature. The generator 337 is implemented according to the equation $r = \sqrt{\Delta X_i^2 + \Delta Y_i^2}$ to compute the radial distances $r_i$.

Displacement signals $\Delta X_i$ and $\Delta Y_i$, as well as $r_i$ from r generator 337, are applied to a $\phi$ generator 339 to compute the polar coordinate angle $\phi_i$ between the polar (horizontal) axis of the center feature and each of the neighboring features of that center feature. The combination of the computed values $r_i$ and $\phi_i$ form the polar coordinates ($r_i$, $\phi_i$) for each of the neighboring features of the RIV of a center feature. As is well known to those skilled in the art, the $\phi$ generator 339 can be readily implemented by using trigonometric functions. For example, the generator 339 can be implemented to compute the angles $\phi_i$ as follows:

$\phi = \tan^{-1} |\Delta Y_i / \Delta X_i|$, when both $\Delta X_i$ and $\Delta Y_i$ are positive in value.

$\phi = 180° - \tan^{-1} |\Delta Y_i / \Delta X_i|$, when $\Delta X_i$ is negative and $\Delta Y_i$ is positive in value.

$\phi = 180° + \tan^{-1} |\Delta Y_i / \Delta X_i|$, when both $\Delta X_i$ and $\Delta Y_i$ are negative in value.

$\phi = 360° - \tan^{-1}|\Delta Y_i/\Delta X_i|$, when $\Delta X_i$ is positive and $\Delta Y_i$ is negative in value.

Figure 14:
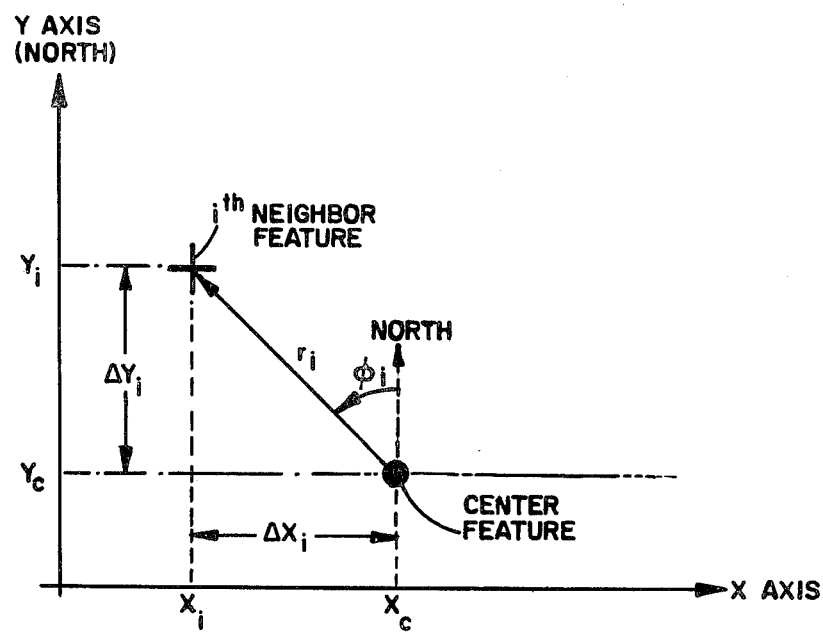
FIGS. 14, 15, 16, 17 and 18 illustrate features and RIV patterns useful in explaining the operation of the RIV encoder of FIG. 13.

The $\Delta X_i$ and $\Delta Y_i$ displacements between the rectangular coordinate positions of a center feature ($X_c$, $Y_c$) and its ith neighbor feature ($X_i$, $Y_i$) are illustrated in FIG. 14. FIG. 14 also shows the position in polar coordinates ($r_i$, $\phi_i$) of that ith neighbor feature with respect to the rectangular coordinate position ($X_c$, $Y_c$) of the associated center feature. Furthermore, note that the center feature is a bright spot on a dark background (feature class 7) and that the ith neighbor feature is an intersection (feature class 1), as defined in FIG. 3A.

The number of a center feature's neighbors included in its RIV can be limited by either a maximum radial distance $R_T$ or an upper bound $N_{max}$, whichever is more restrictive. For the sake of this discussion a maximum radial distance $R_T$ has been selected in FIG. 13 to limit the number of neighboring features associated with a center feature. As a result, each of the radial distances $r_i$ (from r generator 337) of the neighboring features from the center feature is sequentially applied to a maximum neighborhood comparator 341 where it is internally compared with a maximum radial distance threshold $R_T$. The maximum neighborhood comparator 341 performs the function of determining which neighboring features lie within the maximum radial distance $R_T$ of a center feature. For purpose of the following discussion, let the value of the maximum radial distance threshold $R_T$ be equal to 30. Each of the radial distances $r_i$, which does not exceed the threshold $R_T$ of 30, will cause the comparator 341 to develop a pulse 343 to enable the register 327 to simultaneously store the parameters $r_i$ (from generator 337), $\phi_i$ (from generator 339), and $C_i$ (from RAM 323) of the new neighboring feature ($R_9$) associated with that radial distance $r_i$. These values of r, $\phi$ and C are generated sequentially as shown for each center feature with respect to all other features. Any previously stored neighboring features are contained in $R_1$-$R_8$.

It is the combination of the parameters $r_i$, $\phi_i$ and $C_i$ that defines the ith neighboring feature in the RIV neighborhood of a center feature. The values $r_i$ and $\phi_i$ define the position in polar coordinates of each of the nearby features relative to the center feature, while the values $C_i$ define the feature class of each of the nearby features.

The pulse 343 from the comparator 341 also enables the radial order sorter 329 to selectively index the signals $R_1$-$R_9$ from the register 327, selectively sort the new neighboring feature $R_9$ among the previously sorted and stored signals $R_1$-$R_8$ according to its relative distance from the center feature CF ($X_c$, $Y_c$, $C_c$), and selectively restore all of these nine signals back into the register 327 according to their relative radial distances from the center feature CF. Since each of the $r_1$-$r_9$ values of the signals $R_1$-$R_9$ was initialized to a value of 31, the first new neighboring feature, which has an r value of 30 or less, will be positioned in the $R_1$ location. In a like manner, all subsequent neighboring features will correspondingly displace, according to their respective radial distances, the R's which had their r values initialized to 31.

Within each CFA period, all of the $X_i$, $Y_i$, $C_i$ features, except the associated center feature, are computed against the associated center feature $X_c$, $Y_c$, $C_c$ to determine the relative positions (in $r_i$, $\phi_i$ format) of the neighboring features with respect to that center feature. By the completion of each CFA period, the radial order sorter 329 has determined the closest radially-sorted, neighboring features in $r_i$, $\phi_i$, $C_i$ format for a center feature in the map image being processed.

The number of neighboring features of a center feature included within the radial distance threshold $R_T$ can vary from 0 on up. However, as discussed above, the register 327 is arbitrarily implemented to store no more than 9 neighboring features as R signals. Only those R signals in the register 327, which have r values of 30 or less, are the neighboring, radially sorted features in $r_i$, $\phi_i$, $C_i$ format which ultimately form the RIV neighborhood of the associated center feature that is also stored in the register 327 at that time.

Since a new $R_9$ is developed at the time of each new pulse 343 (and subsequently radially sorted), $R_9$ may not necessarily be the ninth closest neighboring feature to the center feature CF. For example, $R_9$ could still be one of the previously initialized R signals having an r value equal to 31. For this reason, only the center feature CF and the eight signals $R_1$-$R_8$ are applied to an output circuit 345 for further processing. It should be noted that CF and $R_1$-$R_8$ are applied to the output circuit 345 at the time of the "next RIV" pulse. This timing arrangement enables the CF and $R_1$-$R_8$ data to be accessed from the register 327 before the delayed "next RIV" pulse (from delay circuit 326) enables a new CF and initialized values of $r_1$-$r_9$ to be stored in the register 327.

The output circuit 345 internally thresholds each of the r values of the signals $R_1$-$R_8$ against the preselected threshold value of 30. Thus, only those signals of $R_1$-$R_8$ whose radial values r passed the threshold test of the comparator 341 (i.e., $r_i=30$ or less) will be developed by the output circuit 345 as the closest neighboring features for inclusion within the RIV neighborhood of the associated center feature CF. The center feature CF and RIV of that CF are passed to the output of the output circuit 345.

It can therefore be seen that an RIV of from 0 to 8 of the closest or neighboring features in r, $\phi$, C format can be developed by the output circuit 345. For example, if the r values of $R_1$-$R_8$ are all 31, all 30 or less, or mixed between 31 and 30 or less, there would be 0, 8 or between 1-7 neighboring features, respectively, in the RIV. Because the number of features in an RIV can vary from 0 to 8, means is included within the output circuit 345 to determine the number of features in each RIV (RIV features number) being developed by the RIV encoder 259.

A different RIV is generated during each CFA count or period. Therefore, the start of a CFA period indicates the start of a new center feature for a new RIV and also indicates the end of the previous RIV. After each RIV is completed, that RIV and its associated center feature, as well as the number of features in that RIV, are time division multiplexed by the output multiplexer 249 (FIG. 10) and stored in the associated one of the RIV storage circuits 261 and 267 (FIG. 10).

To further aid in the understanding of how RIVs are derived, FIGs. 15, 16, 17 and 18 will now be discussed. For the limited purpose of this discussion assume that the terrain feature extractor 53 of FIG. 2 has detected only eleven features, as illustrated in FIG. 3B as image features, during its raster pattern scan of local ground terrain at a checkpoint. The numbers 1-11 indicate the order in which the eleven features were detected. The relative positions of these features to each other is shown with respect to North.

It will be recalled that an RIV is calculated for every feature of a map image and that the number of a center feature's neighbors included in the RIV of that center feature is limited by the maximum radial distance $R_T$. As indicated before, the maximum neighborhood comparator 341 (FIG. 13) performs the function of determining the neighboring features that lie within the maximum radial distance $R_T$ of each of the features illustrated in, for example, FIG. 3B.

Figure 15:
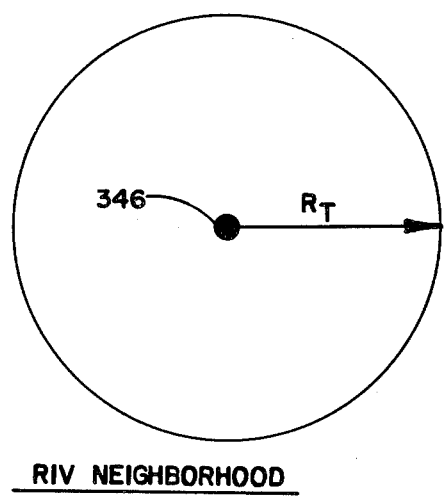
Figure 16:
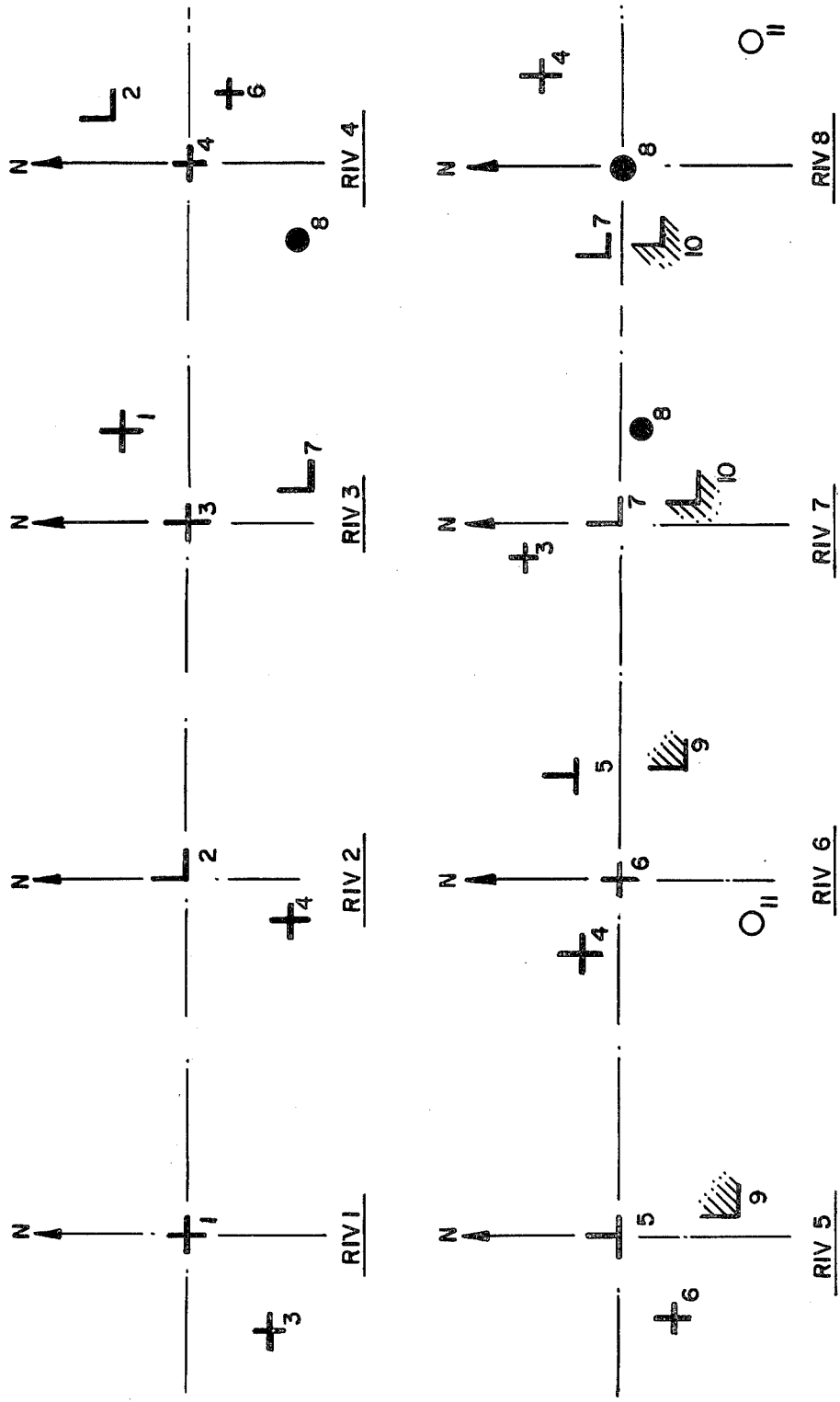

FIG. 15 illustrates the circular area encompassing the RIV of a center feature, located at point 346, for a maximum radial distance $R_T$. Any features that lie within the circumference of the circle in FIG. 15 form the RIV neighborhood for the center feature. Conceptually, when the center 346 of the circle of FIG. 15 is sequentially positioned over the centers of, for example, each of the features 1-8 of FIG. 3B, the RIV neighborhoods for features 1-8 are obtained, as illustrated in FIG. 16. In particular, FIG. 16 illustrates the RIV neighborhoods for the features 1-8, with each of features 1-8 being the center feature of its own RIV neighborhood. As explained before, the relative positions of all features are referenced to North. In this manner, the associated neighboring features 1-11 that are contained within the circumference of the circle of FIG. 15 in the RIV for that associated center feature. More specifically, the RIV (relative information vector) for feature 1 includes feature 3; the RIV for feature 2 includes feature 4; the RIV for feature 3 includes features 1 and 7; the RIV for feature 4 includes features 2, 6 and 8; the RIV for feature 5 includes features 6 and 9; the RIV for feature 6 includes features 4, 5, 9 and 11; the RIV for feature 7 includes features 3, 8 and 10; and the RIV for feature 8 includes features 4, 7, 10 and 11. Therefore, each RIV neighborhood is an information vector or descriptor of the neighborhood for the associated one of the features 1-8.

Figures 17, 18:
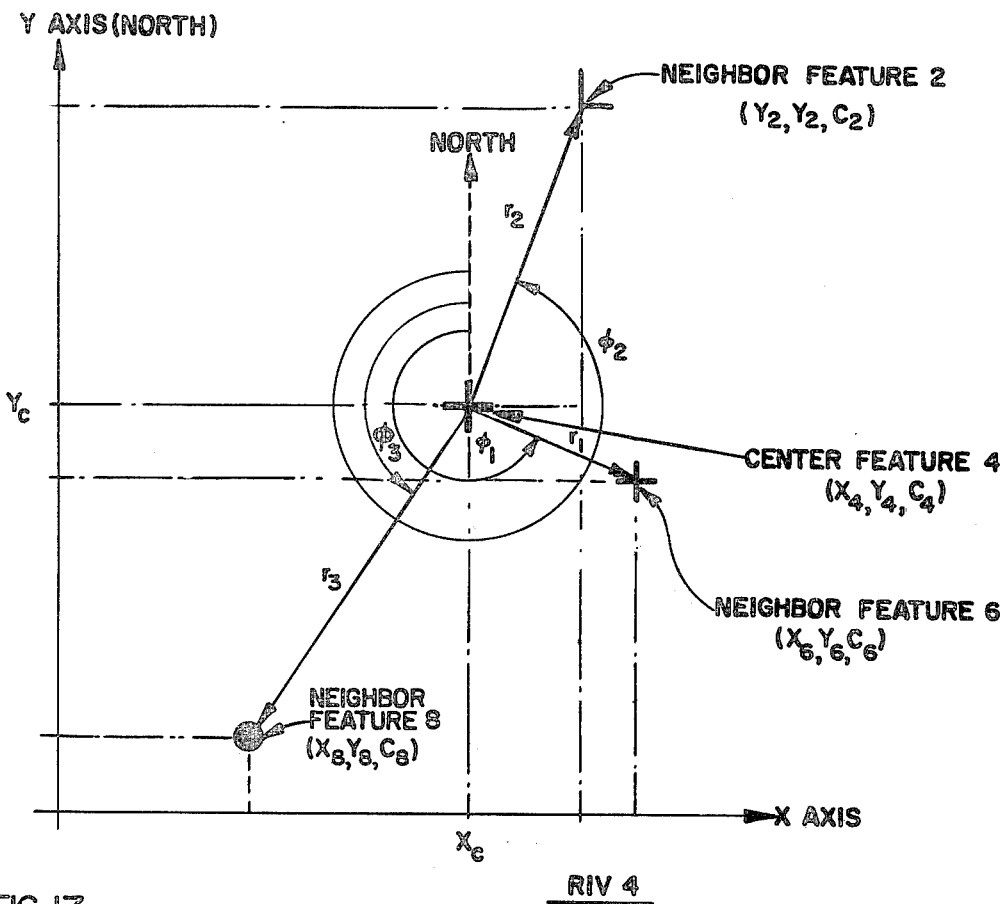

To further illustrate one such RIV neighborhood, consider RIV-4, as shown in FIG. 17. FIG. 17 shows the relative positions (in rectangular coordinate form X, Y) and feature classes (C) of the features, 2, 4, 6 and 8. Since feature 4 is given as the center feature, features 2, 6 and 8 are the neighbor features of center feature 4. The radial distances $r_i$ and polar coordinate angles $\phi_i$ of the neighbor features 2, 6 and 8 with respect to the center feature 4 are also shown.

The radial order sorter 329 (FIG. 13) performs the function of indexing the neighboring features of each RIV in FIG. 16 in the order of increasing radial distance from the associated center feature. A radially-ordered sorted example of the RIV for feature 4 of FIG. 17 is illustrated in FIG. 18. It can be readily seen that the radial distances between center feature 4 and each of the neighbor features 6, 2 and 8 are $r_1$, $r_2$ and $r_3$, respectively. Thus, the parameters of the neighbor features 6, 2 and 8, as sorted by sorter 329 are respectively $r_1$, $\phi_1$ and $C_1$; $r_2$, $\phi_2$, $C_2$; and $r_3$, $\phi_3$, $C_3$, as shown in FIG. 18.

Figure 13:
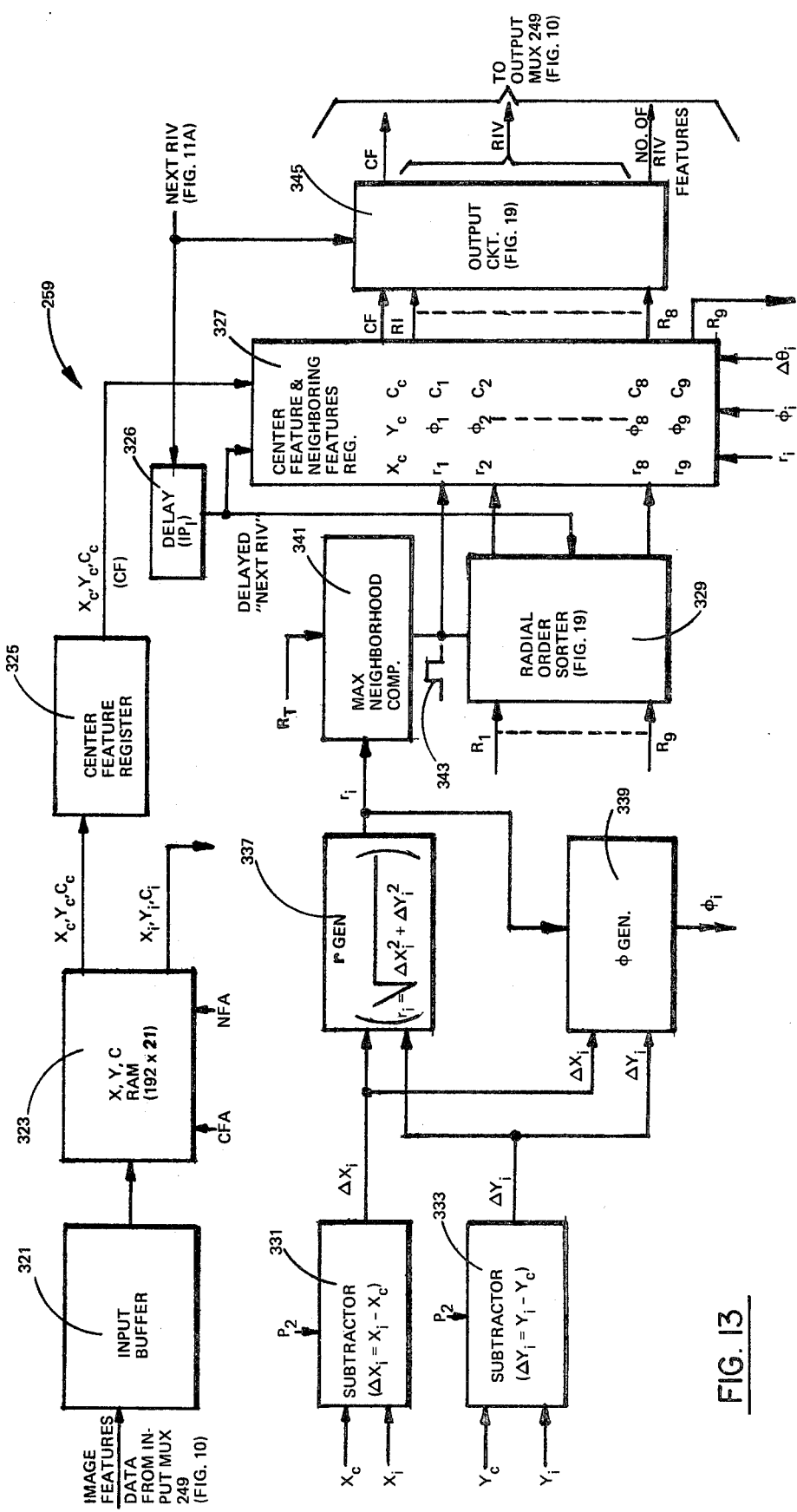
FIG. 13 is a block diagram of the RIV encoder of FIG. 10.
Figure 19:
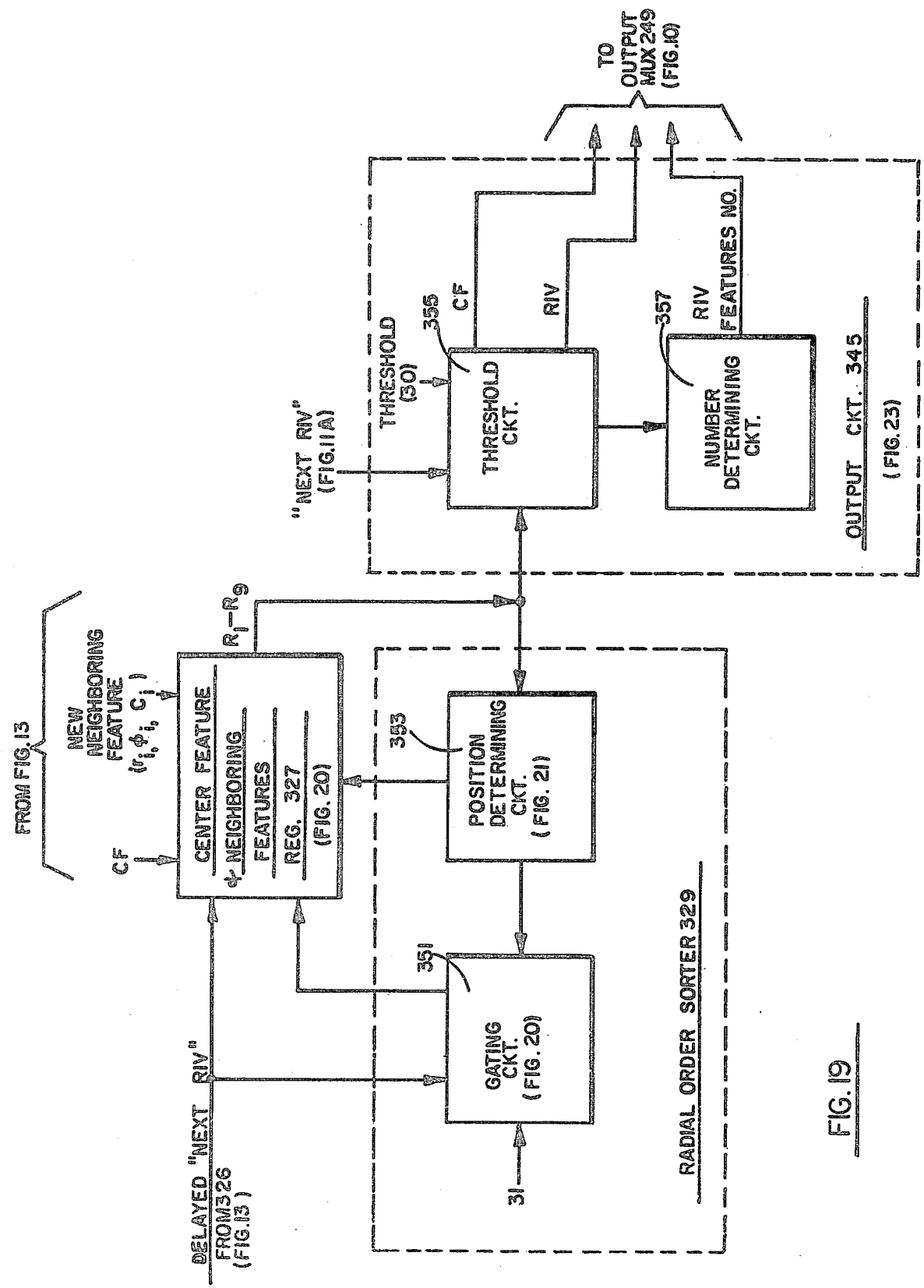
FIG. 19 is a simplified block diagram of the radial order sorter, center feature and neighboring features register, and output circuit of FIG. 13.

Referring now to FIG. 19, a simplified block diagram of the radial order sorter 329, center feature and neighborhood features register 327 and output circuit 345 of FIG. 13 is illustrated. The radial order sorter 329 is comprised of a gating circuit 351 and a position determining circuit 353, while the output circuit 345 is comprised of a threshold circuit 355 and a number determining circuit 357.

As previously discussed, at the time of each delayed "next RIV" pulse (from delay 326, FIG. 13), a different center feature CF is loaded into the register 327, while all of the r values in the signals $R_1$-$R_9$ in the register 327 are initialized to values of 31 by way of the gating circuit 351. From that time until the end of a CFA period, neighboring features having r values that meet the threshold test of comparator 341 (FIG. 13) are sequentially loaded into the register 327. After a new neighboring feature $R_9$ has been stored in the register 327, the position determining circuit 353 sequentially accesses and compares $R_9$ with $R_8$, $R_8$ with $R_7$, ..., $R_2$ with $R_1$, and sequentially re-stores these pairs of R signals back into the register 327. Each compared pair of R signals is radially sorted by the circuit 353 before being applied through the gating circuit 353 and re-stored back into the register 327.

The center feature CF and $R_1$-$R_8$ signals, which are stored in the register 327, are applied to the input of the threshold circuit 355 in the output circuit 345. However, they are not processed by the threshold circuit 355 before the "next RIV" signal (FIG. 11A) occurs. The "next RIV" signal which is generated after all of the neighboring features in an RIV have been detected, enables the threshold circuit 355 to receive the final $R_1$-$R_8$ signals from the register 327. Since some of the signals $R_1$-$R_8$ may not be neighboring features of a center feature, but rather signals initially initialized to 31, the threshold circuit 355 thresholds each of the r values of the signals $R_1$-$R_8$ with a threshold signal equal to 30. This threshold circuit 355 therefore blocks any R signal whose r value was initially initialized to 31. The remaining ones of the $R_1$-$R_8$ signals which pass this threshold test comprise the neighboring features in the RIV of the center feature CF. This RIV and its associated center feature CF are applied to the output of the threshold circuit 355.

The threshold circuit 355 also passes signals, developed from this thresholding operation, to the number determining circuit 357 to enable the circuit 357 to develop a signal indicative of the number of features in the RIV (RIV features number). The RIV and its associated center feature CF, as well as the RIV features number, are parallel-applied from the output circuit 345 to the output multiplexer 249 (FIG. 10).

Figure 20:
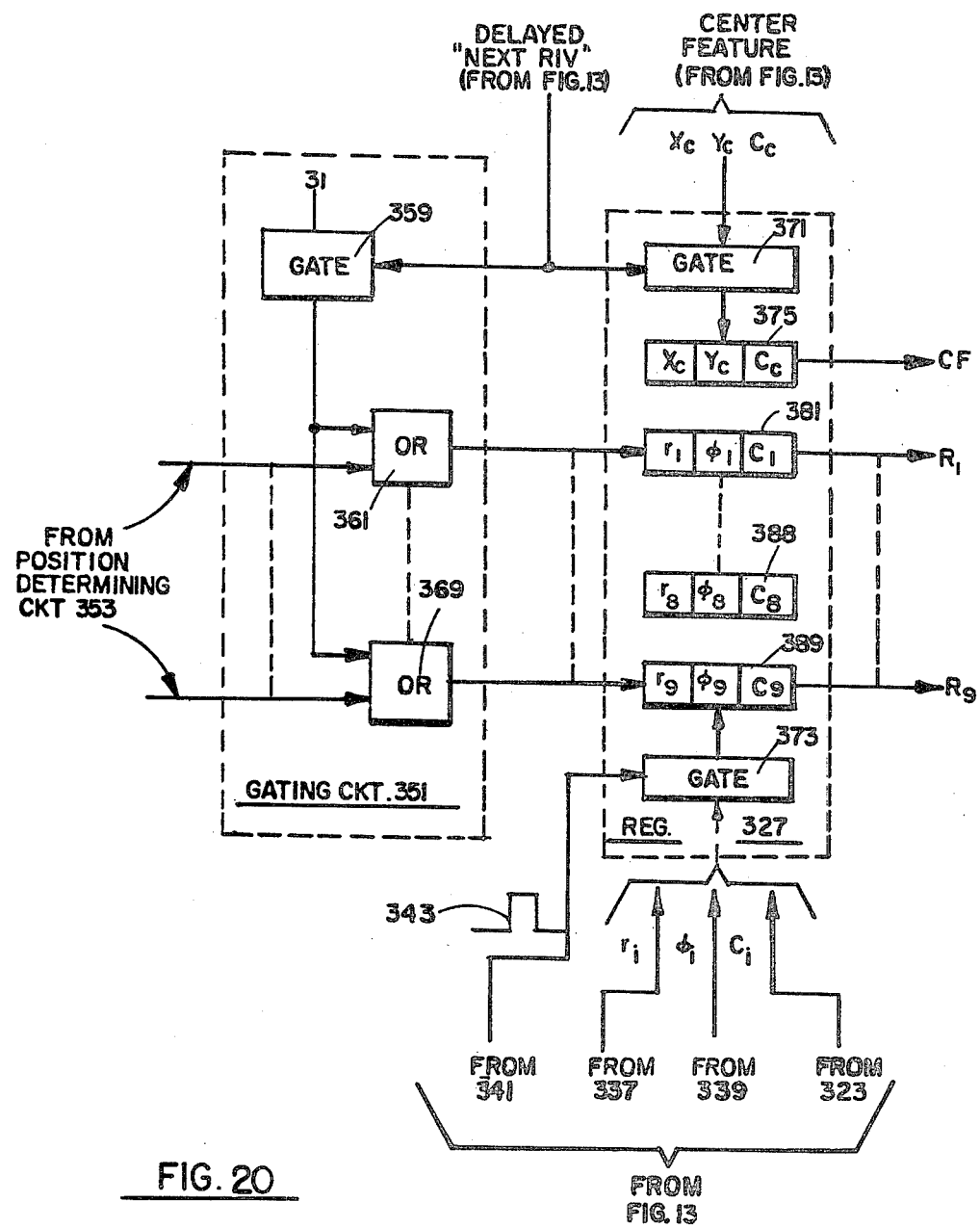
FIG. 20 is a block diagram of the gating circuit and center feature and neighboring features register of FIG. 19.

FIG. 20 illustrates a more detailed block diagram of the gating circuit 351 of the radial order sorter 329 and of the center feature and neighboring features register 327 of FIG. 19. The gating circuit 351 is comprised of a gate 359 and OR gating circuits 361-369, while the register 327 is comprised of gates 371 and 373 and holding registers 375 and 381-389. For purposes of this explanation, each of the OR gating circuits 361-369 (as well as subsequent OR gating circuits) can be comprised of a bank of twenty-one OR gates, and the holding registers 375 and 381-389 can each be twenty-one bits wide for storing information in $X_c$, $Y_c$, $C_c$ and $r_i$, $\phi_i$, $C_i$ locations, respectively.

A delayed "next RIV" signal (from delay 326 in FIG. 13) enables the gate 359 to pass a constant of 31 through each of the gating circuits 361-369 for storage in the $r_i$ (or $r_1$-$r_9$) locations of the holding registers 381-389. This delayed "next RIV" signal also enables the gate 371 to allow a center feature $X_c$, $Y_c$, $C_c$, which is stored in the center feature register 325 (FIG. 13), to also be stored in the $X_c$, $Y_c$, $C_c$ locations of the holding register 375.

Each time within any given CFA period (FIG. 11A) that a neighboring feature is detected by the comparator 341 (FIG. 13), the comparator 341 generates the pulse 343. The leading edge of the pulse 343 enables the gate 373 to allow a new neighboring feature $r_i$, $\phi_i$, $C_i$ to be stored in the $r_9$, $\phi_9$, $C_9$ locations of the holding register 373. The pulse 343 is also applied to the position determining circuit 353 (in the radial order sorter 329 of FIG. 19), which will now be discussed by referring to FIG. 21. The waveforms of FIG. 22 will also be discussed to aid in explaining the operation of the circuit 353.

Figure 21:
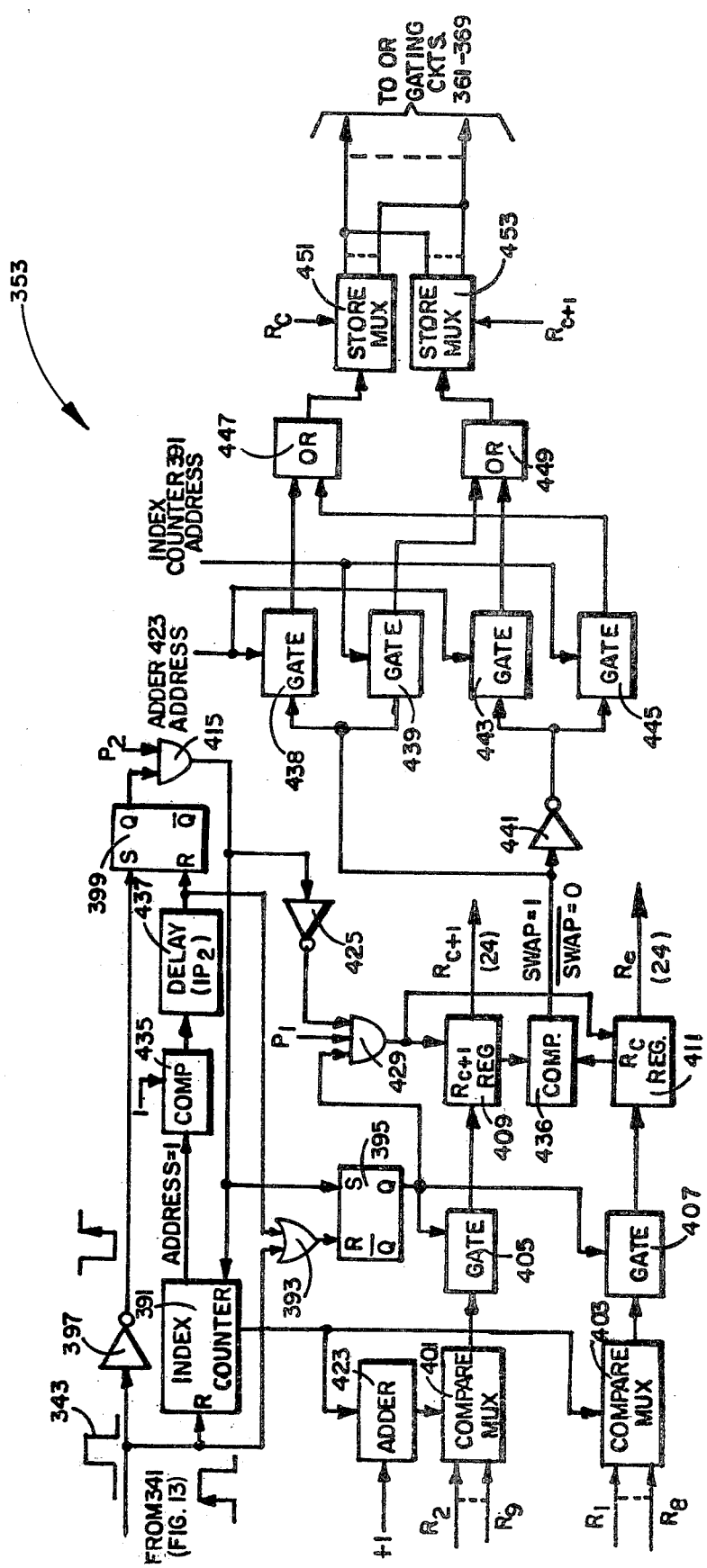
FIG. 21 is a block diagram of the position determining circuit of the radial order sorter illustrated in FIG. 19.
Figure 22:
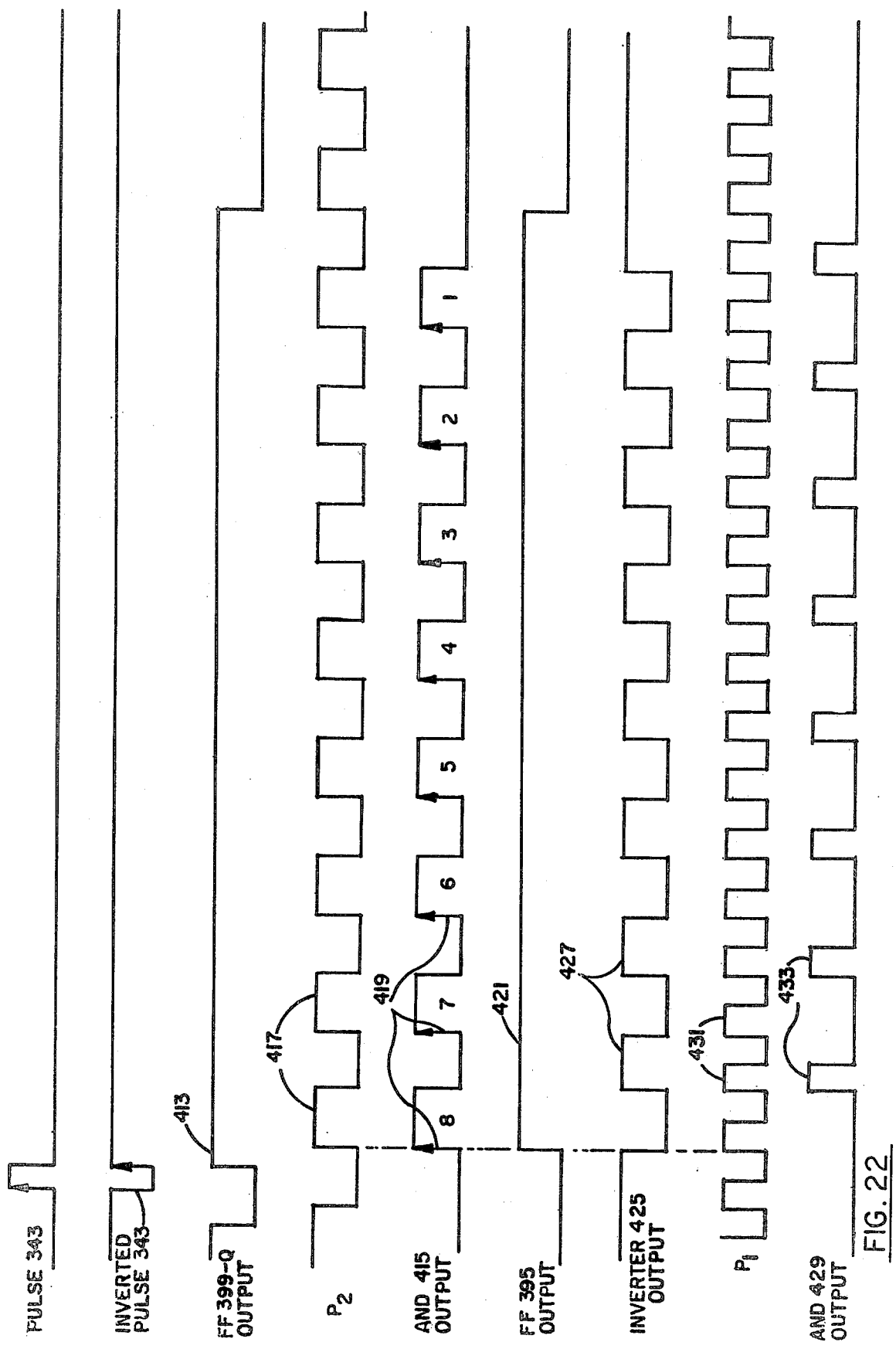
FIG. 22 illustrates waveforms useful in explaining the operation of the position determining circuit of FIG. 21.

As shown in the position determining circuit 353 of FIG. 21, the pulse 343 (FIG. 13) is applied to the reset input of an index or decrement counter 391, through an OR gate 393 to the reset input of a flip flop 395, and through an inverter 397 to the set input of a flip flop 399. In addition, the signals $R_9$–$R_2$ and $R_8$–$R_1$ from the register 327 (FIG. 20) are respectively applied to the inputs of compare multiplexers 401 and 403.

The leading edge of the pulse 343 resets the index counter 391 to a count of 0 and resets the flip flop 395 to disable gates 405 and 407. Upon being disabled, the gates 405 and 407 prevent the outputs of the multiplexers 401 and 403 from being applied to $R_{c+1}$ (R count plus one) and $R_c$ (R count) registers 409 and 411, respectively.

The inverted trailing edge of the inverted pulse 343 sets the flip flop 399 to generate a waveform 413 at the Q output of flip flop 399. Waveform 413 is applied to AND gate 415 along with $P_2$ clocks 417 to develop a series of eight clocks 419. The leading edge of the first one of the clocks 419 sets the flip flop 395 to develop an output waveform 421 which enables gates 405 and 407 to pass the outputs of the multiplexers 401 and 403 to the inputs of the registers 409 and 411, respectively. The first clock 419 also causes the index counter 391 to change its output address count from 0 to 8. Subsequent clocks 419 cause the counter 391 to decrement its output address count from 8 to 1.

The address counts of 8,7 ... 1 from the counter 391 are sequentially applied to the compare multiplexer 403 and to an adder 423. Adder 423 adds a binary 1 to each address count to develop and apply to the compare multiplexer 401 a number equal to the address from the counter 391 plus one. Thus, as the counter 391 develops address counts of 8,7 ... 1, the multiplexers 401 and 403 sequentially select signals $R_9$, $R_8$ ... $R_2$ and $R_8$, $R_7$ ... $R_1$ for application through the gates 405 and 407 to the inputs of the registers 409 and 411, respectively.

The clocks 419 are also inverted by an inverter 425 to develop and apply clocks 427 to an AND gate 429. The waveform 421 and $P_1$ clocks 431 are also supplied to the AND gate 429. By examining the input waveforms 421, 427 and 431 to the AND gate 429, it can be seen that the AND gate 429 develops a 1 state output 433 each time that all three of its inputs are in binary 1 states. These 1 state outputs 433 of AND gate 429, which occur after the output address counts of the counter 391 have stabilized, enable the registers 409 and 411 to sequentially clock-in in parallel the multiplexed signals $R_9$, $R_8$ ... $R_2$ and $R_8$, $R_7$ ... $R_1$, respectively.

Each output address count of the counter 391 is compared in a comparator 435 with a constant of 1. When the counter 391 has decremented its address count to a count of 1, the comparator 435 develops a signal which is applied to a delay circuit 437. After a delay of a 1 $P_2$ clock period, the output signal of the delay circuit 437 resets the flip flop 399 to terminate the waveform 413 and disable the AND gate 415, thereby preventing any more $P_2$ clocks from being counted by the counter 391. The output of the delay circuit 437 also resets the flip flop 395, by way of the OR gate 393, to terminate the waveform 421, thereby disabling gates 405, 407 and 429. This prevents the outputs of the multiplexers 401 and 403 from being applied to the inputs of the registers 409 and 411. In addition, the disabling of AND gate 429 also prevents the AND gate 429 from applying clocks to the registers 409 and 411.

During the period of time that the index counter 391 is developing address counts of 8, 7 ... 1, the outputs of the multiplexers 401 and 403 ($R_9$, $R_8$ ... $R_2$ and $R_8$, $R_7$ ... $R_1$, respectively) are respectively applied to the registers 409 and 411. The r (radial distance) components of the R signals stored in the registers 409 and 411 are compared together in a comparator 436 to determine which r ($r_{c+1}$ or $r_c$) is larger. If $r_{c+1}$ (which is stored in register 409) is smaller than $r_c$ (which is stored in register 411), the comparator 436 will develop a 1 state signal to indicate that the signals $R_{c+1}$ and $R_c$ must be swapped or re-stored back into the register 327 (FIG. 20) in the reverse order. Otherwise, the comparator 436 will develop a 0 state signal to indicate that $R_{c+1}$ and $R_c$ are not to be swapped.

The binary state output of the comparator 436 is directly applied to gates 438 and 439, as well as being inverted by an inverter 441 before being applied to gates 443 and 445. When the output of the comparator 436 is a 1 state or "swap" signal, only the gates 438 and 439 are enabled. On the other hand, when the output of the comparator 436 is a 0 state or "$\overline{\text{swap}}$" (do not swap) signal, only the gates 443 and 445 are enabled. The address from the adder 423 is applied to the gates 438 and 443, while the address from the index counter 391 is applied to the gates 439 and 445. The outputs of the gates 438 and 445 are applied to an OR gating circuit 447. In a similar manner, the outputs of the gates 439 and 443 are applied to an OR gating circuit 449. The outputs of the OR gating circuits 447 and 449 respectively supply the addresses to store multiplexers 451 and 453. The $R_c$ and $R_{c+1}$ signals from the registers 411 and 409 are also applied to the multiplexers 451 and 453. In response to the addresses from OR gating circuits 447 and 449, the multiplexers 451 and 453 respectively apply the $R_c$ and $R_{c+1}$ signals through a selected pair of the OR gating circuits 361–369 for re-storage in an associated pair of holding registers in the register 327 (FIG. 20).

It will be recalled that the function of the radial order sorter 329 is to index the neighboring features of each RIV of a center feature CF in the order of increasing radial distance from that center feature. To more fully explain this overall function of the radial order sorter 329, an operational example will now be described with reference to FIGS. 20, 21 and 22.

Assume that five neighboring features have been detected and radially sorted since the values $r_1$–$r_9$ in the register 327 were initialized to 31 at the time of the last "next RIV" pulse (FIG. 11A). As a result, assume that $r_1$–$r_9$, the radially sorted distances of the signals $R_1$–$R_9$ stored in the holding registers 381–389 of the register 327 (FIG. 20), are respectively equal to 16, 18, 19, 20, 23, 31, 31, 31 and 31. Finally, assume that a new neighboring feature $R_9$ of the center feature CF has been detected, and that the radial distance $r_9$ of the signal $R_9$ is 21. The resultant pulse 343 (FIG. 13) enables this new neighboring feature $R_9$ to be stored in the holding register 389 and resets the index counter 391 to 0. Thus, this new $R_9$ signal displaces the old $R_9$ signal. Consequently, at this time the $r_1$–$r_9$ values of the signals $R_1$–$R_9$ are respectively equal to 16, 18, 19, 20, 23, 31, 31, 31 and 21.

After $R_9$ has been stored in the holding register 389, the inverted trailing edge of the pulse 343 sets the flip flop 399 to enable the AND gate 415 to pass the stream of eight $P_2$ clocks 419 to the index counter 391 to be counted.

The first clock 419 from the AND gate 415 causes the index counter 391 to develop an address count of 8. As a result, the compare multiplexers 401 and 403 respectively select and apply the new neighboring feature $R_9$ and the signal $R_8$ through the gates 405 and 407 for storage in the registers 409 and 411, respectively. The values of $r_9$ and $r_8$ of the signals $R_9$ and $R_8$ are compared in the comparator 436. Since it was assumed that $r_9 = 21$ and $r_8 = 31$, the comparator 436 will develop a 1 state "swap" output. This 1 state swap output enables the gates 438 and 439 to respectively pass the addresses from the adder 423 and counter 391 through the OR gating circuits 447 and 449 to the store multiplexers 451 and 453, respectively. Thus, the multiplexer 451 applies the $R_8$ signal out on its $R_9$ address line, through OR gating circuit 369 and into holding register 389. At the same time, the multiplexer 453 applies the $R_9$ signal out on its $R_8$ address line, through OR gating circuit 368 and into holding register 388. It can therefore be seen that the $R_9$ and $R_8$ signals, that were respectively multiplexed out of the holding registers 389 and 388, have been swapped, with $R_9$ and $R_8$ being respectively multiplexed back into holding registers 388 and 389. As indicated before, the signals stored in the holding registers 381-389 are $R_1$-$R_9$ respectively. Thus, the old $R_9$ and $R_8$ signals respectively become the new $R_8$ and $R_9$ signals after being swapped. As a result, at the end of the first clock 419 period, the $r_1$-$r_9$ values of the $R_1$-$R_9$ signals are 16, 18, 19, 20, 23, 31, 31, 21 and 31.

The second clock 419 causes the index counter 391 to decrement its count to 7. As a result, the compare multiplexers 401 and 403 select the $R_8$ and $R_7$ signals from the holding registers 388 and 387, respectively, for respective storage in the registers 409 and 411. The values of $r_8$ and $r_7$ (21 and 31, respectively) of the signals $R_8$ and $R_7$ cause the comparator 436 to develop a 1 state "swap" signal which subsequently results in $R_8$ and $R_7$ being stored in the holding registers 387 and 388, respectively. Thus, at the end of the second clock 419 period, the $r_1$-$r_9$ values of the $R_1$-$R_9$ signals at that time are 16, 18, 19, 20, 23, 31, 21, 31 and 31, respectively. Similarly, the fourth clock 419 causes the counter 391 to decrement its count to 5, which in turn results in the $r_1$-$r_9$ values of the $R_1$-$R_9$ signals being equal to 16, 18, 19, 20, 21, 23, 31, 31 and 31, respectively, at the end of the fourth clock 419 period.

During the fifth clock 419 period, the adder 423 address is 5 and the index counter 391 address is 4. At this time $r_5 = 21$ and $r_4 = 20$. Therefore, the comparator 436 will develop a 0 state $\overline{swap}$ signal which will disable the gates 438 and 439, while the inversion of this 0 state $\overline{swap}$ signal will enable the gates 443 and 445. As a result, the index counter 391 address will be applied through the circuits 445 and 447 to enable the multiplexer 451 to initiate the restoration of the $R_4$ signal back into the holding register 384 from which it was multiplexed. At the same time, the adder 423 address will be applied through the circuits 443 and 449 to enable the multiplexer 453 to initiate the restoration of the $R_5$ signal back into the holding register 385 from which it was multiplexed. At the end of the fifth clock 419 period, the $r_1$-$r_9$ values of the $R_1$-$R_9$ signals will respectively remain equal to 16, 18, 19, 20, 21, 23, 31, 31 and 31, since the newest neighboring feature has now been radially sorted in the order of increasing radial distance from the center feature. In a like manner, each of the subsequent sixth, seventh and eighth clocks 419 will not affect the order of these radially sorted signals $R_1$-$R_9$.

The center feature CF and signals $R_1$-$R_8$ are applied from the register 327 (FIG. 20) to the output circuit 345. A block diagram of the output circuit 345 is illustrated in FIG. 23, which will now be discussed.

Figure 23:
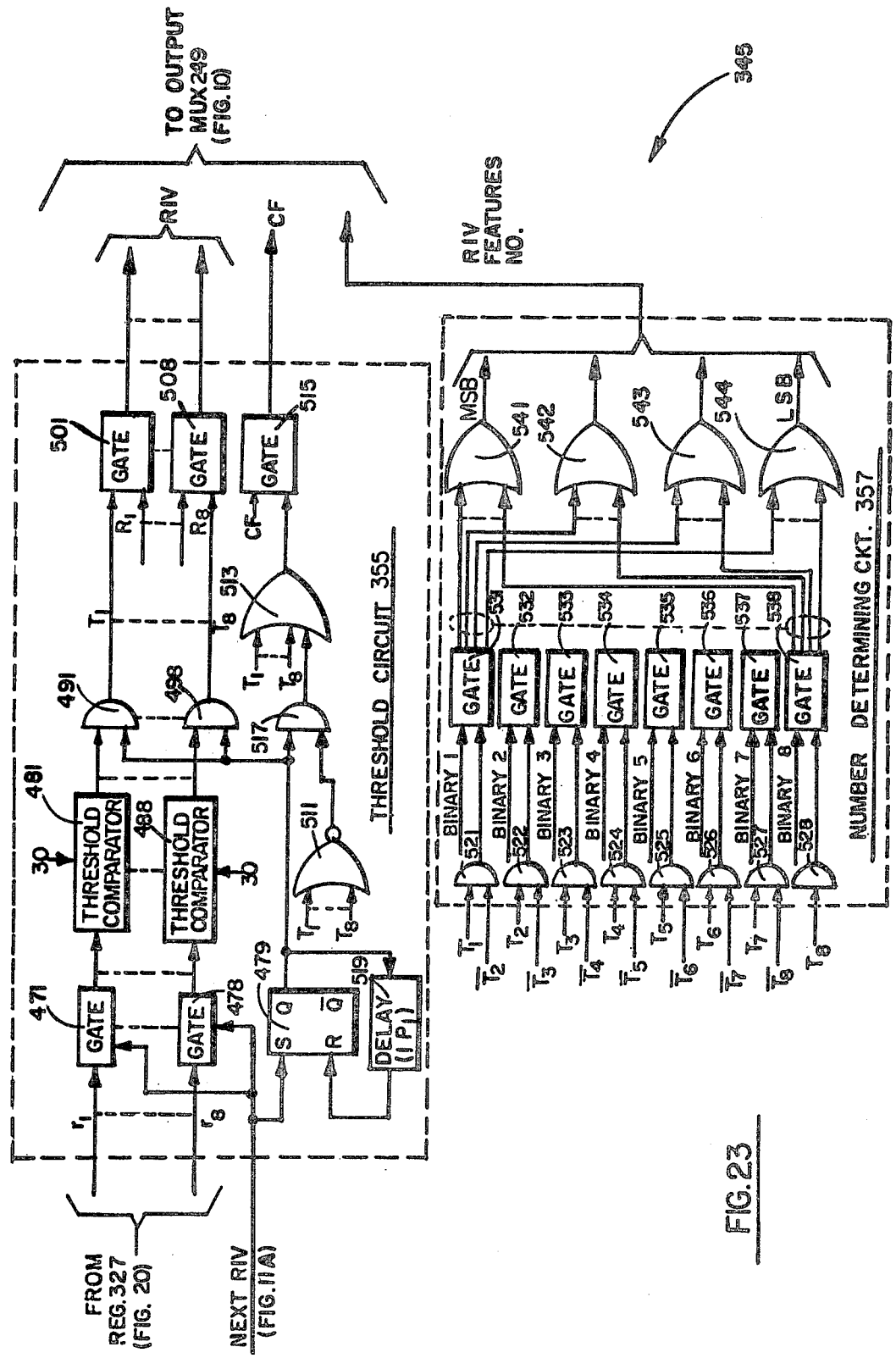
FIG. 23 is a block diagram of the output circuit of FIG. 19.

As shown in FIG. 23, the output circuit 345 is comprised of the threshold circuit 355 and the number determining circuit 357. The threshold circuit 355 essentially blocks or eliminates those ones of the input $R_1$-$R_8$ signals which have r value that are still initialized to a value of 31. By this means, only those signals of $R_1$-$R_8$, whose radial values $r_i$ passed the threshold test of comparator 341 (FIG. 13), will be developed by the threshold circuit 355 as neighboring features within the RIV of the input center feature CF. The number determining circuit 357 utilizes signals from the threshold circuit 355 to determine the number of neighboring feature (RIV features number) in the RIV being developed by the threshold circuit 355. Each of the circuits 355 and 357 is separately discussed in greater detail below.

The $r_1$-$r_8$ components of the radially sorted signals $R_1$-$R_8$ are applied to the inputs of gates 471-478, respectively, in the threshold circuit 355. The "next RIV" signal (FIG. 11A) is also applied to the gates 471-478, as well as to the set input of a flip flop 479. It should be recalled at this time that a "next RIV" is generated (by the timing and control unit 69 of FIG. 11A) at the completion of an RIV. By this time the center feature CF and final $R_1$-$R_8$ data from the register 327 (FIG. 20) have stabilized, since all of the neighboring features in an RIV have been detected.

The "next RIV" signal enables the gates 471-478 to respectively pass the values $r_1$-$r_8$ to threshold comparators 481-488, where each of the values $r_1$-$r_8$ is compared against a threshold value of 30. Each of the threshold comparators 481-488 is implemented to develop a 1 state threshold output (T) if the value of its r input does not exceed the threshold value of 30. If otherwise, a threshold comparator will develop a 0 state threshold output.

The output of the flip flop 479, which was set by the "next RIV signal", enables AND gates 491-498 to pass the outputs ($T_1$-$T_8$) of the comparators 481-488 to gates 501-508. Also applied to the gates 501-508 are the $R_1$-$R_8$ signals from the register 327 (FIG. 20). Those of the $T_1$-$T_8$ outputs of the comparators 481-488, which are 1 state outputs, will enable the associated ones of the gates 501-508 to pass the corresponding ones of the radially sorted $R_1$-$R_8$ signals out as the neighboring features that form the RIV of the associated center feature CF. Thus, it can be seen that any R signal having an r component value that is still at the initialized value of 31 will cause its associated threshold comparator to develop a 0 state threshold output T, which will in turn prevent its associated gate from passing that R signal.

All of the $T_1$-$T_8$ threshold output from AND gates 491-498 are also applied to NOR gate 511 and OR gate 513. If any of the $T_1$-$T_8$ outputs is a 1 state signal, the OR gate 513 will develop a signal to enable gate 515 to pass the center feature CF to its output. On the other hand, if all of the $T_1$-$T_8$ outputs are 0 state signals, the NOR gate 511 will apply a 1 state signal to a first input of AND gate 517. The AND gate 517, like the gates 491–498, was enabled by the output of the flip flop 479 which was set by the "next RIV" signal. Therefore, the "1" state output of NOR gate 511 will pass through AND gate 517 and OR gate 513 to enable the gate 515 to pass the center feature CF to its output. Consequently, it can be seen that the center feature CF of an RIV is always developed, even though the number of neighboring features (RIV features number) in the RIV of that CF can vary from a maximum of 8 to a minimum of 0.

The output of flip flop 479, which enabled gates 491–498 and 517, is delayed for 1 $P_1$ clock pulse period by delay circuit 519 before it resets the flip flop 479 to directly disable the gates 491–498 and 517 and indirectly disable the gates 501–508 and 515.

During the time that the AND gates 491–498 are enabled by the flip flop 479 to develop the threshold outputs $T_1$–$T_8$, the outputs $T_1$–$T_8$ are respectively applied to AND gates 521–528 in the number determining circuit 357. In addition, the negation of the outputs $T_2$–$T_8$, or $\overline{T_2}$–$\overline{T_8}$, are respectively applied to the AND gates 521–527. With this implementation, only one of the gates 521–528 will develop a 1 state output, and that one gate will indicate the number of neighboring features in the RIV being developed by the threshold circuit 355.

The 0 or 1 state outputs of AND gates 521–528 are applied to the inputs of gates 531–538. Also applied to the gates 531–538 are 4-bit binary numbers 1–8, respectively. Each of the gates 531–538 develops a 4-bit output, which may be 0 (0000). The four bits from each of these gates 531–538 are respectively applied to OR gates 541–544, with the least significant and most significant bits being respectively applied to OR gates 541 and 544.

Only that one of the AND gates 521–528, which develops a 1 state output, will enable its associated one of the gates 531–538 to, in turn, apply its associated input 4-bit binary number to the OR gates 541–544. It is the collective 4-bit binary output of these four OR gates 541–544 which comprises the number of neighboring features (RIV features number) in the RIV that is developed by the threshold circuit 355.

The operation of the number determining circuit 357 will be further described in the following examples.

In the first example, if $r_1 = 30$ or less and $r_2$–$r_8$ are each equal to 31, $T_1 = 1$ and $T_2$–$T_8$ are each equal to 0. In this case, only AND gate 521 would develop a 1 state output, which would enable gate 531 to respectively pass the four bits in the binary 1 (0001) to OR gates 541–544. Consequently the OR gates 541–544 would respectively develop the output bits 0, 0, 0 and 1 indicate that the RIV features number of the RIV is one (0001).

In a second example, if $r_1$–$r_5$ are each equal to 30 or less and $r_6$–$r_8$ are each equal to 31, $\overline{T_1}$–$\overline{T_5}$ are each equal to 1 and $T_6$–$T_8$ are each equal to 0. Since $T_1$–$T_5$ are each equal to 1, $\overline{T_1}$–$\overline{T_5}$ are each equal to 0 and AND gates 521–524 are disabled. Since $T_6$–$T_8$ are each equal to zero, AND gates 526–528 are likewise disabled. Only AND gate 525 is enabled since both $T_5$ and $\overline{T_6}$ are equal to 1. The 1 state output of AND gate 525 enables the gate 535 to respectively pass the four bits in its binary 5 input (0101) through OR gates 541–544 to indicate that the RIV features number of the RIV is five (0101).

Finally, in a third example, if $r_1$–$r_8$ are each equal to 31, all of the gates 521–528 would be disabled and the OR gates 541–544 would collectively develop an output of 0000 to indicate that there are not neighboring features in the RIV for the center feature CF.

The center feature CF, the RIV of that center feature, and the RIV features number of the RIV are all applied in parallel from the output circuit 345 of the RIV encoder 259 to the output multiplexer 249 (FIG. 10) for further processing, as discussed previously.

Figure 24:
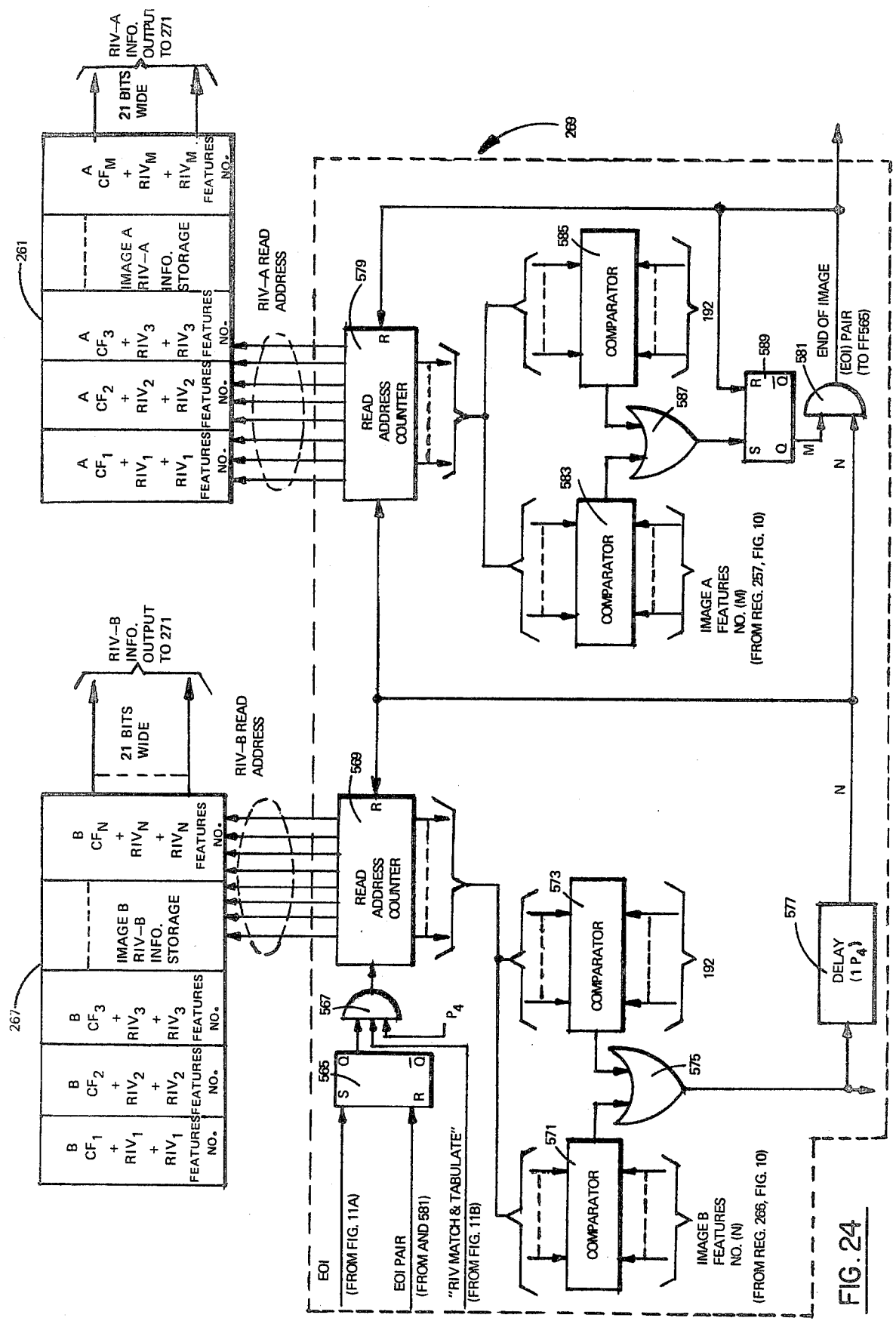
FIG. 24 is a block diagram of the RIV selector of FIG. 10.

Referring now to FIG. 24, a block diagram of the RIV selector 269, as well as the RIV-B and RIV-A information storage circuits 267 and 261, of FIG. 10 is illustrated. It will be recalled that an RIV is generated by the RIV encoder 259 (FIG. 10) for each of the features in a map image. For purposes of this discussion, assume that there are M features in map image A and N features in map image B. Consequently, the RIV-A information signals in circuit 261 contain image A RIVs 1 to M (or 1-M) and the M center features ($CF_1$-$CF_M$) of those RIVs, as well as the RIV features number in each of those RIVs. In a like manner the RIV-B information signals in circuit 267 contain image B RIVs 1 to N (or 1-N) and the N center features ($CF_1$-$CF_N$) of those RIVs, as well as the RIV features number in each of those RIVs. While the number M does not have to be equal to the number N, neither M nor N is greater than 192.

Figure 25:
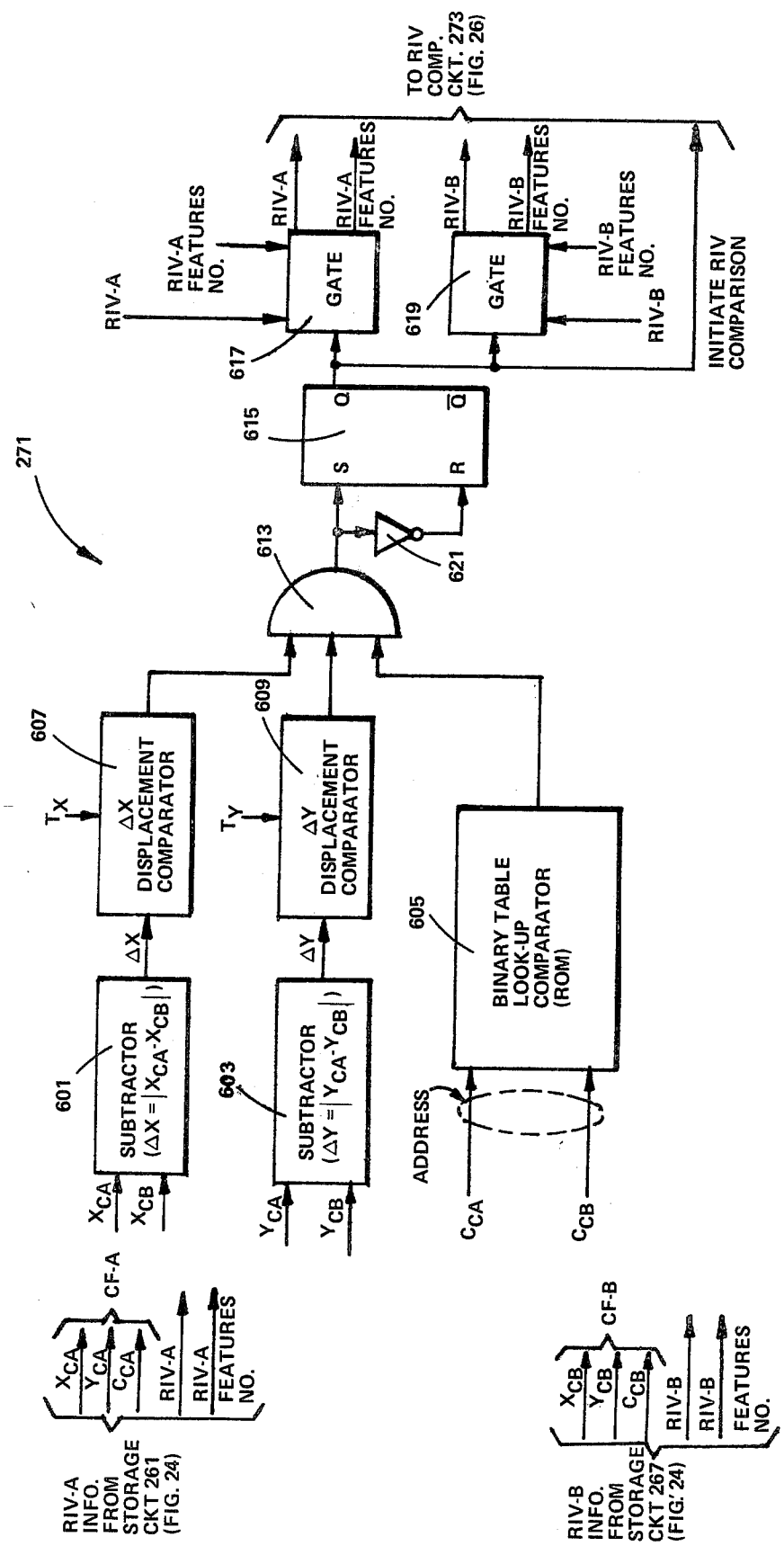
FIG. 25 is a block diagram of the center features comparison circuit of FIG. 10.

The EOI signal that occurs at the end of image A sets a flip flop 565 to enable a first input of an AND gate 567. Applied to a second input of the AND gate 567 and $P_4$ clocks. However, these $P_4$ clocks are prevented from passing through the AND gate 567 because a third input of the AND gate 567 is in a 0 state at this time (since no 1 state "RIV match and tabulate" signal from FIG. 11B is present). It will be recalled that the EOI signal which occurs after image B has been RIV-encoded generates an "RIV match and tabulate" signal (see discussion on FIG. 11B). This "RIV match and tabulate" signal now enables the AND gate 567 to pass $P_4$ clocks to a read address counter 569 to be counted. In counting $P_4$ clocks, the counter 569 develops RIV-B read addresses or address counts from 1 to N. In response to these address counts, the storage circuit 267 sequentially accesses each of the RIV-B information signals 1-N of image B for application to the center features comparison circuit 271 (FIG. 10 or 25).

The address counts of the counter 569 are also compared in a comparator 571 with the image B features number (from register 559) and in a comparator 573 with a constant of 192. If N is 191 or less, the comparator 571 will develop a 1 state signal when the address count of the counter 569 becomes equal to N. On the other hand, if N is 192 or more, the comparator 573 will develop a 1 state signal when the address count of the counter 569 becomes equal to 192.

When either of the comparators 571 and 573 develops a 1 state signal, that 1 state signal is serially applied through an OR gate 575 and a delay circuit 577. The output of the delay circuit 577 will henceforth be referred to as an "N" signal. This "N" signal occurs when all of the N (or 192) RIV-B information signals of image B in the storage circuit 267 have been sequentially applied to the comparison circuit 271 (FIG. 10). The delay of the delay circuit 577 is equal to one $P_4$ clock period. This allows the last RIV-B information signal in the storage circuit 267 to be applied to the circuit 271 for a full $P_4$ clock period before the counter 569 is reset.

The N signal from the delay circuit 577 resets the counter 569 to an address count of zero, increments a read address counter 579 by one, and is applied to an AND gate 581 (to be explained).

Each time that the counter 569 is reset to a count of zero, the counter 579 increments its count by one to develop a different RIV-A read address or address count. In this manner, the counter 579 develops address counts from 1 to M. In response to these address counts, the storage circuit 261 sequentially accesses each of the RIV-A information signals 1-M of image A for application to the center features comparison circuit 271 (FIG. 10 or 25).

As described above, the counter 579 increments its address count by one each time after all of the N RIV information signals in the circuit 267 have been sequentially applied to the circuit 271. Thus, during each period of time that one of the M RIV information signals of image A is being applied from the circuit 261 to the circuit 271, all of the RIV information signals in the circuit 267 are sequentially applied to the circuit 271.

The address counts of the counter 579 are also compared in a comparator 583 with the image A features number (from the register 257) and in a comparator 585 with a constant of 192. If M is 191 or less, the comparator 583 will develop a 1 state signal when the address count of the counter 579 becomes equal to M. On the other hand, if M is 192 or more, the comparator 585 will develop a 1 state signal when the address count of the counter 579 becomes equal to 192.

When either of the comparators 583 and 585 develops a 1 state signal, that 1 state signal is applied through an OR gate 587 to set a flip flop 589 to develop an "M" signal output. This "M" signal occurs at the beginning of the time period when the Mth (or 192nd at the most) RIV-A information signal of image A is being applied from the circuit 261 to the circuit 271 (FIG. 10).

The M signal from the flip flop 589 is used to enable the AND gate 581. As stated before, all of the N RIV-B information signals are sequentially accessed from the circuit 267 during the period of time when the Mth RIV-A information signal is being accessed from the circuit 261. When all of the RIV-B information signals have been accessed from the circuit 267, the N signal is generated and applied through the enabled AND gate 581. The output of the AND gate 581 is an "end of image (EOI) pair" signal, which indicates that all of the combinations of pairs of RIV information signals in the pair of A and B images have been applied to the comparison circuit 271 (FIG. 10).

This end of image pair signal is generated coincident in time with an N signal that resets the flip flop 565 and the counter 569. The end of image pair signal resets the counter 579 to a count of 1, and resets the flip flop 589 to terminate the M signal. The termination of the M signal disables the AND gate 581, thereby terminating the end of image pair signal.

The RIV selector 269 is now in a quiescent state, with the flip flops 565 and 589 and counters 569 and 579 all being in a reset condition. The RIV selector 269 remains in this quiescent state until after another map image A is sensed at the next checkpoint, at which time the subsequent operation of the RIV selector 269 is similar to that previously described. When a subsequent B image is fetched from the map images storage circuit 57 (FIG. 2) by the start image B signal, it is initially processed by the data converter 61 (FIG. 10), with the EOI signal (from FIG. 11A) setting the flip flop 565 to start the above described selective accessing operation of the RIV-A and new RIV-B information signals.

The RIV-A and RIV-B information signals from the storage circuits 261 and 267 are applied to the center features comparison circuit 271 (FIG. 10). The comparison circuit 271 will now be more fully discussed by referring to the block diagram of the comparison circuit 271 illustrated in FIG. 25.

Each RIV information signal is comprised of a center feature ($X_c$, $Y_c$, $C_c$), followed by the RIV of that center feature and the RIV features number of that RIV. At any given time, let the parameters of the center feature of RIV-A (CF-A) be designated as $X_{CA}$, $Y_{CA}$, $C_{CA}$, and the parameters of the center feature of RIV-B be designated as $X_{CB}$, $Y_{CB}$, $C_{CB}$. The values of $X_{CB}$ and $Y_{CB}$ are respectively subtracted from the values $X_{CA}$ and $Y_{CA}$ in subtractors 601 and 603, respectively. Respectively developed at the outputs of the subtractors 601 and 603 are the signals $\Delta X$ and $\Delta Y$, which represent the absolute magnitudes of the associated parameter differences. More specifically, $\Delta X$ and $\Delta Y$ respectively represent the X and Y displacements between the center features of the RIVs A and B being compared at a given time. To accomplish these subtractions, the subtractors 601 and 603 may be implemented in a conventional two's complement arrangement.

The combination of the binary feature classes, $C_{CA}$ and $C_{CB}$, of the center features CF-A and CF-B is used to address a binary table look-up comparator or ROM 605. The ROM 605 can be implemented, for example, to develop a 1 state output only when the center feature class $C_{CA}$ of center feature CF-A is the same as, or similar enough to, the center feature class $C_{CB}$ of center feature CF-B to warrant the subsequent comparison of neighbor features.

The $\Delta X$ and $\Delta Y$ displacements between the two center features CF-A and CF-B are respectively compared with preselected threshold values $T_X$ and $T_Y$ in $\Delta X$ and $\Delta Y$ displacement comparators 607 and 609, respectively. Each comparator is implemented to develop a 1 state output when the amplitude of the associated displacement input does not exceed the associated threshold value. Each of the threshold values $T_X$ and $T_Y$ may be chosen, for example, to represent 350 units, where each unit is equal to 20 feet. However, the values of threshold values $T_X$ and $T_Y$ may be preselected to suit the type of operation desired.

The outputs of the comparators 607 and 609 and ROM 605 are applied to an AND gate 613. AND gate 613 can only develop a 1 state output signal when the X-coordinate difference ($\Delta X$) is less than $T_X$, the Y-coordinate difference ($\Delta Y$) is less than $T_Y$ and the ROM 605 develops a 1 state output. A 1 state output from the AND gate 613 is therefore developed only when the parameters of the center features of RIVs A and B are all sufficiently close to each other.

A 1 state output from the AND gate 613 sets a flip flop 615 to generate an "initiate RIV comparison" signal which enables gates 617 and 619 to respectively pass RIV-A and RIV-B, as well as the respective RIV-A and RIV-B features numbers of those RIVs, to the RIV comparison circuit 273 (FIG. 26) for the second or RIV comparison test. The "initiate RIV comparison" signal from flip flop 615 is also applied to the RIV comparison circuit 273. When the output of the AND gate 613 changes from a 1 state back to a 0 state signal (at the end of a successful center features comparison), that 0 state signal is inverted by an inverter 621 to reset the flip flop 615, which in turn terminates the "initiate RIV comparison" signal and disables the gates 617 and 619.

If all of the parameters of the center features of the RIVs A and B are not sufficiently close to each other, the gates 617 and 619 remain disabled and the RIVs A and B (of the center features being compared at that time) and the RIV-A and RIV-B features numbers of those RIVs are thereby prevented from being applied to the RIV comparison circuit 273.

Each of the gates 617 and 619 can be comprised of a plurality of two-input AND gates (not shown), whose first inputs are commonly enabled by the output of the flip flop 615 (when set) to individually pass in parallel the bits in the associated RIV (and RIV features number of that associated RIV) that are respectively applied to the second inputs.

Figure 26:
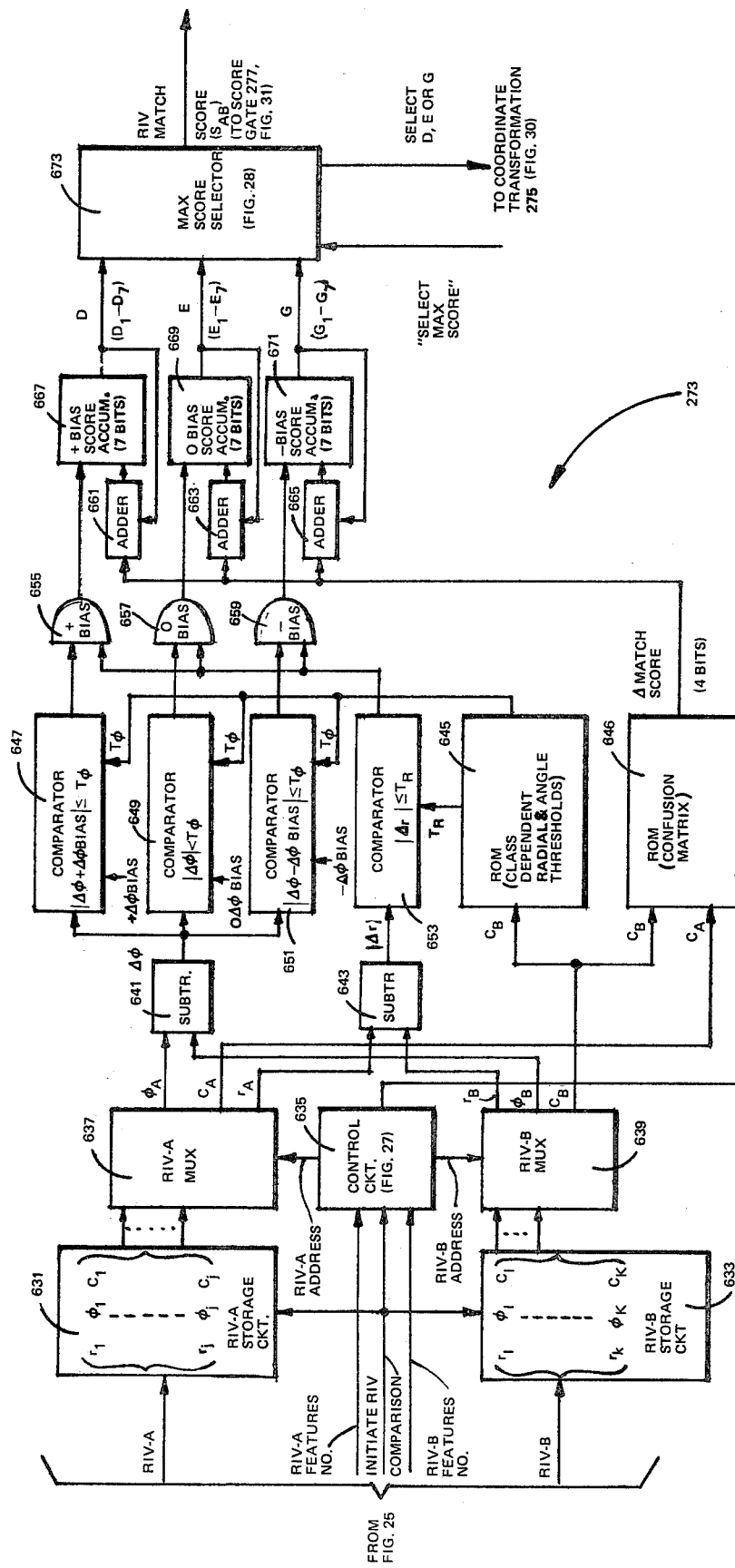
FIG. 26 is a block diagram of the RIV comparison circuit of FIG. 10.

Referring now to FIG. 26, a block diagram of the RIV comparison circuit 273 is illustrated. The RIVs A and B, the "initiate RIV comparison" signal, and the RIV-A and RIV-B features number signals are all received from the center features comparison circuit 271 (FIG. 25). Basically, the function of the RIV comparison circuit 273 is to develop an RIV match score ($S_{AB}$) which indicates the degree of similarity or match between RIV-A and RIV-B.

The "initiate RIV comparison" signal enables RIV-A and RIV-B storage circuits 631 and 633 to parallel to store RIV-A and RIV-B respectively. Each of the storage circuits 631 and 633 can be comprised of a bank of eight holding registers (not shown) for respectively storing up to eight neighboring features in r, $\phi$, C format. The "initiate RIV comparison" signal also enables a control circuit 635 to store the RIV-A and RIV-B features number signals.

Each of the neighboring features of RIV-A in the storage circuit 631 are parallel-applied to the input of an RIV-A multiplexer 637. Likewise, each of the neighboring features of RIV-B in the storage circuit 633 are parallel-applied to the input of an RIV-B multiplexer 639. In response to the "initiate RIV comparison" signal and RIV-A and RIV-B features number signals, the control circuit 635 develops a sequence of 4-bit RIV-A addresses, as well as a sequence of 4-bit RIV-B addresses during the time of each RIV-A address. The RIV-A addresses enable the multiplexer 637 to sequentially multiplex out each of the neighboring features in RIV-A, and the RIV-B addresses enable the multiplexer 639 to sequentially multiplex out each of the neighboring features in RIV-B. However, the same sequence of RIV-B addresses are developed during each different RIV-A address. For example, assume that there are five neighboring features in RIV-A and seven neighboring features in RIV-B. In this case there will be five RIV-A addresses (0001-0101) and seven RIV-B addresses (0001-0111). During the first RIV-A address of 0001, the first feature in RIV-A is multiplexed to the output of the RIV-A multiplexer 637, and all seven of the features in RIV-B are sequentially multiplexed out of the RIV-B multiplexer 639 by the RIV-B addresses 0001-0111. In a similar manner, during the fifth RIV-A address of 0101, the fifth feature in RIV-A is multiplexed to the output of the multiplexer 637 and all seven of the features in RIV-B are sequentially multiplexed out of the multiplexer 639 by the RIV-B addresses 0001-0111. In this way, each encoded neighboring feature of RIV-A can be subsequently compared against each of the sequence of encoded neighboring features of RIV-B.

At any given time, let the parts of the neighboring feature being multiplexed out of multiplexer 637 be represented by $r_A$, $\phi_A$ and $C_A$ and the parts of the neighboring feature being multiplexed out of multiplexer 639 be represented by $r_B$, $\phi_B$ and $C_B$. The angular mismatch in $\phi$, or $\Delta\phi$, between these two neighboring features of RIV-A and RIV-B is obtained by subtracting $\phi_B$ from $\phi_A$ in a subtractor 641. Likewise, the radial mismatch $\Delta r$ is obtained by subtracting $r_B$ from $r_A$ in a subtractor 643.

The binary feature class $C_B$ from multiplexer 639 is used to address a ROM 645. Each feature class may have a position uncertainty of its own. Thus, the type of feature class $C_B$ determines the amplitudes of radial mismatch and angle limit thresholds $T_R$ and $T_\phi$, respectively, at the output of the ROM 645. The combination of the binary feature classes $C_A$ and $C_B$ of the neighbor features from multiplexers 637 and 639, respectively, is used to address a confusion matrix or ROM 646. The output of the confusion matrix 646 is a 4-bit $\Delta$ match score which indicates the degree of similarity of the feature classes of the neighbor features being compared. It should be noted that each feature class of FIG. 3A may also be ranked in the order of its preselected relative importance for the desired system operation. For example, a road intersection (+ in FIG. 3A) may be a rare event and, when detected, be given more importance than other features. This relative importance of the type of feature class is also accounted for by the confusion matrix 646. A simplified example of a three-feature class, confusion matrix is shown in the following table:

| CONFUSION MATRIX TABLE | | | |
|---|---|---|---|
| | Feature Classes in Sensed Map | | |
| | | $A_M$ | $B_M$ | $C_M$ |
| Feature Classes in Reference Map | $A_M$ | 10 | 0 | 0 |
| | $B_M$ | 0 | 3 | 1 |
| | $C_M$ | 0 | 1 | 3 |

In the above simplified table, let $A_M$ be a rare feature class which is very important, and let $B_M$ and $C_M$ be feature classes that can be easily confused with each other but not with $A_M$. The smaller the value in the table, the greater the chance that the classes of the neighbor features being compared will be confused. Conversely, the larger the value in the table, the less chance that the compared feature classes will be confused. Another way this could be stated is that the larger the table value, the higher the probability that the feature class in the sensed map is the same as the compared feature class in the reference map. For example, $A_M$ can be a bright spot on a dark background (feature class 7 in FIG. 3A), $B_M$ can be an intersection (+ in FIG. 3A) and $C_M$ can be a dead end ($\perp$ in FIG. 3A). It can be readily seen that the intersection may have been mistaken for a dead end, or vice versa, but neither of these was mistaken for a bright spot on a dark background.

The angular mismatch signal $\Delta\phi$ and a threshold angle limit signal $T_\phi$ are applied to each of comparators 647, 649 and 651. In addition, positive (+), zero (0) and negative (−) $\Delta\phi$ angle biases are applied to the comparators 647, 649 and 651, respectively. These +, 0 and − angle biases are binary numbers which respectively represent, for example, approximate angles of rotation of approximately +3°, 0° and −3° to test the extent of the angular mismatch in $\phi$ between RIV-A and RIV-B in three different ranges.

Binary numbers, representing these angle biases of approximately +3°, 0° and −3°, can be derived in the following manner. The 256 different binary numbers in one byte, or 8 bits, can be used to represent 256 different angles around the 360° of a circle. Therefore, between adjacent binary numbers in the byte, there will be 360/256 degrees (approximately 1.4°) of angle. As a result, binary numbers of 2 (00000010), 0 (00000000) and 254 (11111110) would respectively represent angle biases of approximately +3°, 0° and −3°, with 11111110 being the two's complement of 00000010.

Each of the comparators 647 and 651 is implemented to develop a 1 state output when the absolute value of the algebraic sum of the associated input angle bias and the angular mismatch $\Delta\phi$ is equal to or less than the threshold angle limit signal $T_\phi$. Similarly, the comparator 649 is implemented to develop a 1 state output when the absolute value of $\Delta\phi$ is less than $T_\phi$. For example, assume $T_\phi=1.4°$, $+\phi$ bias$=+3°$, $0\phi$ bias$=0°$ and $-\phi$ bias$=-3°$. Thus, if $\Delta\phi$ is within the range from −1.6° to −4.4°, the comparator 647 will develop 1 state output since $|\Delta\phi+3°|\leq 1.4°$. Likewise, if $\Delta\phi$ is within the range between −1.4° and +1.4°, the comparator 649 will develop a 1 state output since $|\Delta\phi|<1.4°$. Finally, if $\Delta\phi$ is within the range from +1.6° to +4.4°, the comparator 651 will develop a 1 state output since $|\Delta\phi-3°|\leq 1.4°$.

At most, depending upon the angular mismatch in $\phi$, only one of these comparators 647, 649 and 651 can develop a 1 state output at any given time. However, it should also be apparent that the neighboring features pair being compared may be excessively rotated with respect to each other such that $\Delta\phi$ may be outside the range limits of all of the comparators 647, 649 and 651. Therefore, none of these comparators would develop a 1 state output. For instance, in the above example $\Delta\phi$ could represent an angular mismatch of +4.6° or −4.6°.

Radial mismatch $\Delta r$ is compared in comparator 653 with the radial mismatch threshold limit $T_R$ from ROM 645. The comparator 653 will only develop a 1 state output if $\Delta r$ is equal to or less than the value of $T_R$.

In retrospect it can be seen that the comparators 647, 649 and 651 are respectively related to three different sets of limits of angular rotations of the neighboring features pairs, and hence of the RIV-A and RIV-B that are being compared. These comparators 647, 649 and 651 have their outputs respectively applied to the inputs of positive (+), zero (0) and negative (−) bias AND gates 655, 657 and 659. The output the comparator 653 (which just determines whether or not the radial mismatch $\Delta r$ between the two radii $r_A$ and $r_B$ is within the preselected threshold $T_R$) is commonly applied to each of the AND gates 655, 657 and 659.

If the RIVs A and B, that are being compared, are rotated with respect to each other, the neighboring features within those RIVs are also rotated with respect to each other. If the radial mismatch $\Delta r$ (of a neighboring features pair being compared) is within the radial threshold $T_R$ and the angular mismatch $\Delta\phi$ (of that neighboring features pair) is within the angle threshold $T_\phi$ of one of the comparators 647, 649 and 651, the associated one of the AND gates 655, 657 and 659 will develop a 1 state enabling output. For example, if the $\Delta\phi$ or $\Delta r$ mismatch signals of a compared pair of features from RIV-A and RIV-B lie within the $T_{100}$ and $T_R$ threshold limits (i.e., $|\Delta\phi+\Delta\phi$ bis$|\leq T_\phi$ and $\Delta r\leq T_R$) of the comparators 647 and 653, the comparators 647 and 653 will develop 1 state output signals to enable AND gate 655 to develop a 1 state output. In a like manner each feature of RIV-A is compared with each of the features of RIV-B to cause one, or none, of the AND gates 655, 657 and 659 to develop an output.

The outputs of AND gates 655, 657 and 659 are applied to + bias, 0 bias and − bias score accumulators 667, 669 and 671. Adders 661, 663 and 665 add the 4-bit $\Delta$ match score from ROM 646 to the respective outputs of the score accumulators 667, 669 and 671. The output sums of the adders 661, 663, and 665 are then respectively applied to the inputs of the accumulators 667, 669 and 671. However, at most, only one of these accumulators will be enabled by the associated one of the AND gates 655, 657 and 659 to accumulate the output sum from the associated adder. For example, when AND gate 655 develops a 1 state output, only the accumulator 667 is enabled to accumulate the output sum of the adder 661.

Each of the score accumulators 667, 669 and 671 can be a 7-bit counter which is initially reset to a zero count by the "initiate RIV comparison" signal. Since each RIV was stated as including up to 8 neighbor features and each $\Delta$ match score was stated to be a 4-bit number, each accumulator can store a maximum count of up to 120 (or 1111000). Therefore, when pairs of neighbor features from RIV-A and RIV-B have been compared, each of these score accumulators can have numbers in it from 0 to 120. In other words, an accumulated score or 0 means that none of the neighboring features matched. Similarly, an accumulated score of, for example, 120 (1111000) means that all of 8 features in RIV-A matched all of 8 features in RIV-B. If, as given before, there are 5 features in RIV-A and seven features in RIV-B, 75 (or 1001011) would be the highest accumulated score that any of the accumulators could have. This would indicate that each of the 5 features in RIV-A found a matching feature in RIV-B. Finally, an intermediate score between a minimum and a maximum can also be accumulated. It can therefore be seen that, at the completion of the comparison of all of the possible pairs of neighboring features from RIVs A and B, one of the accumulators 667, 669 and 671 will contain the largest or maximum accumulated score. Whichever one of the angular rotations of +3° (+ bias) 0° (0 bias) and −3° (− bias) of the comparators 647, 649 and 651 that is required to most closely align RIV-A with RIV-B will cause the associated one of the accumulators 667, 669 and 671 to develop that maximum accumulated score.

Let the 7-bit wide contents, or accumulated scores D, E and G, of the accumulators 667, 669 and 671 be respectively designated as D1-D7, E1-E7 and G1-G7. The accumulated scores of these accumulators 667, 669 and 671 are applied in parallel to a maximum score selector 673. After all of the possible pairs (i times j) of neighboring features in RIV-A and RIV-B have been compared, the control circuit 635 generates a "select maximum score" signal. In response to this "select maximum score" signal, the selector 673 internally generates a 1 state "select D", "select E" or "select G" signal (to be explained) to select the maximum accumulated score from the outputs (D, E and G) of accumulators 667, 669 and 671 at that time. The maximum selected score is developed at the output of the selector 673 as the RIV match score $S_{AB}$, which quantitatively indicates the closeness of match for the RIV pair (RIV-A and RIV-B) that was compared. In addition, the 1 state "select D", "select E" or "select G" signal is applied to the coordinate transformation circuit 275 (FIG. 30) to determine the relative coordinate displacement and angular orientation between the RIV-A and RIV-B pair being compared at that time.

Figure 27:
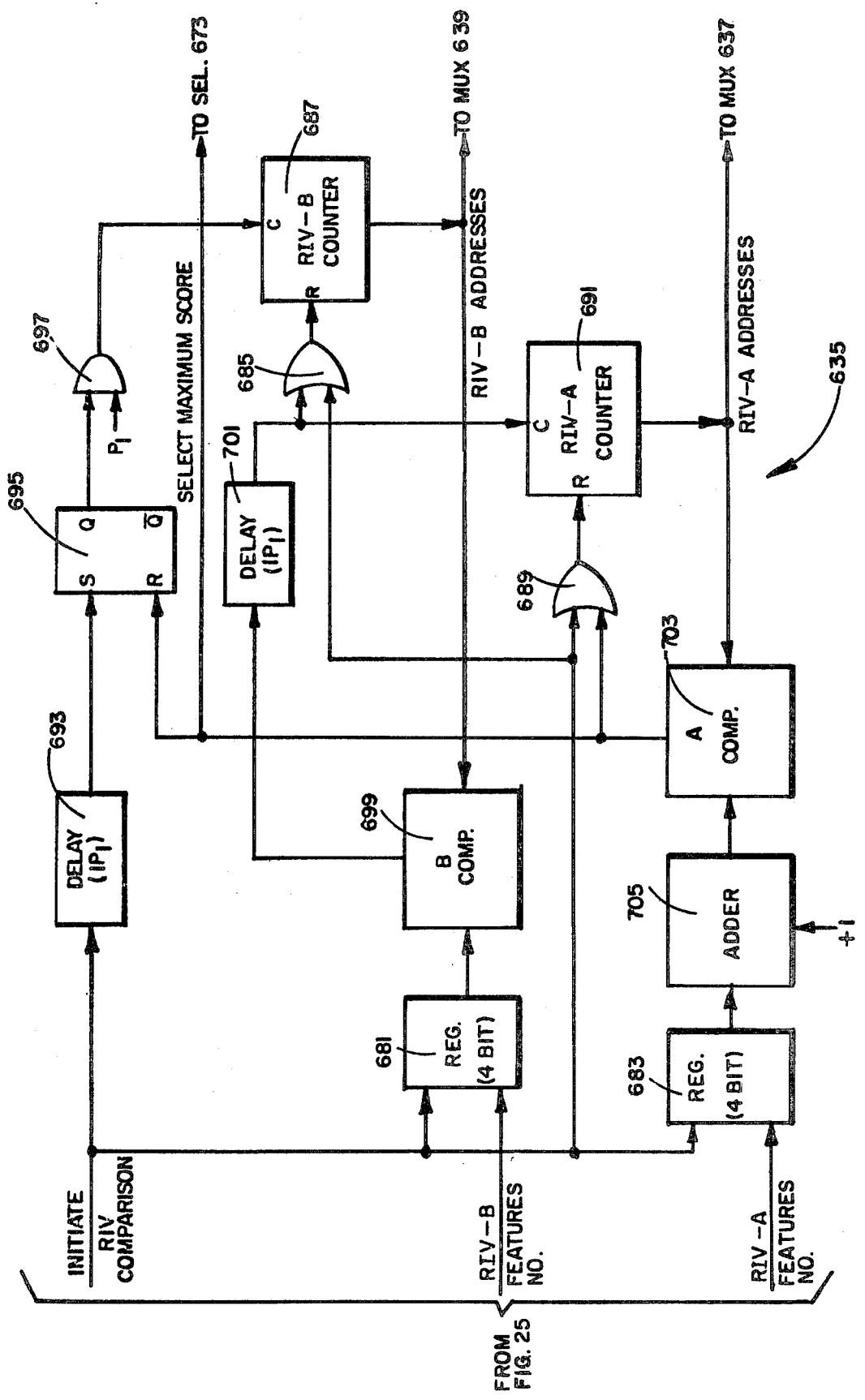
FIG. 27 is a block diagram of the control circuit of FIG. 26.

Referring now to FIG. 27, a block diagram of the control circuit 635 for FIG. 26 will now be discussed.

The initiate RIV comparison signal enables registers 681 and 683 to respectively parallel-store the RIV-B and RIV-A features numbers. In addition, the initiate RIV comparison signal is applied through an OR gate 685 to reset an RIV-B counter 687 to a count of 0, and also through an OR gate 689 to reset an RIV-A counter 691 to a count of 0. The counts of the counters 687 and 691 are the RIV-B and RIV-A addresses, respectively, which are applied to the multiplexers 639 and 637 (FIG. 26). The counters 687 and 691 are reset to 0 counts because, it will be recalled, an RIV may have 0 neighboring features. Finally, the initiate RIV comparison signal is applied through a delay circuit 693 to set a flip flop 695 to enable AND gate 697 to pass $P_1$ clocks to the RIV-B counter 687. The delay time of the delay circuit 693 can be, for example, one $P_1$ clock period to allow sufficient time for the RIV-A and RIV-B features numbers to be stored in the registers 681 and 683 and for each of the counters 687 and 691 to be reset to a count of 0 before the AND gate 697 is enabled to pass $P_1$ clocks.

In response to the $P_1$ clocks from the AND gate 697, the counter 687 starts incrementing its count to develop the RIV-B addresses which are applied to the multiplexer 639 (FIG. 26). These RIV-B addresses from the counter 687 are compared in a B comparator 699 with the RIV-B features number stored in the register 681. When the RIV-B address becomes equal to the RIV-B features number, the comparator 699 develops a 1 state output. This output of the comparator 699 is delayed by a delay circuit 701 for one $P_1$ clock period before it increments the RIV-A counter 691 from a count of 0 to a count of 1. The output of the delay circuit 701 is also applied through the OR gate 685 to reset the RIV-B counter 687 to a count of 0. Thus, it can be seen that, during the time that the RIV-A counter 691 is developing an RIV-A address of 0, the RIV-B counter 687 is developing a sequence of RIV-B addresses from 0 through the RIV-B features number.

Through the above-described operation the RIV-B counter 687 counts $P_1$ clocks to periodically develop a sequence of RIV-B addresses from 0 through the RIV-B features number. Each time that the RIV-B address becomes equal to the RIV-B features number, the comparator 699 develops an output which is delayed by the delay circuit 701 before it is used to reset the RIV-B counter 687 to a count of 0, and to increment the RIV-A counter 691 to the next RIV-A address. In this manner, the RIV-A addresses are developed. As stated before, these RIV-A addresses are applied to the multiplexer 637 (FIG. 26). In addition, these RIV-A addresses from the counter 691 are applied to an A comparator 703.

An adder 705 sums the RIV-A features number from the register 683 with a constant of 1 and applies the resultant sum (RIV-A features number+1) to the comparator 703. After all of the sequence of RIV-B addresses have been developed by the counter 687 during the time that the RIV-A address from counter 691 is equal to the RIV-A features number, the output of the delay circuit 701 again increments the count of the counter 691 by 1. It is at this time that the RIV-A address from the counter 691 becomes equal to the sum (RIV-A features number+1) from the adder 705. As a consequence, the comparator 703 develops the "select score" signal which is applied to the maximum score selector 673 (FIG. 26). Also, this "select maximum score" signal resets the flip flop 695 to disable the AND gate 697 in order to prevent any further $P_1$ clocks from being passed to the RIV-B counter 687. Furthermore, the "select maximum score" signal is applied through the OR gate 689 to reset the counter 691 to a count of 0 and terminate the "select maximum score" signal. At this time, both of the counters 687 and 691 have been reset to 0 counts and are developing RIV-B and RIV-A addresses of 0. Both of the counters 687 and 691 will remain reset to 0 counts, until the following "initiate RIV comparison" signal causes the control circuit 635 (FIG. 26) to repeat the above-described operation.

Figure 28:
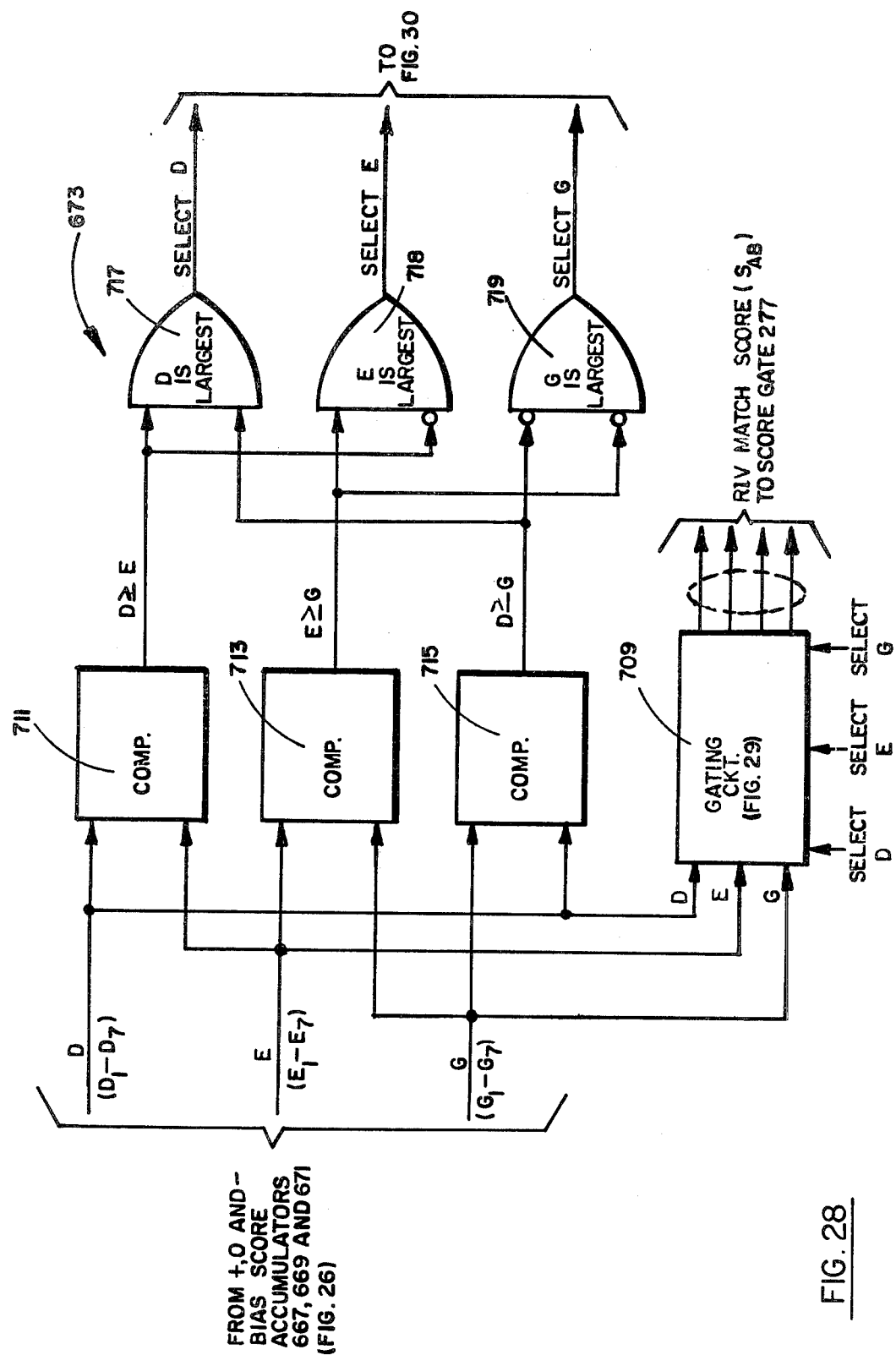
FIG. 28 is a block diagram of the maximum score selector of FIG. 26.

The block diagram of the maximum score selector 673 will now be discussed by referring to FIG. 28. Let the D1-D7, E1-E7 and G1-G7 outputs of the score accumulators 667, 669 and 671 (FIG. 26) be designated as D, E and G signals, respectively. All of these D, E, and G signals are applied to the input of a gating circuit 709. Also, as shown in FIG. 28, a comparator 711 compares the D and E signals, a comparator 713 compares the E and G signals, and a comparator 715 compares the D and G signals. If $D \geq E$, the comparator 711 will develop a 1 state output. In a like manner, if $E \geq G$, the comparator 713 will develop a 1 state output. Similarly, if $D \geq G$, the comparator 715 will develop a 1 state output.

The outputs of the comparators 711 and 715 are applied to an AND gate 717. The outputs of the comparators 711 and 713 are respectively applied to inverted and non-inverted inputs of an AND gate 718. Th outputs of the comparators 713 and 715 are applied to inverted inputs of an AND gate 719. The signal outputs of these AND gates 717, 718 and 719, which are all applied to the gating circuit 709, are respectively designated as "select D", "select E" and "select G". However, at any given time, only one of the "select D", "select E" and "select G" signals will be in a binary 1 state condition with the other two signals being in 0 state conditions.

If $D \geq E$ and $D \geq G$, the AND gate 717 will develop a 1 state "select D" signal to indicate that the D signal is the largest signal. A 1 state "select D" signal will enable the gating circuit 709 to select the D signal as the output RIV match score signals ($S_{AB}$).

If $E \geq G$ and $E \geq D$, the AND gate 718 will develop a 1 state "select E" signal to indicate that the E signal is the largest signal. A 1 state "select E" signal will enable the gating circuit 709 to select the E signal as the output RIV match score signal.

If $G \geq E$ and $G \geq D$, the AND gate 719 will develop a 1 state "select G" signal to indicate that the G signal is the largest signal. A 1 state "select G" signal will enable the gating circuit 709 to select the G signal as the output RIV match score signal. As indicated previously, the RIV match score signal $S_{AB}$ is applied to the score gate 277 (FIG. 10).

Figure 29:
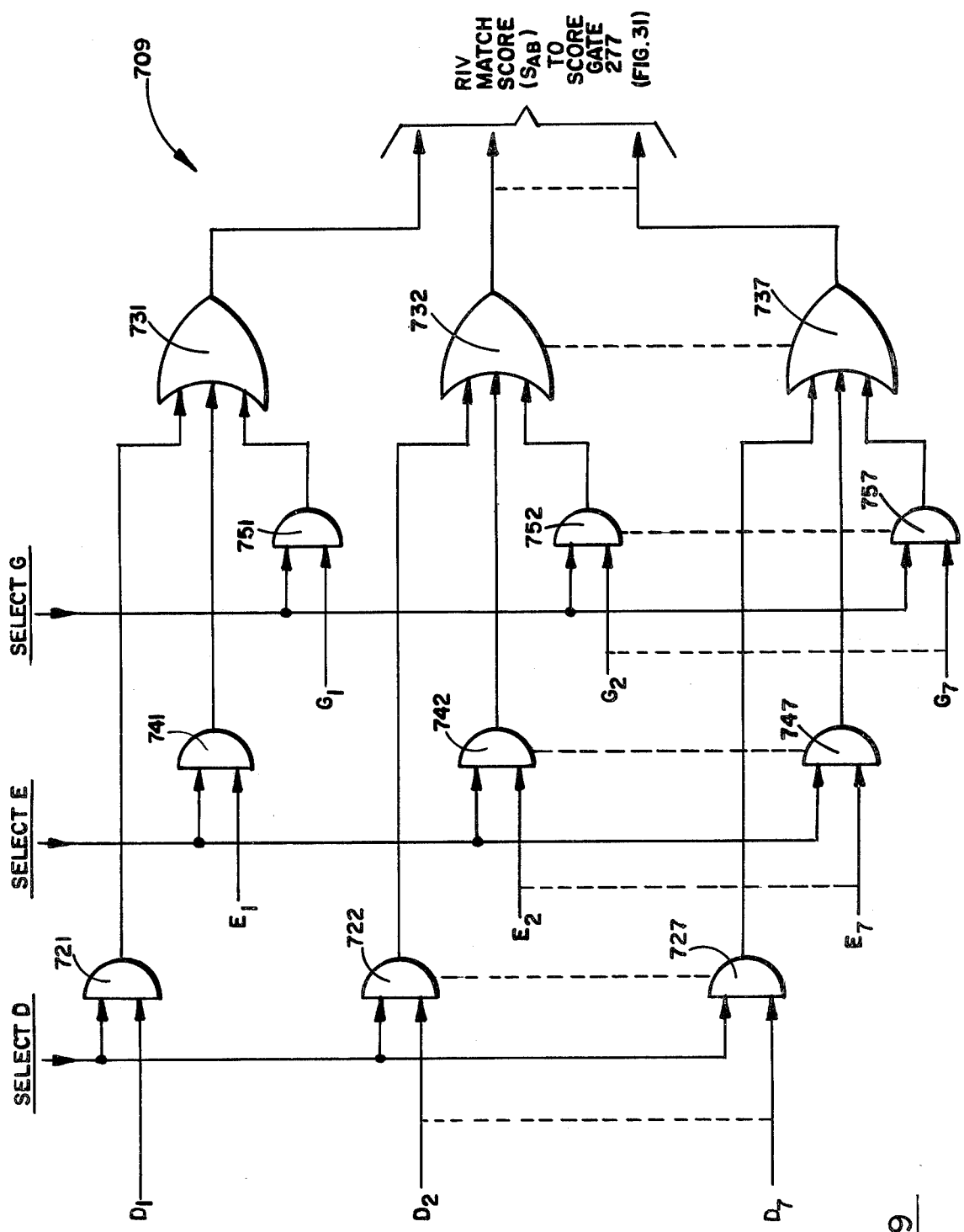
FIG. 29 is a block diagram of the gating circuit of FIG. 28.

The operation of the gating circuit 709 will now be explained by referring to its block diagram illustrated in FIG. 29.

The D1-D7 bits from the + bias score accumulator 667 (FIG. 26) are respectively applied to the lower inputs of a bank of AND gates 721-727. The "select D" signal from AND gate 717 (FIG. 28) is applied to the upper inputs of the AND gates 721-727. A 1 state "select D" signal will enable the AND gates 721-727 to pass the D1-D7 bits through OR gates 731-737 as the RIV match score signal.

In a like manner, the E1-E7 bits from the 0 bias score accumulator 669 (FIG. 26) are respectively applied to the lower inputs of a bank of AND gates 741-747. The "select E" signal from AND gate 718 (FIG. 28) is applied to the upper inputs of the AND gates 741-747. A 1 state "select E" signal will enable the AND gates 741-747 to pass the E1-E7 bits through the OR gates 731-737 as the RIV match score signal.

Similarly, the G1-G7 bits from the − bias score accumulator 671 (FIG. 26) are respectively applied to the lower inputs of a bank of AND gates 751-757. The "select G" signal from AND gate 719 (FIG. 28) is applied to the upper inputs of the AND gates 751-757. A 1 state "select G" signal will enable the AND gates 751-757 to pass the G1-G7 bits through the OR gates 731-737 as the RIV score signal.

Thus, that one of the "select D", "select E" and "select G" signals, which is in a 1 state condition, will determine which bank of AND gates 721-727, 741-747 and 751-757 is selected to pass the associaed one of the outputs of the score accumulators 667, 669 and 671 (FIG. 26) out as the RIV match score $S_{AB}$.

Figure 30:
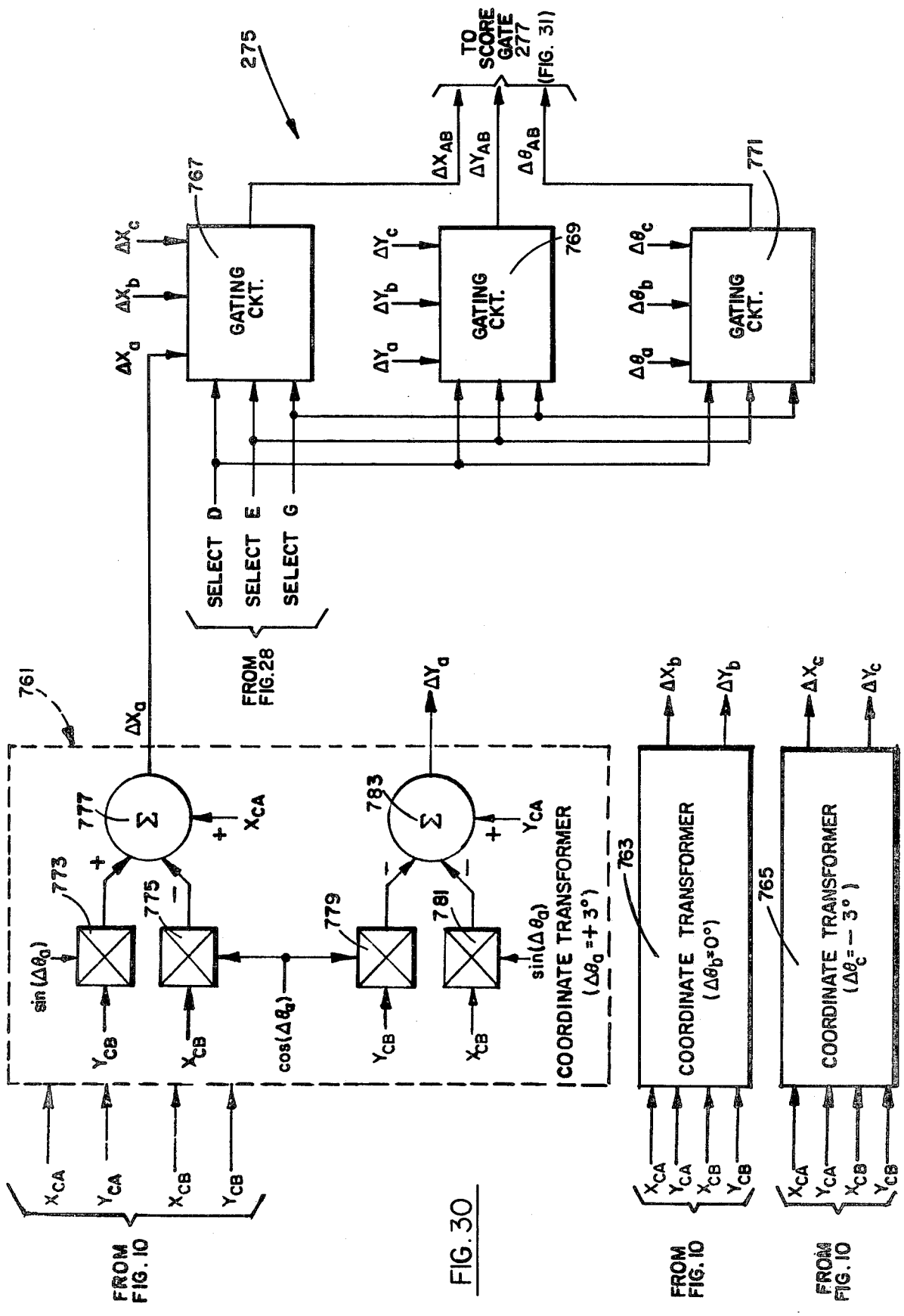
FIG. 30 is a block diagram of the coordinate transformation circuit of FIG. 10.

Referring now to FIG. 30, a block diagram of the coordinate transformation circuit 275 (FIG. 10) is illustrated. As illustrated, the circuit 275 is comprised of coordinate transformers 761, 763 and 765, and gating circuits 767, 769 and 771.

The X and Y of each of the center features of RIV-A and RIV-B ($X_{CA}$, $Y_{CA}$ and $X_{CB}$, $Y_{CB}$) are applied to each of the coordinate transformers 761, 763 and 765. In response to these $X_{CA}$, $Y_{CA}$, $X_{CB}$ and $Y_{CB}$ inputs and to internally developed constants sin ($\Delta\theta$) and cos ($\Delta\theta$), each of the transformers 761, 763 and 765 develops the following conventional coordinate transformer equations for $\Delta X$ and $\Delta Y$:

$$\Delta X = X_{CA} + Y_{CB} \sin(\Delta\theta) - X_{CB} \cos(\Delta\theta) \quad (1)$$

$$\Delta Y = Y_{CA} - Y_{CB} \cos(\Delta\theta) - X_{CB} \sin(\Delta\theta) \quad (2)$$

However, a different angle or angular mismatch ($\Delta\theta$) is used in each of the transformers 761, 763 and 765 to generate different sine and cosine functions.

Let $\Delta\theta_a$, $\Delta\theta_b$ and $\Delta\theta_c$ be respectively used in the transformers 761, 763 and 765 to generate these sine and cosine functions, where $\Delta\theta_a = +3°$, $\Delta\theta_b = 0°$ and $\Delta\theta_c = -3°$. It should be noted that these angles $\Delta\theta_a$, $\Delta\theta_b$, $\Delta\theta_c$ correspond in degrees to the $+\Delta\phi$ bias, $0\Delta\phi$ bias and $-\Delta\phi$ bias angles which were respectively applied to the comparators 647, 649 and 651 in the RIV comparison circuit 273 of FIG. 26.

Since different $\Delta\theta$ angles are used by the transformers 761, 763 and 765 in the generation of the sine and cosine functions, let the X and Y coordinate displacement outputs of the transformer 761 be designated as $\Delta X_a$ and $\Delta Y_a$. Similarly, let the X and Y coordinate displacement outputs of the transformers 763 and 765 be respectively designated as $\Delta X_b$, $\Delta Y_b$ and $\Delta X_c$, $\Delta Y_c$. In this way three different sets of coordinate displacements are generated for the three different angles or angular rotations ($\Delta\theta_a$, $\Delta\theta_b$, $\Delta\theta_c$) of the center features of the RIV pair being compared at that time. However, it should be noted that, in the above-described description of FIG. 26, angles different in size, number or both size and number could be used, which could necessitate a corresponding modification of the structure of FIG. 30. For example, if five different angles (or angular rotations) were used, five different comparators (instead of the three comparators 647, 649 and 651) with associated circuits would be required in FIG. 26 and five different coordinate transformers (instead of the three transformers 761, 763 and 765) would be required in the coordinate transformation circuit 275 of FIG. 30.

The X coordinate displacements $\Delta X_a$, $\Delta X_b$ and $\Delta X_c$ are applied to the gating circuit 767; the Y coordinate displacements $\Delta Y_a$, $\Delta Y_b$ and $\Delta Y_c$ are applied to the gating circuit 769; and the angular rotations $\Delta\theta_a$, $\Delta\theta_b$ and $\Delta\theta_c$ are applied to the gating circuit 771. These gating circuits 767, 769 and 771 are similar in structure and operation to the gating circuit 709 illustrated in FIG. 29 and, hence, will not be further described.

In response to the 1 state "select D", "select E" or "select G" signal from the maximum score selector circuit 673 (FIG. 26 (or FIG. 28)), the gating circuits 767 and 769 select an associated pair of coordinate displacement signals as the output coordinate displacement signals, $\Delta X_{AB}$ and $\Delta Y_{AB}$ and the gating circuit 771 selects the associated angular rotation of the sensed map image as the orientation angle difference $\Delta\theta_{AB}$ between the orientation angles $\theta_{CA}$ and $\theta_{CB}$ of the center features of RIVs A and B. For example, when the "select D" signal is in a 1 state condition, $\Delta X_a$, $\Delta Y_a$ and $\Delta\theta_a$ are selected as the output $\Delta X_{AB}$, $\Delta Y_{AB}$ and $\Delta\theta_{AB}$ signals. Similarly, a 1 state "select E" signal enables the gating circuits 767, 769 and 771 to select the 0° coordinate displacements $\Delta X_b$ and $\Delta Y_b$ and the 0° angular rotation $\Delta\theta_b$. Likewise, a 1 state "select G" signal enables the gating circuits 767, 769 and 771 to select the −3° coordinate displacements $\Delta X_c$ and $\Delta Y_c$ and the −3° angular rotation $\Delta\theta_c$.

The operation of a coordinate transformer will be explained in more detail by referring back to the transformer 761. A multiplier 773 multiplies the input signals $Y_{CB}$ and sin ($\Delta\theta_a$) together to develop the product signal $Y_{CB}$ sin ($\Delta\theta_a$). Another multiplier 775 multiplies the input signals $X_{CB}$ and cos ($\Delta\theta_a$) together to develop the product signal $X_{CB}$ cos ($\Delta\theta_a$). Within a combiner or summation circuit 777, the product signal $X_{CB}$ cos ($\Delta\theta_a$) is subtracted from the sum of input signal $X_{CA}$ and the product signal $Y_{CB}$ sin ($\Delta\theta_a$) to develop the X coordinate displacement signal $\Delta_a$, whose value is given by equation (1) above. Similarly, a multiplier 779 multiplies the input signals $Y_{CB}$ and cos ($\Delta\theta_a$) together to develop the product signal $Y_{CB}$ cos ($\Delta\theta_a$), while a multiplier 781 multiplies the input signals $X_{CB}$ and sin ($\Delta\theta_a$) together to develop the product signal $X_{CB}$ sin ($\Delta\theta_a$). Within a combiner 783, the sum of the product signals $Y_{CB}$ cos ($\Delta\theta_a$) and $X_{CB}$ sin ($\Delta\theta_a$) is subtracted from input signal $Y_{CA}$ to develop the Y coordinate displacement signal $\Delta Y_a$, whose value is given by equation (2) above.

When the angle $\Delta\theta_a$ is set equal to +3° in the coordinate transformer 761, the values $\Delta X_a$ and $\Delta Y_a$ are respectively given by equations (3) and (4) below.

$$\Delta X_a = X_{CA} + Y_{CB} \sin(+3°) - X_{CB} \cos(+3°) \quad (3)$$

$$\Delta Y_a = Y_{CA} - Y_{CB} \cos(+3°) - X_{CB} \sin(+3°) \quad (4)$$

Similarly, when $\Delta\theta_b$ is set equal to 0° in the coordinate transformer 763, the values $\Delta X_b$ and $\Delta Y_b$ are respectively given by equations (5) and (6) below.

$$\Delta X_b = X_{CA} - X_{CB} \quad (5)$$

$$\Delta Y_b = Y_{CA} - Y_{CB} \qquad (6)$$

Finally, when $\Delta\theta_c$ is set equal to $-3°$ in the coordinate transformer 765, the values $\Delta X_c$ and $\Delta Y_c$ are respectively given by equations (7) and (8) below.

$$\Delta X_c = X_{CA} + Y_{CB} \sin(-3°) - X_{CB} \cos(-3°) \qquad (7)$$

$$\Delta Y_c = Y_{CA} - Y_{CB} \cos(-3°) - X_{CB} \sin(-3°) \qquad (8)$$

The X and Y coordinate displacements $\Delta X_{AB}$ and $\Delta Y_{AB}$ and the orientation angle displacement $\Delta\theta_{AB}$ represent the coordinate system transformation that is needed to line up the center features of the compared RIVs A and B with each other. These displacement signals $\Delta X_{AB}$, $\Delta Y_{AB}$ and $\Delta\theta_{AB}$ are applied to the score gate 277 (FIG. 10), which will now be discussed by referring to FIG. 31.

Figure 31:
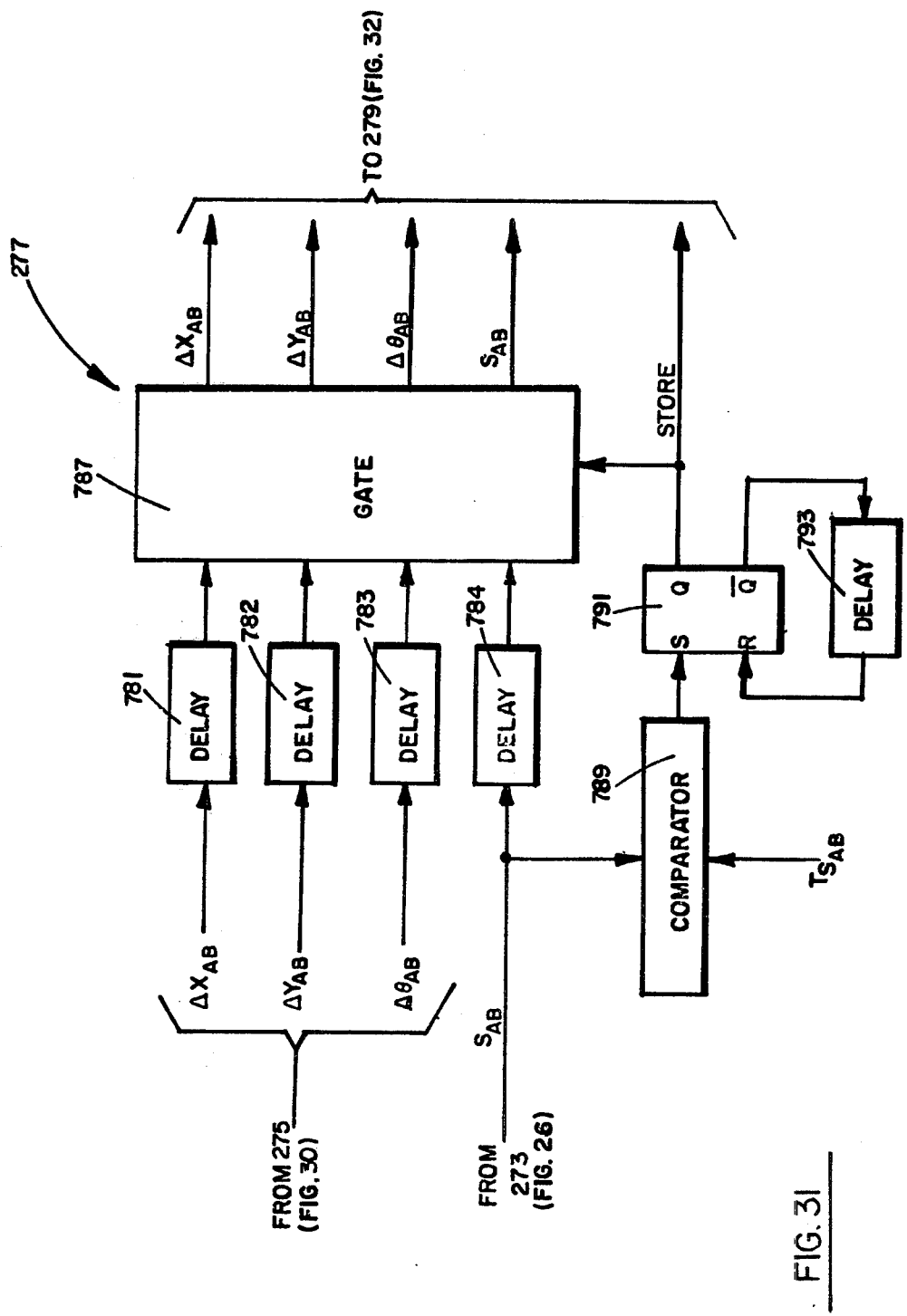
FIG. 31 is a block diagram of the score gate of FIG. 10.

As shown in FIG. 31, the displacement signals $\Delta X_{AB}$, $\Delta Y_{AB}$ and $\Delta\theta_{AB}$ from the coordinate transformation circuit 275 (FIG. 30) and the RIV match score signal $S_{AB}$ from the RIV comparison circuit 273 (FIG. 26) of the match comparator 63 (FIG. 10) are respectively parallel-applied through delay circuits 781–784 to a common gate 787. The delay time of each of the delay circuits 781–784 can be one $P_1$ clock period, for example. The gate 787 can be comprised of four banks or pluralities of two-input AND gates (not shown) for the four input signals, with the bits in each input signal being applied to first inputs of the AND gates in the associated bank.

The signal $S_{AB}$ from the comparison circuit 273 (FIG. 26) is also compared with a threshold signal $T_{SAB}$ in a comparator 789. It should be recalled that the match score $S_{AB}$ is computed from the number of features in RIV-A that find a mate in RIV-B. The amplitude of the threshold signal $T_{SAB}$ is preselected such that two or more neighboring features in RIVs A and B must match before the match score $S_{AB}$ is greater in amplitude than the signal $T_{SAB}$. If $S_{AB}$ is greater than the threshold signal $T_{SAB}$, the comparator 789 develops an output to set a flip flop 791. When set, the flip flop 791 enables all of the second inputs of all of the AND gates in gate 787 to pass the $\Delta X_{AB}$, $\Delta Y_{AB}$, $\Delta\theta_{AB}$ and $S_{AB}$ signals into the score list register 279 (FIG. 10) for storage therein. The output of the flip flop 791 is also suitably delayed by a delay circuit 793 before it resets the flip flop 791 to disable all of the AND gates in the gate 787. The delay time of the delay circuit 793 can be, for example, equal to two $P_1$ clock periods to provide sufficient time for the gate 787 to develop its four outputs.

If the amplitude of the RIV match score $S_{AB}$ is equal to or less than the threshold signal $T_{SAB}$, the flip flop 791 will remain in a reset state and the gate 787 will be prevented from passing the outputs of the RIV comparator 63 (FIG. 10) to the score list register 279 (FIG. 10).

Figure 32:
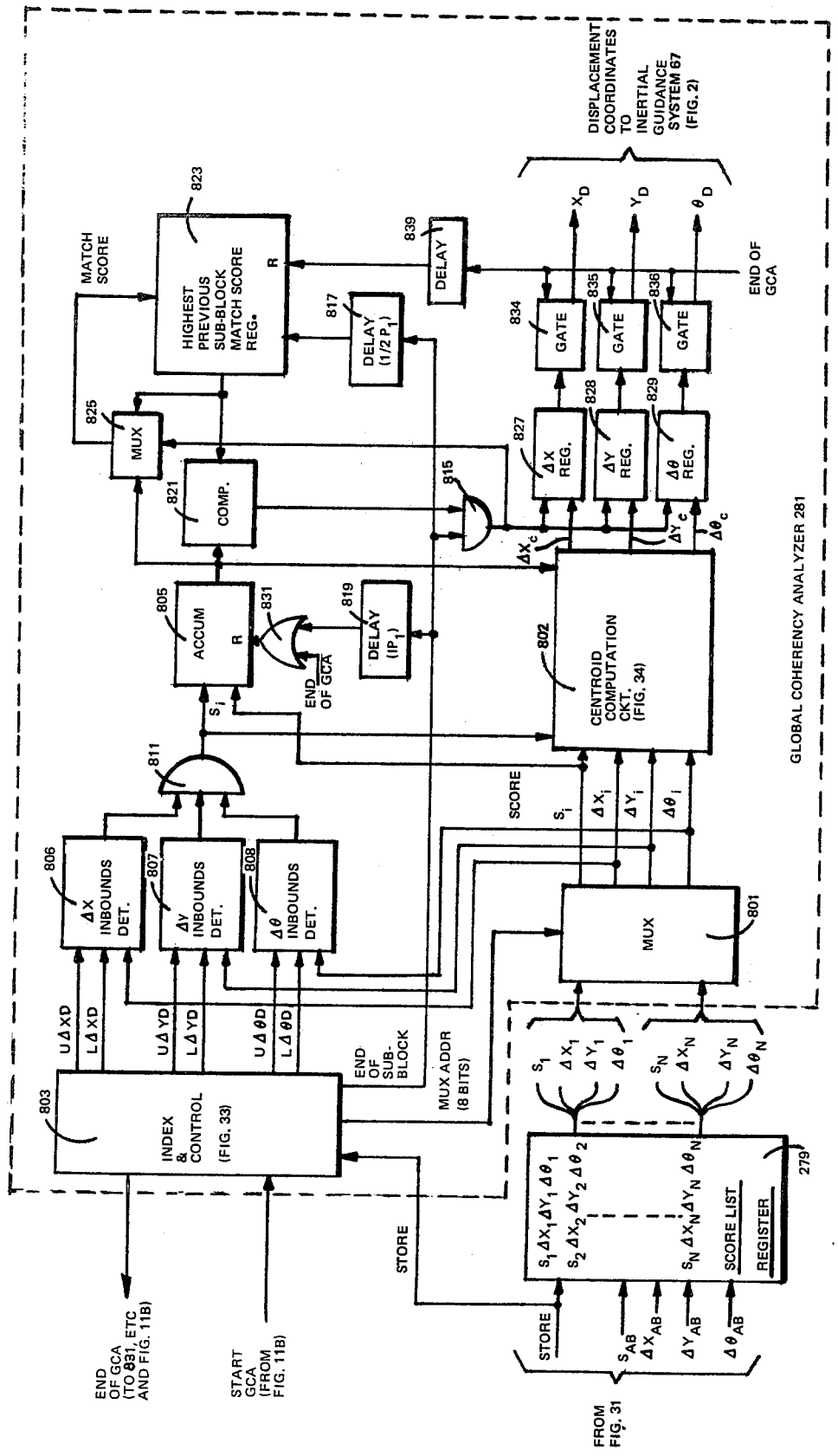
FIG. 32 is a block diagram of the global coherency analyzer of FIG. 10.

Referring now to FIG. 32, the score list register 279 and a block diagram of the global coherency analyzer 281 of FIG. 10 are illustrated. Each time that a "store" signal is generated by the score gate 277 (FIG. 31), the associated RIV match score $S_{AB}$ and displacement signals $\Delta X_{AB}$, $\Delta Y_{AB}$ and $\Delta\theta_{AB}$ are passed through the score gate 277 and parallel-stored in the score list register 279. The score list register 279 contains the match scores ($S_i$) and associated displacements ($\Delta X_i$, $\Delta Y_i$, $\Delta\theta_i$) of the two coordinate systems (between the two map images being compared) for each pair of RIVs A and B that satisfy the conditions of the RIV comparator 63 (FIG. 10) and score gate 277 (FIG. 10), where i=from 1 to N RIV pair comparisons. For this description, N can be, for example, a number up to 192. While in principle $192^2$ such scores might result, it should be noted that in typical use the vast majority of RIV pair comparisons will not yield a "store" signal. Accordingly, only 192 positions in score list register 279 suffice to buffer store these scores. The contents ($S_1$, $\Delta X_1$, $\Delta Y_1$, $\Delta\theta_1$ through $S_N$, $\Delta X_N$, $\Delta Y_N$, $\Delta\theta_N$) of the score list register 279 are applied in parallel to the input of a multiplexer 801 in the global coherency analyzer 281.

The overall function of the analyzer 281 is to locate the densest region in $\Delta X$, $\Delta Y$, $\Delta\theta$ space of the match score and displacement data stored in the score list register 279. With respect to this $\Delta X$, $\Delta Y$, $\Delta\theta$ space, it has been previously stated that each $\Delta X$, $\Delta Y$, $\Delta\theta$ entry represents the coordinate displacement ($\Delta X$, $\Delta Y$) and angular rotation ($\Delta\theta$) of the two coordinate systems of an RIV pair from which this result was derived.

To aid in understanding how the global coherency analyzer 281 locates the densest region in $\Delta X$, $\Delta Y$, $\Delta\theta$ space of the contents of register 279, let the $\Delta X$, $\Delta Y$, $\Delta\theta$ space components be respectively represented by the three orthogonal axes of a cube. Let each of the $\Delta X$, $\Delta Y$ and $\Delta\theta$ axes of the cube be 256 units long. For illustrative purposes, divide the 256 units along each of the $\Delta X$ and $\Delta Y$ axes into 32 sections of 8 units each, and divide the 256 units along the $\Delta\theta$ axis into 8 sections of 32 each. As a result, the cube will be divided into 8192 sub-blocks (32 times 32 times 8) with each sub-block being 8 units long in the $\Delta X$ direction, 8 units wide in the the $\Delta Y$ direction and 32 units deep in the $\Delta\theta$ direction.

An index and control circuit 803 counts the "store" signals to determine the number of significant RIV match scores $S_i$ that are stored in the store list register 279. After all of the significant RIV match scores $S_i$ and their associated displacements $\Delta X_i$, $\Delta Y_i$, $\Delta\theta_i$ have been stored in the register 279, the "start GCA" signal from the timing and control unit 69 (FIGS. 2, 11A and 11B) is applied to the index and control circuit 803. The "start GCA" signal enables the index and control circuit 803 to start sequentially applying multiplexer addresses 1–N to the multiplexer 801. In response to each of the 1–N addresses, the multiplexer 801 applies the $S_i$ component (of the addressed entry from register 279) to an accumulator 805 and also respectively applies the $\Delta X_i$, $\Delta Y_i$ and $\Delta\theta_i$ components (of the addressed entry from register 279) to $\Delta X$, $\Delta Y$ and $\Delta\theta$ in-bounds detectors or comparators 806–808, where i=1–N (1 through N). The multiplexer 801 also applies all of the $S_i$, $\Delta X_i$, $\Delta Y_i$ and $\Delta\theta_i$ components to a centroid computation circuit 802. During each period of time that the circuit 803 is developing all of the 1–N multiplexer addresses, the circuit 803 is also generating one of 8192 sets of the following lower (L) and upper (U) displacement (D) limits in $\Delta X$, $\Delta Y$, $\Delta\theta$ space: L$\Delta$XD and U$\Delta$XD, L$\Delta$YD and U$\Delta$YD, L$\Delta\theta$D and U$\Delta\theta$D. The $\Delta X$, $\Delta Y$ and $\Delta\theta$ displacement limits (L$\Delta$XD and U$\Delta$XD; L$\Delta$YD and U$\Delta$YD; L$\Delta\theta$D and U$\Delta\theta$D) are respectively applied to the detectors 806–808.

Each of the detectors 806–808 is implemented to develop a 1 state output if the value of the associated one of the $\Delta X_i$, $\Delta Y_i$ and $\Delta\theta_i$ components is between the associated upper and lower displacement limits, or equal to its upper displacement limit. For example, with $\Delta Y$ displacement limits of 88 and 96, the detector 807 will develop a 1 state output for each $\Delta Y_i$ signal that is equal to any value within the range 89–96, including 96 but not 88.

Each of the 8192 sets of displacement limits corresponds to the limits or boundaries for an associated one of the 8192 sub-blocks in the cube previously discussed. For example, the circuit 803 can develop lower and upper displacement limits in each of $\Delta X$ (L$\Delta$XD and U$\Delta$XD) and $\Delta Y$ (L$\Delta$YD and U$\Delta$YD) of: 0 and 8, 8 and 16, 16 and 24, 24 and 32, 32 and 40, 40 and 48, ... , 248 and 256. Likewise the circuit 803 can develop lower and upper displacement limits in $\Delta\theta$ (L$\Delta\theta$D and U$\Delta\theta$D) of: 0 and 32, 32 and 64, 64 and 96, ... , 224 and 256.

During the period of time that one of the 8192 sets of $\Delta X$, $\Delta Y$, $\Delta\theta$ displacement limits for a sub-block is applied to the detectors 806–808, all of the N sets of coordinates ($\Delta X_i$, $\Delta Y_i$, $\Delta\theta_i$) stored in the register 279 are sequentially multiplexed out to the detectors 806–808. Thus, the detectors 806–808 will determine if any of the N sets of $\Delta X_i$, $\Delta Y_i$, $\Delta\theta_i$ coordinates are in the sub-block being examined at that time. If the coordinates ($\Delta X_i$, $\Delta Y_i$, $\Delta\theta_i$) of a score $S_i$ are within the sub-block being examined, all of the detectors 806–808 will generate 1 state signals, which are AND gated by AND gate 811 to enable the accumulator 805 to add to its contents the score $S_i$ associated with those coordinates.

After all of the N entries ($S_i$, $\Delta X_i$, $\Delta Y_i$, $\Delta\theta_i$) in the register 279 have been processed, the index and control circuit 803 generates an "end of sub-block" signal. The "end of sub-block" signal is applied to one input of an AND gate 815, and also applied to the inputs of delay circuits 817 and 819 which have delay times of $\frac{1}{2}$ $P_1$ and 1 $P_1$ clock periods, respectively. At this time the accumulated total (or present match score) of the accumulator 805 is indicative of the degree of match between map image A and a portion of map image B in that sub-block of $\Delta X$, $\Delta Y$, $\Delta\theta$ space that was examined. The present match score from accumulator 805 is compared in a comparator 821 with the "highest previous sub-block match score" that is stored in register 823. The match scores from the accumulator 805 and register 823 are also applied to a multiplexer 825.

If, at the time of the "end of sub-block" signal, the present match score from accumulator 805 is higher than the highest previous match score from the register 823, the comparator 821 will apply a 1 state signal through the enabled AND gate 815 to enable the multiplexer 825 to apply the present match score to the input of the register 823. Conversely, if the output of the register 823 is higher than the output of the accumulator 805, the comparator 821 will develop a 0 state output. In this case the resultant 0 state output of the AND gate 815 will cause the multiplexer 825 to apply the highest previous match score to the input of the register 823.

Each 1 state output of AND gate 811 and the associated accumulated match score from accumulator 805 are applied to the centroid computation circuit 802 to enable the circuit 802 to compute the centroid ($\Delta X_c$, $\Delta Y_c$, $\Delta\theta_c$) of the $\Delta X_i$, $\Delta Y_i$, $\Delta\theta_i$ displacements from multiplexer 801. The resultant centroid computations $\Delta X_c$, $\Delta Y_c$, $\Delta\theta_c$ are respectively applied to $\Delta X$, $\Delta Y$ and $\Delta\theta$ registers 827, 828 and 829.

A 1 state output from the AND gate 815 also enables $\Delta X$, $\Delta Y$ and $\Delta\theta$ registers 827, 828 and 829 to replace the previously stored centroid computations $\Delta X_c$, $\Delta Y_c$, $\Delta\theta_c$ of a previous sub-block with the present centroid computations of the sub-block being examined.

After a delay of $\frac{1}{2}$ $P_1$ clock period, the delay circuit 817 applies the "end of sub-block" signal to the register 823. By this time the match score input to the register 823 has stabilized. This delayed "end of sub-block" signal from the delay circuit 817 enables the register 823 to store the match score output of the multiplexer 825.

After a delay of 1 $P_1$ clock period, the delay circuit 819 applies the "end of sub-block" signal through an OR gate 831 to reset the accumulator 805 to a 0 count.

The above operation is performed 8192 times. Thus, all of the coordinate entries ($\Delta X_i$, $\Delta Y_i$, $\Delta\theta_i$) in the score list register 279 are examined to determine how many are in each of the 8192 sub-blocks of the exemplary cube. At the end of these 8192 passes through the 8192 sub-blocks of the cube, the index and control circuit 803 generates the "end of GCA" signal. This "end of GCA" signal passes through the OR gate 831 to reset the accumulator 805 to a 0 count, and enables gates 834–836 to respectively pass the contents of the registers 827–829 out as the displacement coordinates $\Delta X_D$, $\Delta Y_D$, $\Delta\theta_D$ to the inertial guidance system 67 (FIG. 2).

The "end of GCA" signal is suitably delayed by a delay circuit 839 for, for example, a 1 $P_1$ clock period before it resets the register 823 to a 0 count in order to terminate the image A and image B pair comparison.

It should be pointed out at this time that N (where N = the number of entries in the score list register 279) is the maximum number of 8192 sub-blocks in the cube that will be occupied, or develop match scores in the accumulator 805. Furthermore, this dispersion in $\Delta X$, $\Delta Y$, $\Delta\theta$ space would only occur if the map images A and B were totally dissimilar. On the other hand, with a perfect match between map image A and the corresponding portion of map image B most of the entries in the register 279 would be located within the same sub-block of $\Delta X$, $\Delta Y$, $\Delta\theta$ space. However, even if map image A was developed from ground terrain found in map image B, weather conditions, time of day and operational limitations and defects in the terrain image acquisition unit 41 (FIG. 2) can alter the appearance of a map image, as discussed before. Such an altered map image appearance may be caused by, for example, false, missing or distorted features (in either or both of map images A and B). False, missing or distorted features can cause a dispersion of the entries in the register 279 over a number of the sub-blocks in $\Delta X$, $\Delta Y$, $\Delta\theta$ space. For this reason the global coherency analyzer 281 of FIG. 32 determines the displacement coordinates $X_D$, $Y_D$, $\theta_D$, as described above, by locating the densest region in $\Delta X$, $\Delta Y$, $\Delta\theta$ space of the entries in the register 279.

Figure 33:
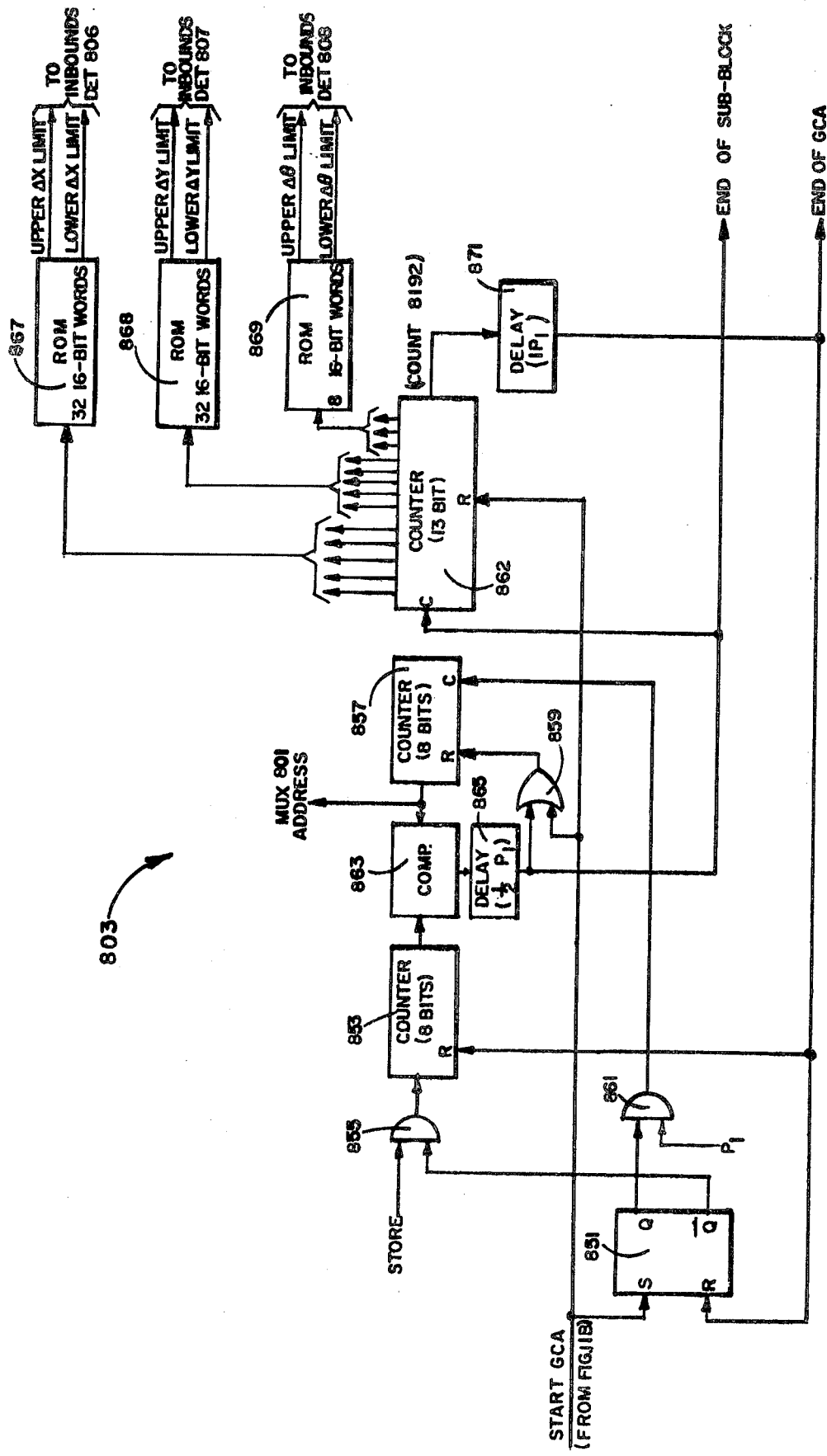
FIG. 33 is a block diagram of the index and control circuit of FIG. 32.

Referring now to FIG. 33, a block diagram of the index and control circuit 803 (FIG. 32) is illustrated. Initially, a flip flop 851 is in a reset state and a counter 853 has been reset to a 0 count. In its reset state the Q side of the flip flop 851 enables an AND gate 855 to pass "store" pulses to the counter 853 to be counted. After all of the "store" signals have been counted, a "start GCA" signal resets a counter 857 to a 0 count by way of an OR gate 859 and directly resets a counter 862 to a 0 count. In addition, the "start GCA" signal sets the flip flop 851 to disable the AND gate 855 and to enable an AND gate 861. When enabled the AND gate 861 passes $P_1$ clocks to the counter 857 to be counted.

Each time that the counter 857 counts a $P_1$ clock, it develops and applies a different multiplexer address to the multiplexer 801 (FIG. 32). The multiplexer address is also compared in a comparator 863 with the output "store" count of the counter 853. When the multiplexer address becomes equal to the number of "store" signals counted by the counter 853, the comparator 863 develops a 1 state output. One half of 1 $P_1$ clock period after receiving the output of the comparator 863, a delay circuit 865 develops an "end of sub-block" signal. This allows the counter 857 to generate all of the multiplexer addresses before the "end of sub-block" signal is applied through the OR gate 859 to reset the counter 857 to a 0 count. In addition, the "end of sub-block" signal increments the counter 862 by 1. Therefore, it can be seen that the counter 857 develops multiplexer addresses from 1 through N before being reset to 0 by the "end of sub-block" signal, and then cyclically repeats this operation.

The counter 862, which can be a 13-bit counter, counts the "end of sub-block" signals in order to develop output counts from 1 through 8192. The first 5 bits of each output 13-bit count are applied to a read only memory (ROM) 867 to select 1 of 32 sixteen-bit words which establish the lower and upper $\Delta X$ displacement limits that are applied to the $\Delta X$ in-bounds detector 806 (FIG. 32). The next 5 bits of each output 13-bit count are applied to a ROM 868 to select 1 of 32 sixteen-bit words which establish the lower and upper $\Delta Y$ displacement limits that are applied to the $\Delta Y$ in-bounds detector 807 (FIG. 32). Finally, the last 3 bits of each output 13-bit count are applied to a ROM 869 to select 1 of 8 sixteen-bit words which establish the lower and upper $\Delta\theta$ displacement limits that are applied to the $\Delta\theta$ in-bounds detector 808. In this manner, the previously discussed coordinates $\Delta X$, $\Delta Y$, $\Delta\theta$ space are determined for each of the 8192 sub-blocks in the exemplary cube.

Upon reaching a count of 8192, the counter 862 develops a "count 8192" signal which is applied to a delay circuit 871. One $P_1$ clock period after receiving the "count 8192" signal, the delay circuit 871 develops an "end of global coherency analysis" (end of GCA) signal, which resets the flip flop 851 and resets the counter 853 to a 0 count. This "end of GCA" signal also sets "wait" flip flop 296 (FIG. 11B) by way of OR gate 294 (FIG. 11B) to prepare for a subsequent image A at the next checkpoint.

The index and control circuit remains in this quiescent state of operation until another map image pair comparison subsequently develops "store" pulses to be counted by the counter 853.

Figure 34:
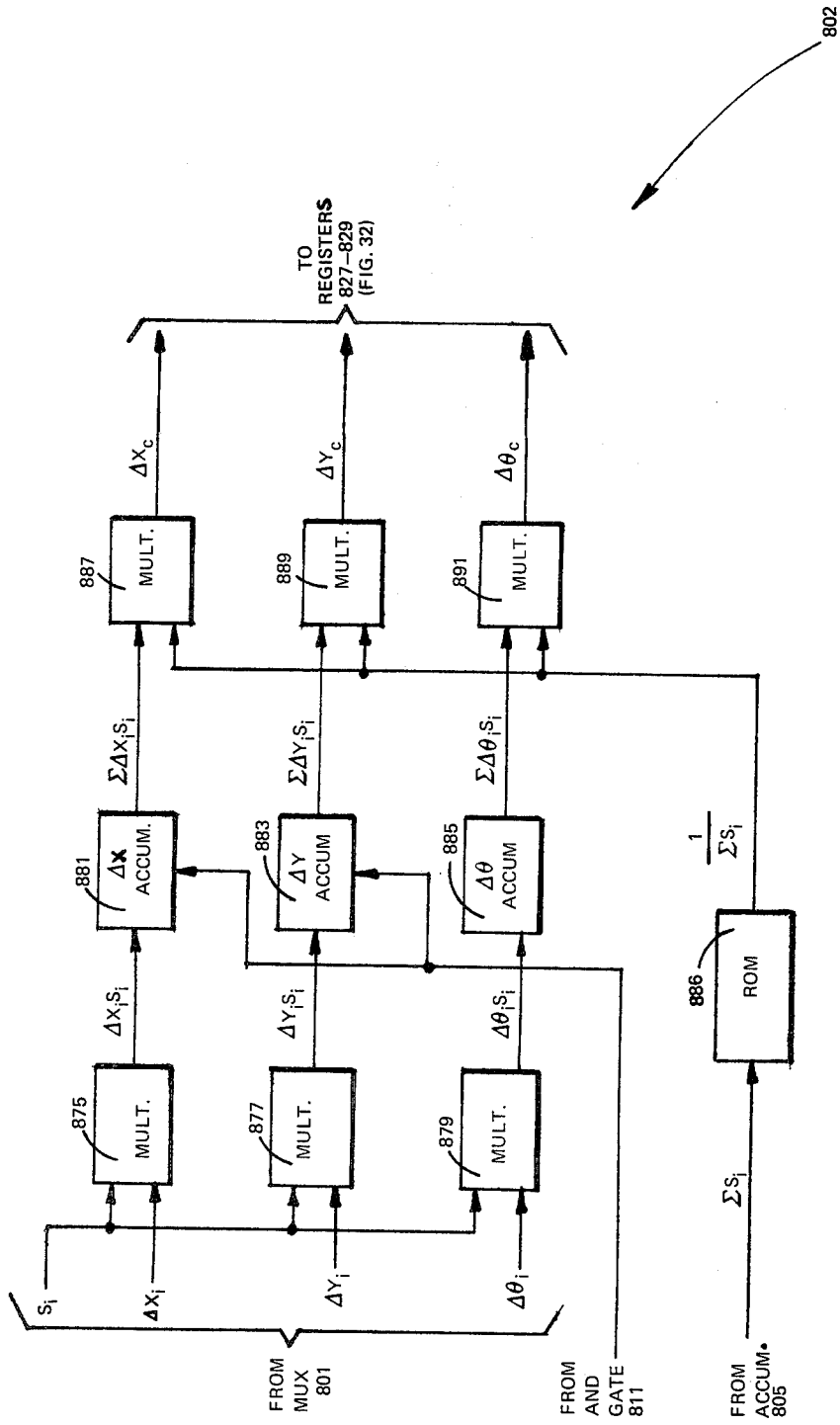
FIG. 34 is a block diagram of the centroid computation circuit of FIG. 32.

Referring now to FIG. 34, the centroid computation circuit 802 of FIG. 32 is illustrated. Basically, the circuit 802 computes the centroids $\Delta X_c$, $\Delta Y_c$, $\Delta\theta_c$ from the $\Delta X_i$, $\Delta Y_i$, $\Delta\theta_i$ displacements, as weighted by the associated match scores $S_i$. The centroids of a sub-block are computed according to the following equations:

$$\Delta X_c = \frac{\sum_{i}^{N} \Delta X_i \cdot \Delta S_i}{\sum_{i}^{N} S_i} \quad (9)$$

$$\Delta Y_c = \frac{\sum_{i}^{N} \Delta Y_i \cdot S_i}{\sum_{i}^{N} S_i} \quad (10)$$

$$\Delta\theta_c = \frac{\sum_{i}^{N} \Delta\theta_i \cdot S_i}{\sum_{i}^{N} S_i} \quad (11)$$

Essentially, FIG. 34 is implemented to perform the operations indicated in equations (9), (10) and (11).

Each of the displacements $\Delta X_i$, $\Delta Y_i$, $\Delta\theta_i$ of a sub-block are weighted by the match score $S_i$ of that sub-block in multipliers 875, 877 and 879, in order to develop the product signals $\Delta X_i S_i$, $\Delta Y_i S_i$ and $\Delta\theta_i S_i$ at the outputs of the multipliers 875, 877 and 879, respectively. It will be recalled that whenever the displacements $\Delta X_i$, $\Delta Y_i$, $\Delta\theta_i$ of a sub-block are within the $\Delta X$, $\Delta Y$, $\Delta\theta$ upper and lower limits of that sub-block, the AND gate 811 (FIG. 32) will develop a 1 state output. A 1 state output from AND gate 811 enables $\Delta X$, $\Delta Y$, $\Delta\theta$ accumulators 881, 883 and 885 to respectively accumulate the product signals $\Delta X_i S_i$, $\Delta Y_i S_i$ and $\Delta\theta_i S_i$.

The accumulated match score $\Sigma S_i$ (for that sub-block) from accumulator 805 (FIG. 32) is used to address a ROM 886 to develop the reciprocal of that match score, or $1/\Sigma S_i$. Each of the accumulated outputs $\Sigma \Delta X_i S_i$, $\Sigma \Delta Y_i S_i$ and $\Sigma \Delta\theta_i S_i$ of accumulators 881, 883 and 885 is multiplied in multipliers 887, 889 and 891, respectively, by this reciprocal $1/\Sigma S_i$ in order to develop the centroids $\Delta X_c$, $\Delta Y_c$ and $\Delta\theta_c$ of equations (9), (10) and (11) above.

The invention thus provides, as disclosed in the illustrated embodiment, an autonomous navigation system for an airborne vehicle. The navigation system selectively matches terrain features extracted from a sensed map of a portion of ground terrain at a checkpoint against the terrain features of an associated one of pre-stored maps of large ground areas along a preselected flight path in order to determine the position and orientation of the sensed map image within the associated reference map image. By this means signals are developed which are used by an inertial guidance system to update the position and heading coordinates of the airborne vehicle at each of a plurality of checkpoints along the preselected flight path.

While the salient features have been illustrated and described in a preferred embodiment of the invention, it should be readily apparent to those skilled in the art that many changes and modifications can be made in the preferred embodiment without departing from the spirit and scope of the invention. It is therefore intended to cover all such changes and modifications of the invention that fall within the spirit and scope of the invention as set forth in the appended claims.

We claim:

1. A navigational system comprising:
   means for periodically generating a first pattern of terrain features from a sensed image of ground terrain, said generating means including:
      means for periodically sensing an image of ground terrain; and
      means for extracting the first pattern of terrain features contained in the sensed image;
   means for prestoring a second pattern of terrain features contained in a reference image, said sensed image substantially corresponding to a portion of the reference image;
   means selectively responsive to the first and second patterns of terrain features for determining the relative coordinate and orientation displacements of the first pattern within the second pattern, said determining means including:
      means responsive to the features of the first and second patterns for selectively developing a feature neighborhood of nearby features surrounding each feature in the first and second patterns;
      means selectively responsive to the feature neighborhoods of the first and second patterns for developing a plurality of neighborhood comparison signals indicative of the closeness of match and coordinate and orientation displacements between each feature neighborhood of the first pattern with respect to each feature neighborhood of the second pattern; and means responsive to the neighborhood comparison signals for computing the relative coordinate and orientation displacements of the first pattern within the second pattern; and means responsive to the relative coordinate and orientation displacements for updating position and heading coordinates of the navigational system.

2. A navigational system comprising:

means for periodically generating a first pattern of terrain features from a sensed image of ground terrain, said generating means including:
 means for periodically sensing an image of ground terrain; and
 means for extracting the first pattern of terrain features contained in the sensed image, said extracting means comprising means for selectively detecting features data from preselected terrain features contained in the sensed image, the feature data for a detected terrain feature identifying the position within the first pattern and type of terrain feature that has been detected; and means for storing the features data, all of the features data in the sensed image forming the first pattern of terrain features;

means for prestoring a second pattern of terrain features contained in a reference image, said sensed image substantially corresponding to a portion of the reference image;

means selectively responsive to the first and second patterns of terrain features for determining the relative coordinate and orientation displacements of the first pattern within the second pattern, said determining means including:
 means responsive to the features of the first and second patterns for selectively developing a feature neighborhood of nearby features surrounding each feature in the first and second patterns;
 means selectively responsive to the feature neighborhoods of the first and second patterns for developing a plurality of neighborhood comparison signals indicative of the closeness of match and coordinate and orientation displacements between each feature neighborhood of the first pattern with respect to each feature neighborhood of the second pattern; and
 means responsive to the neighborhood comparison signals for computing the relative coordinate and orientation displacements of the first pattern within the second pattern; and means responsive to the relative coordinate and orientation displacements for updating position and heading coordinates of the navigational system.

3. The navigational system of claim 2 wherein said sensing means comprises a radar set.

4. A navigational system comprising:

means for periodically generating a first pattern of terrain features from a sensed image of ground terrain, said generating means including:
 means for periodically sensing an image of ground terrain, said sensing means comprising a radar set; and
 means for extracting the first pattern of terrain features contained in the sensed image;

means for prestoring a second pattern of terrain features contained in a reference image, said sensed image substantially corresponding to a portion of the reference image;

means selectively responsive to the first and second patterns of terrain features for determining the relative coordinate and orientation displacements of the first pattern within the second pattern, said determining means including:
 means responsive to the features of the first and second patterns for selectively developing a feature neighborhood of nearby features surrounding each feature in the first and second patterns;
 means selectively responsive to the feature neighborhoods of the first and second patterns for developing a plurality of neighborhood comparison signals indicative of the closeness of match and coordinate and orientation displacements between each feature neighborhood of the first pattern with respect to each feature neighborhood of the second pattern; and
 means responsive to the neighborhood comparison signals for computing the relative coordinate and orientation displacements of the first pattern within the second pattern; and means responsive to the relative coordinate and orientation displacements for updating position and heading coordinates of the navigational system.

5. An autonomous navigational system comprising:

means for periodically sensing an image of local terrain;

means for extracting a first digital pattern of a plurality of terrain features contained in the sensed image;

means for prestoring a second digital pattern of a plurality of terrain features contained in a reference image, said sensed image corresponding to an unidentified portion of the reference image;

means responsive to the features of the first and second patterns for selectively developing a detailed neighborhood description of a feature neighborhood of nearby features surrounding each feature in the first and second patterns;

means selectively responsive to the detailed neighborhood descriptions of the first and second patterns for developing a plurality of neighborhood comparison signals indicative of the closeness of match and coordinate and orientation displacements between each feature neighborhood of the first pattern with respect to each feature neighborhood of the second pattern;

means responsive to the neighborhood comparison signals for computing the relative coordinate and orientation displacements of the first pattern within the second pattern; and means responsive to the relative coordinate and orientation displacements of the first pattern within the second pattern for updating the position and heading coordinates of the navigational system.

6. A navigational system for guiding an airborne vehicle along a preassigned flight path, said navigational system comprising:

means for periodically sensing an image of ground terrain along the flight path;

means for selectively detecting features data from preselected terrain features contained in the sensed image, the feature data for each detected terrain feature identifying the position within the sensed image and type of that detected terrain feature;

means for storing the features data, all of the features data in the sensed image forming a first pattern of terrain features;

means for prestoring a plurality of second patterns of terrain features, said second patterns being respectively contained in preselected reference images of ground terrain along the preassigned flight path;

means responsive to the features of the first pattern and an associated one of the second patterns for selectively developing a feature neighborhood of nearby features surrounding each feature in the first and second patterns;

means selectively responsive to the feature neighborhoods of the first and second patterns for developing a plurality of neighborhood comparison signals indicative of the closeness of match and coordinate and orientation displacements between each feature neighborhood of the first pattern with respect to each feature neighborhood of the second pattern;

means responsive to the neighborhood comparison signals for computing the relative coordinate and orientation displacements of one of the first and second patterns within the other one of said first and second patterns; and means responsive to the relative coordinate and orientation displacements for updating position and heading coordinates of the navigational system.

* * * * *